(12) United States Patent
Ohnuki et al.

(10) Patent No.: US 9,548,657 B2
(45) Date of Patent: Jan. 17, 2017

(54) POWER DEVICE

(71) Applicant: HONDA MOTOR CO., LTD., Tokyo (JP)

(72) Inventors: Yasumichi Ohnuki, Utsunomiya (JP); Satoshi Hashino, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 369 days.

(21) Appl. No.: 14/294,850

(22) Filed: Jun. 3, 2014

(65) Prior Publication Data
US 2014/0361617 A1  Dec. 11, 2014

(30) Foreign Application Priority Data
Jun. 6, 2013  (JP) .................. 2013-119939

(51) Int. Cl.
*H02M 3/158* (2006.01)
*H02J 7/00* (2006.01)

(52) U.S. Cl.
CPC .......... *H02M 3/158* (2013.01); *Y10T 307/352* (2015.04); *Y10T 307/549* (2015.04)

(58) Field of Classification Search
CPC ........................................... H02J 7/00
USPC ........................................... 307/18
See application file for complete search history.

(56) References Cited

U.S. PATENT DOCUMENTS

2009/0278496 A1  11/2009  Nakao et al.

FOREIGN PATENT DOCUMENTS

| DE | 102011018357 A1 | 10/2012 |
| DE | 102013005070 A1 | 9/2014 |
| EP | 2448099 A1 | 5/2012 |
| JP | 2008-206299 A | 9/2008 |
| JP | 2012-60838 A | 3/2012 |
| JP | 2012-152079 A | 8/2012 |
| JP | 2013-102595 A | 5/2013 |

OTHER PUBLICATIONS

German Search Report dated Jan. 16, 2015, issued in corresponding DE Patent Application No. 102014210352.5 with English translation (17 pages).
German Office Action dated Jan. 16, 2015, issued in corresponding DE Patent Application No. 102014210352.5 with English translation (10 pages).
Office Action dated Sep. 13, 2016, issued in counterpart Japanese Patent Application No. 2013-119939, with English translation. (6 pages).

*Primary Examiner* — Robert DeBeradinis
(74) *Attorney, Agent, or Firm* — Westerman, Hattori, Daniels & Adrian, LLP

(57) ABSTRACT

When a control device simultaneously drives first and second direct-current power converter circuits, the control device can arbitrarily control a first voltage and a second voltage, and a load voltage by changing at least one of first and second duties. The control device generates a loop current, which discharges a first power source and charges a second power source, or a loop current, which charges the first power source and discharges the second power source, in a loop circuit where a first reactor and a second reactor are connected in series.

10 Claims, 59 Drawing Sheets

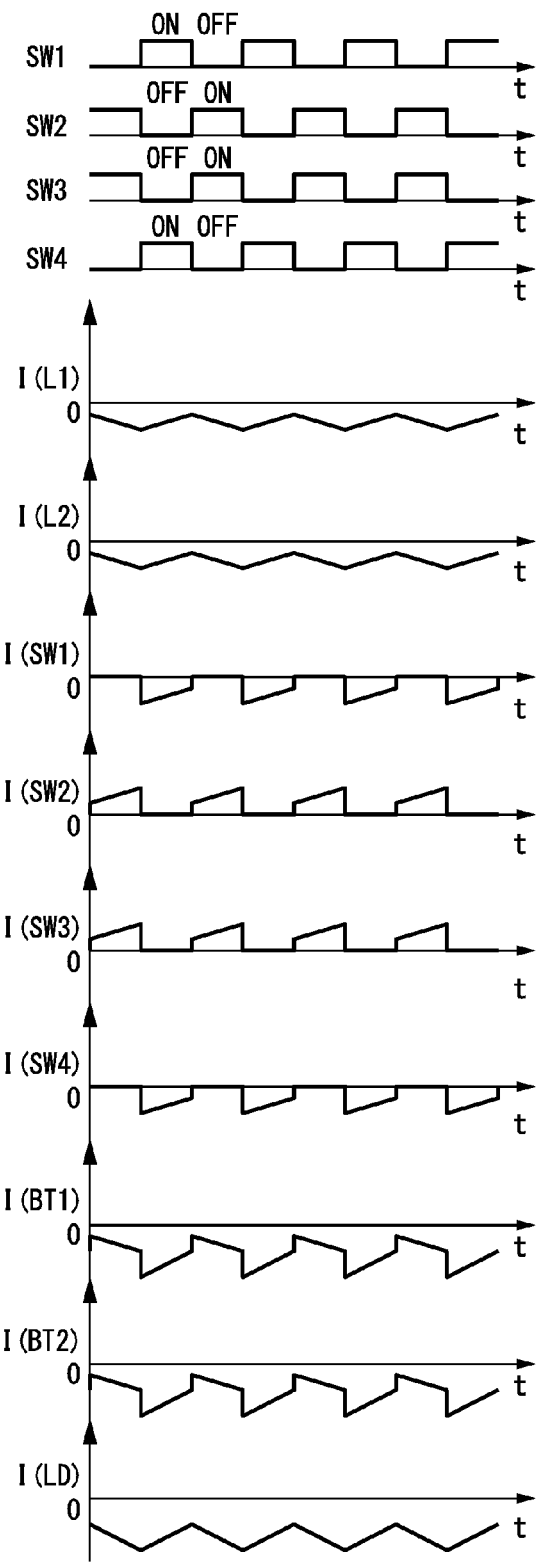

FIG. 7
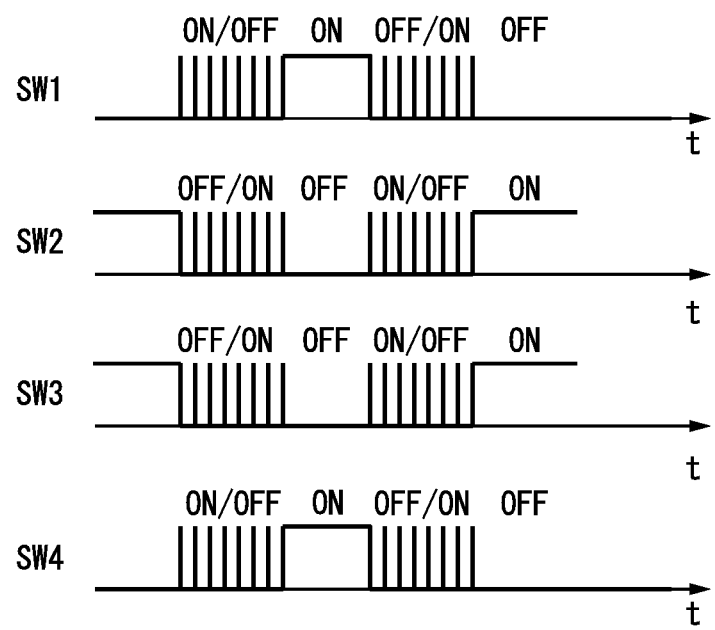
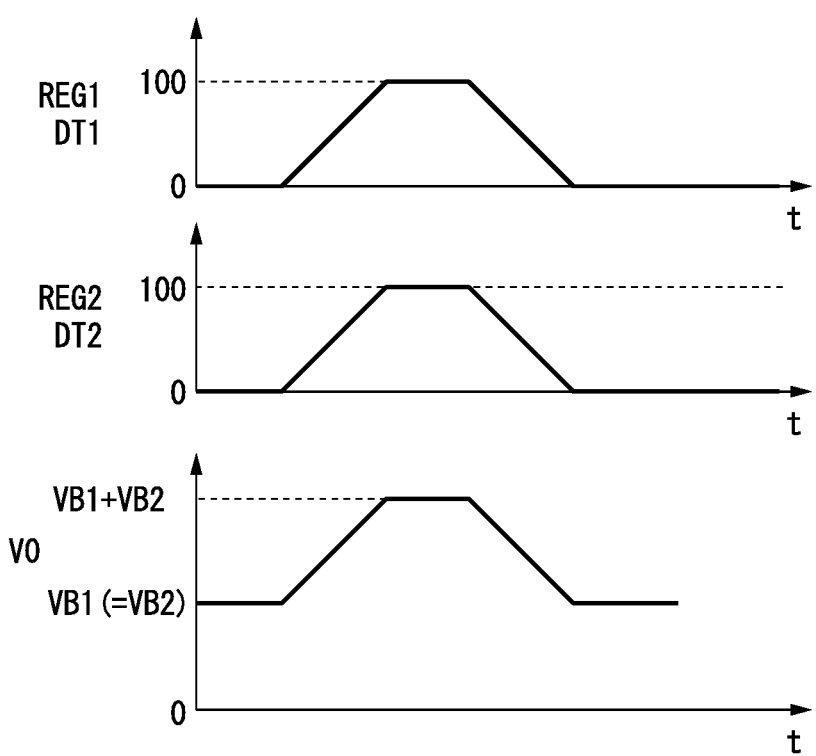

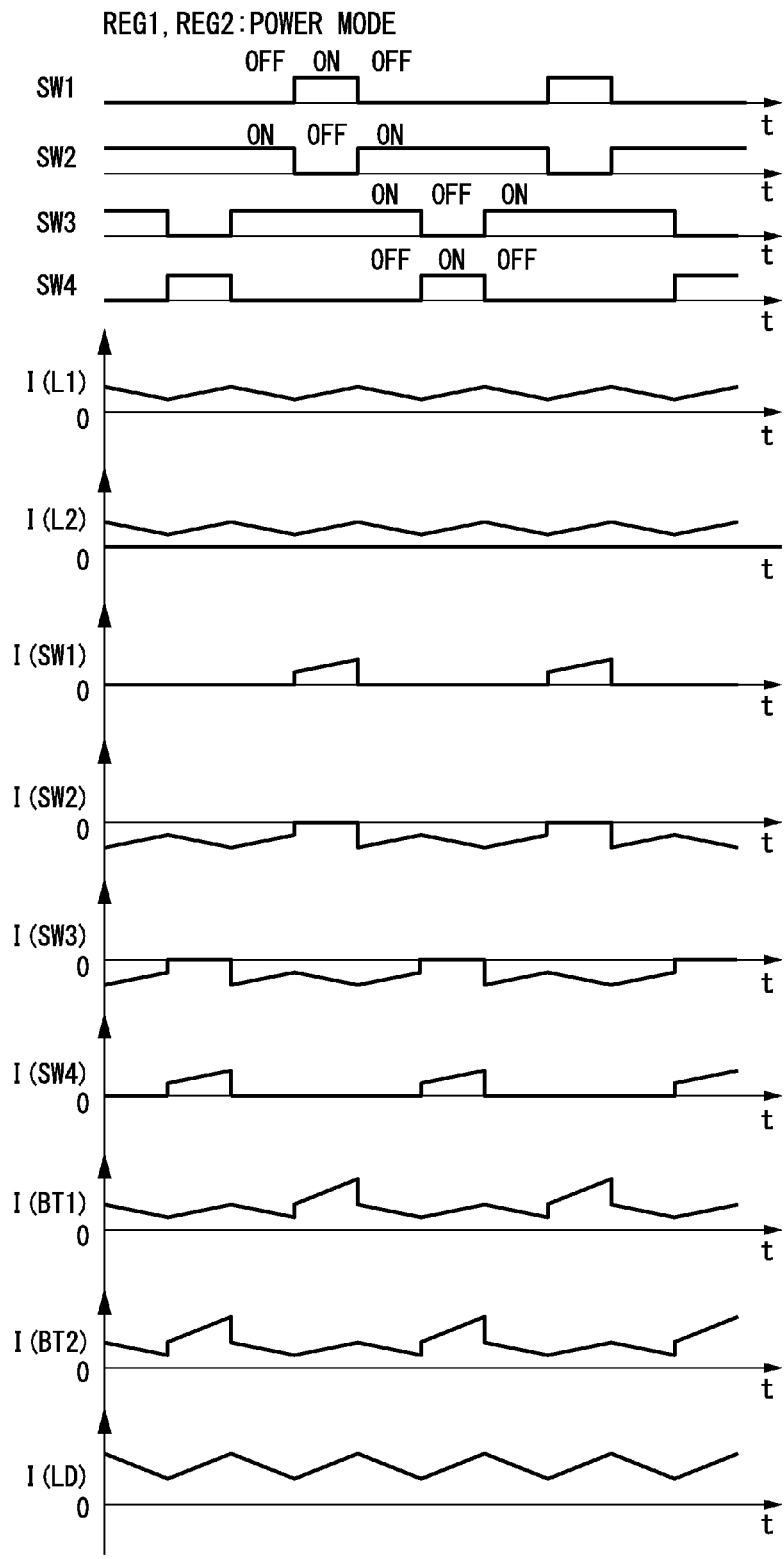

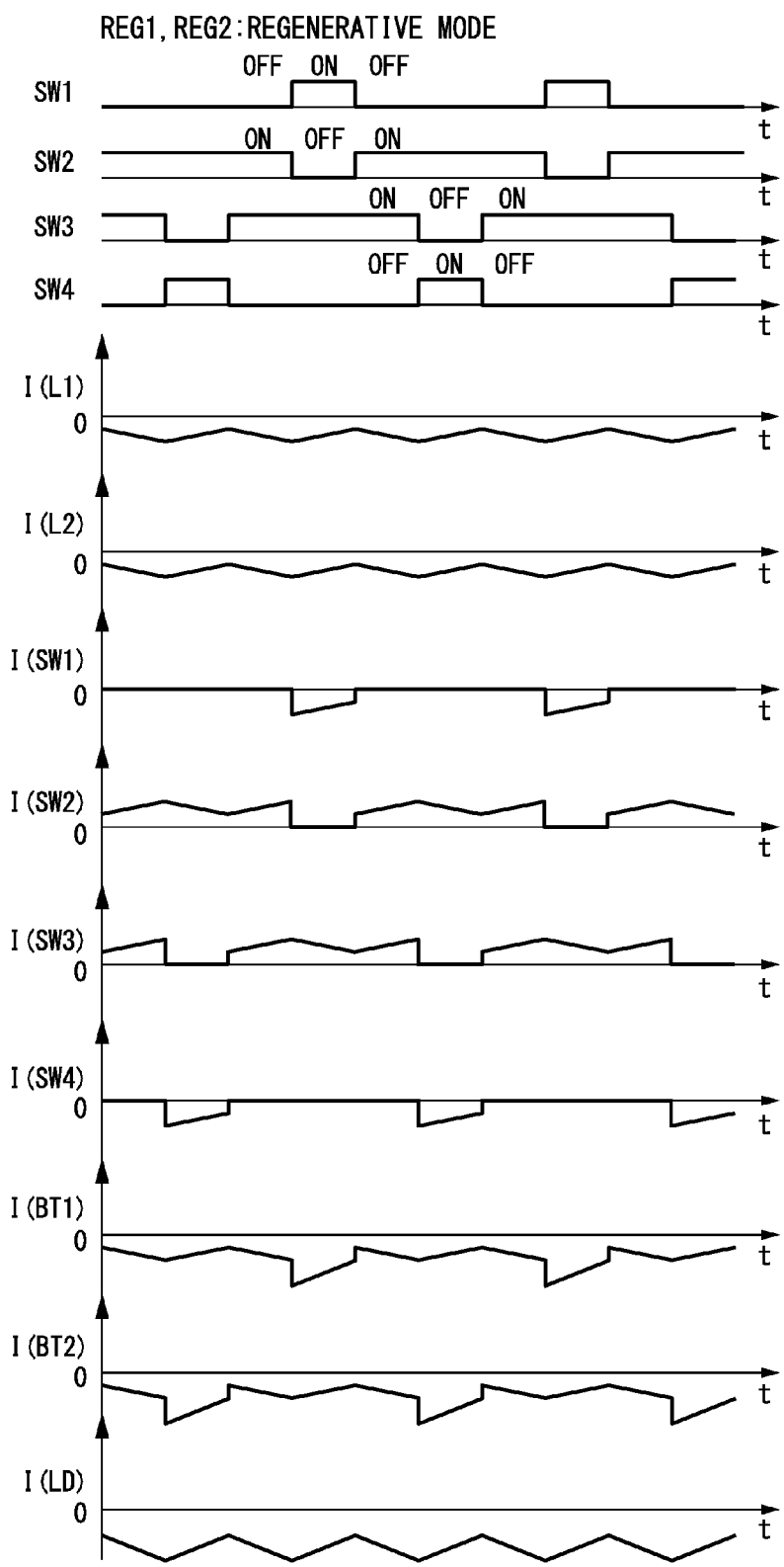

FIG. 13B
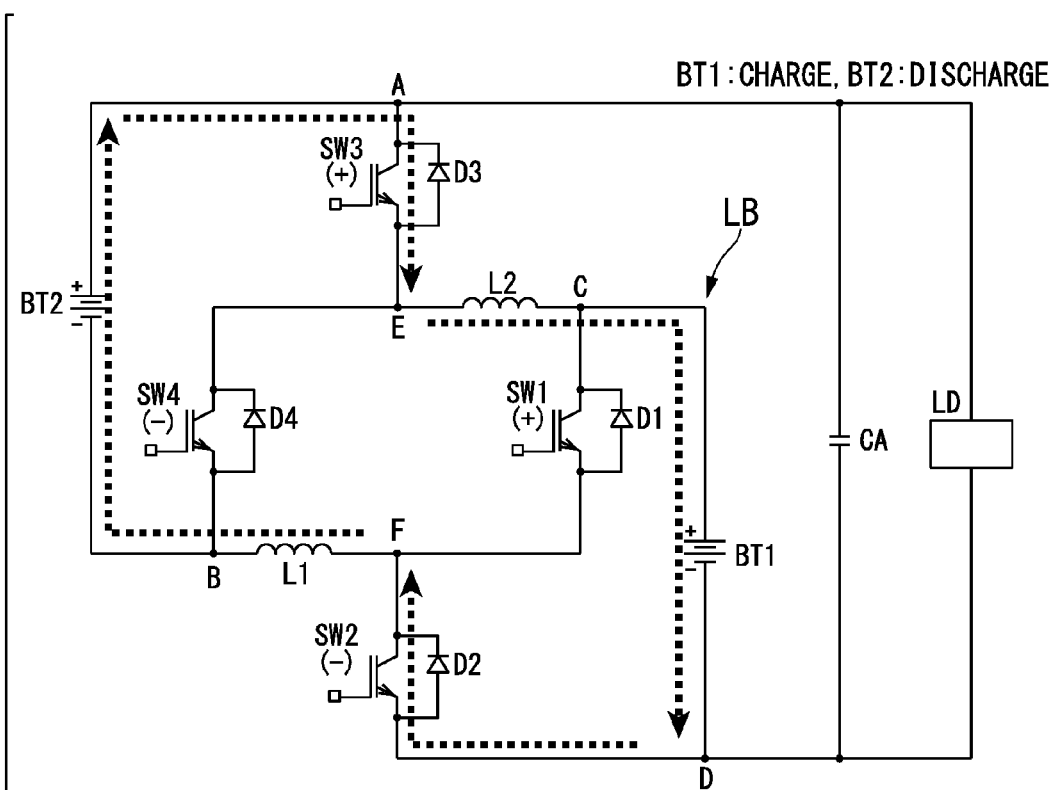
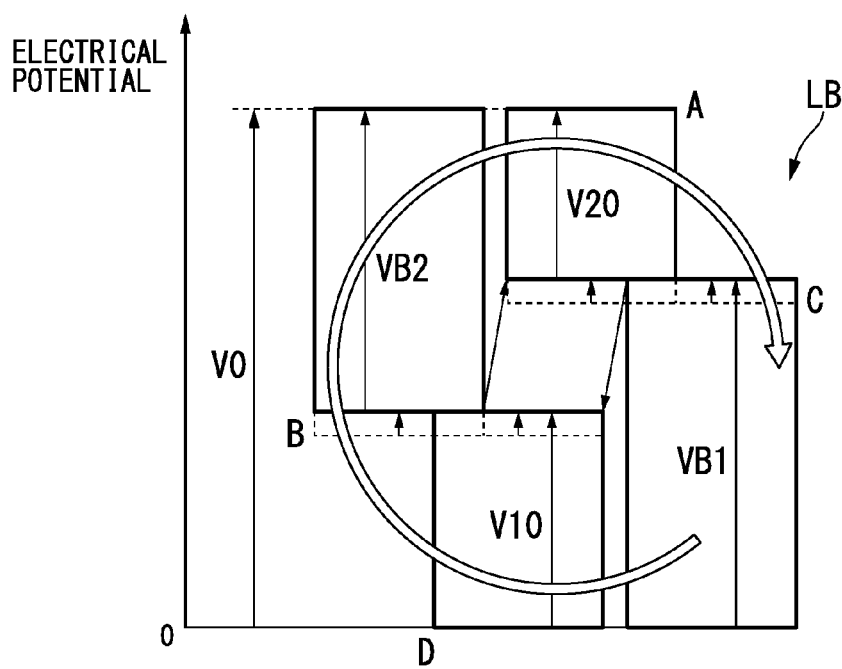

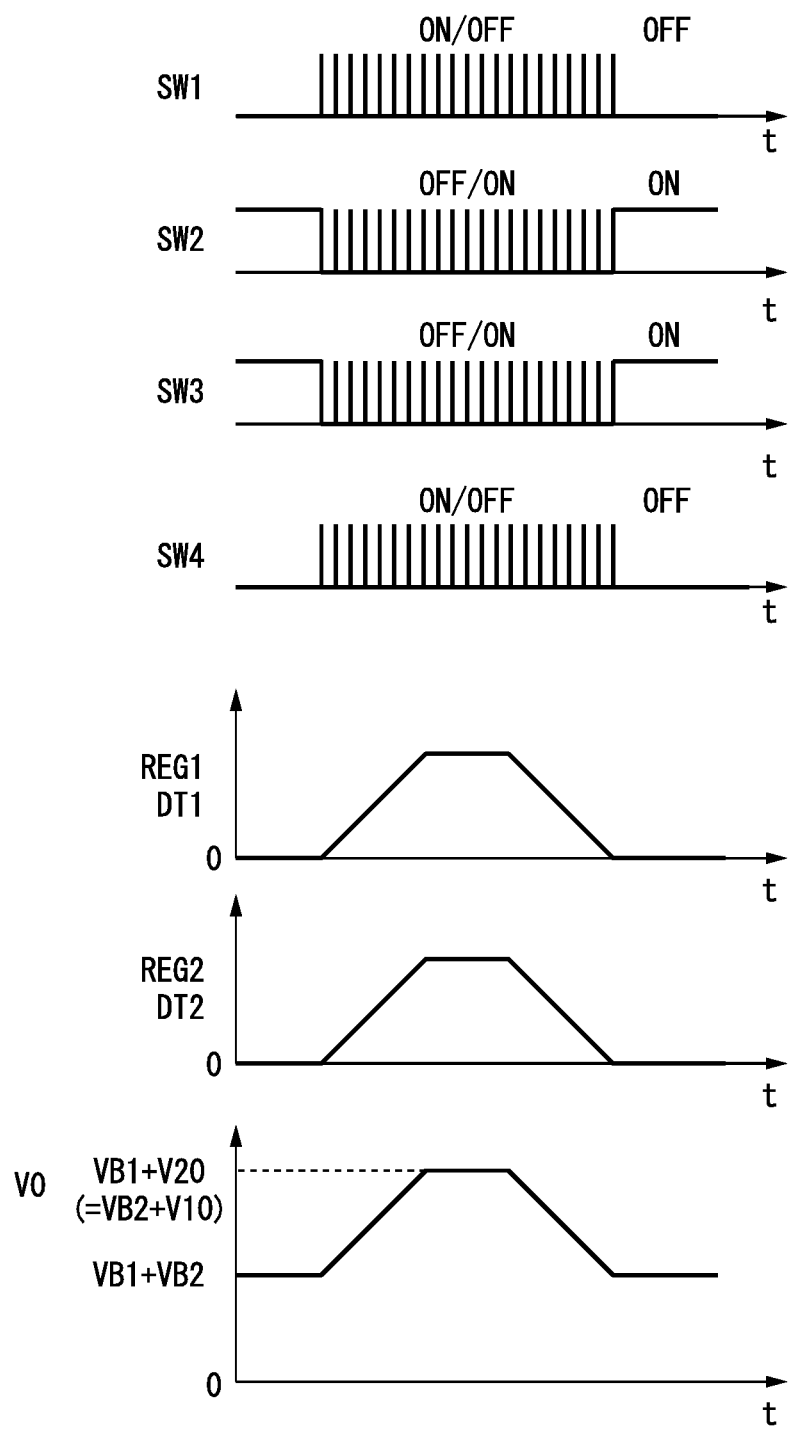

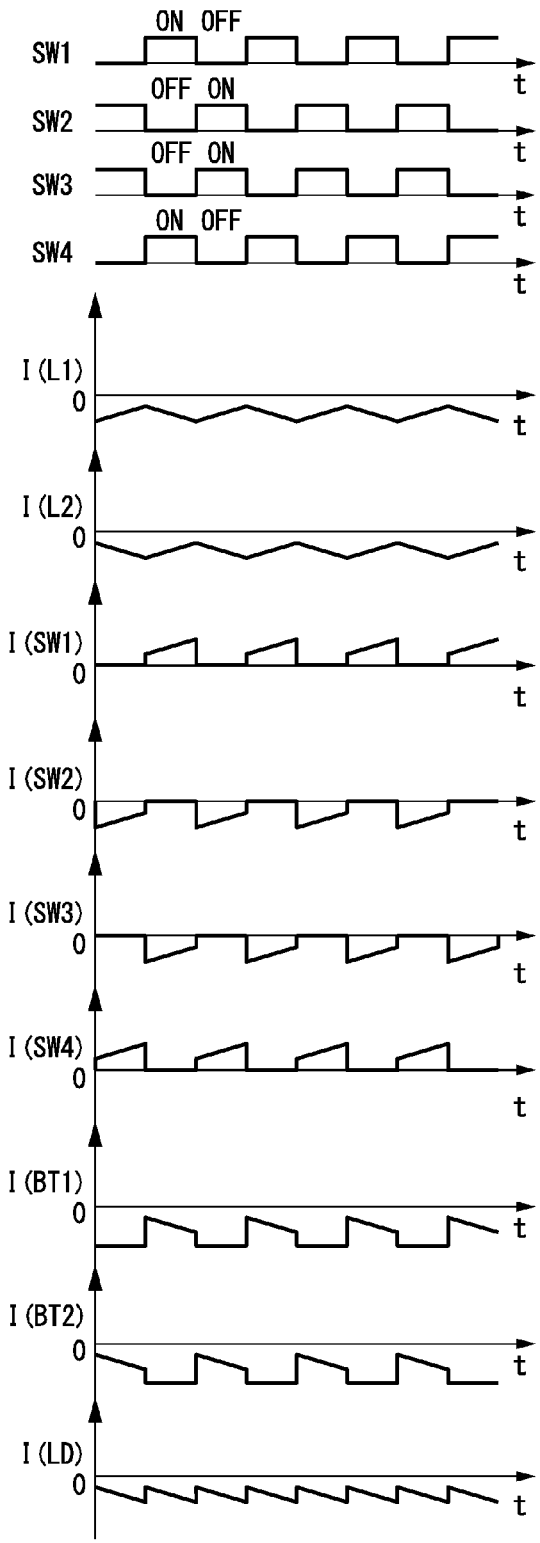

FIG. 28
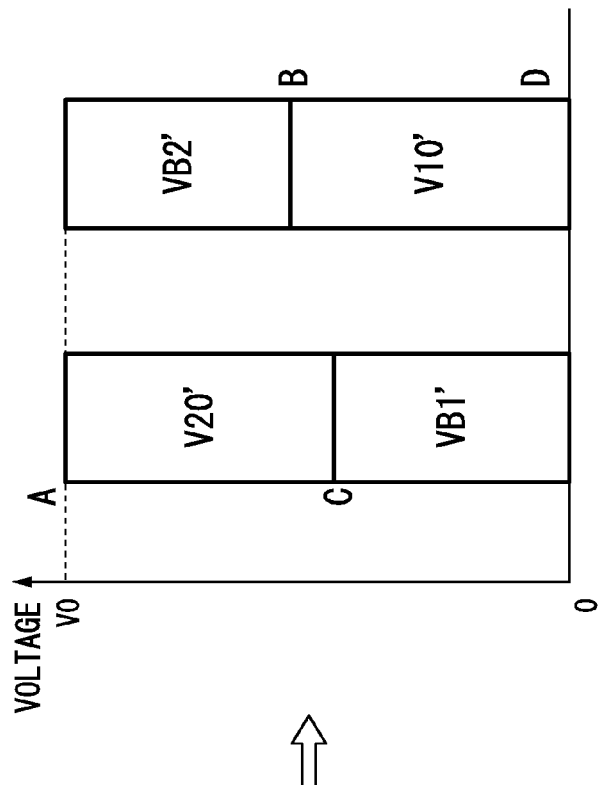
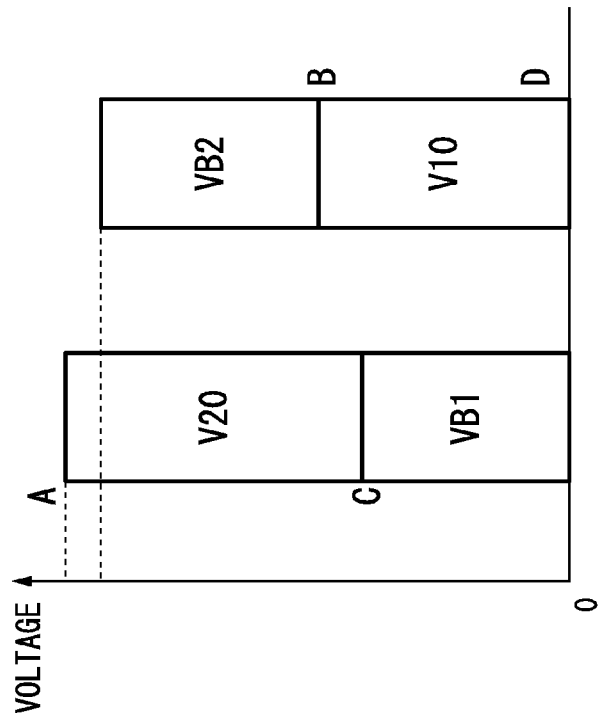

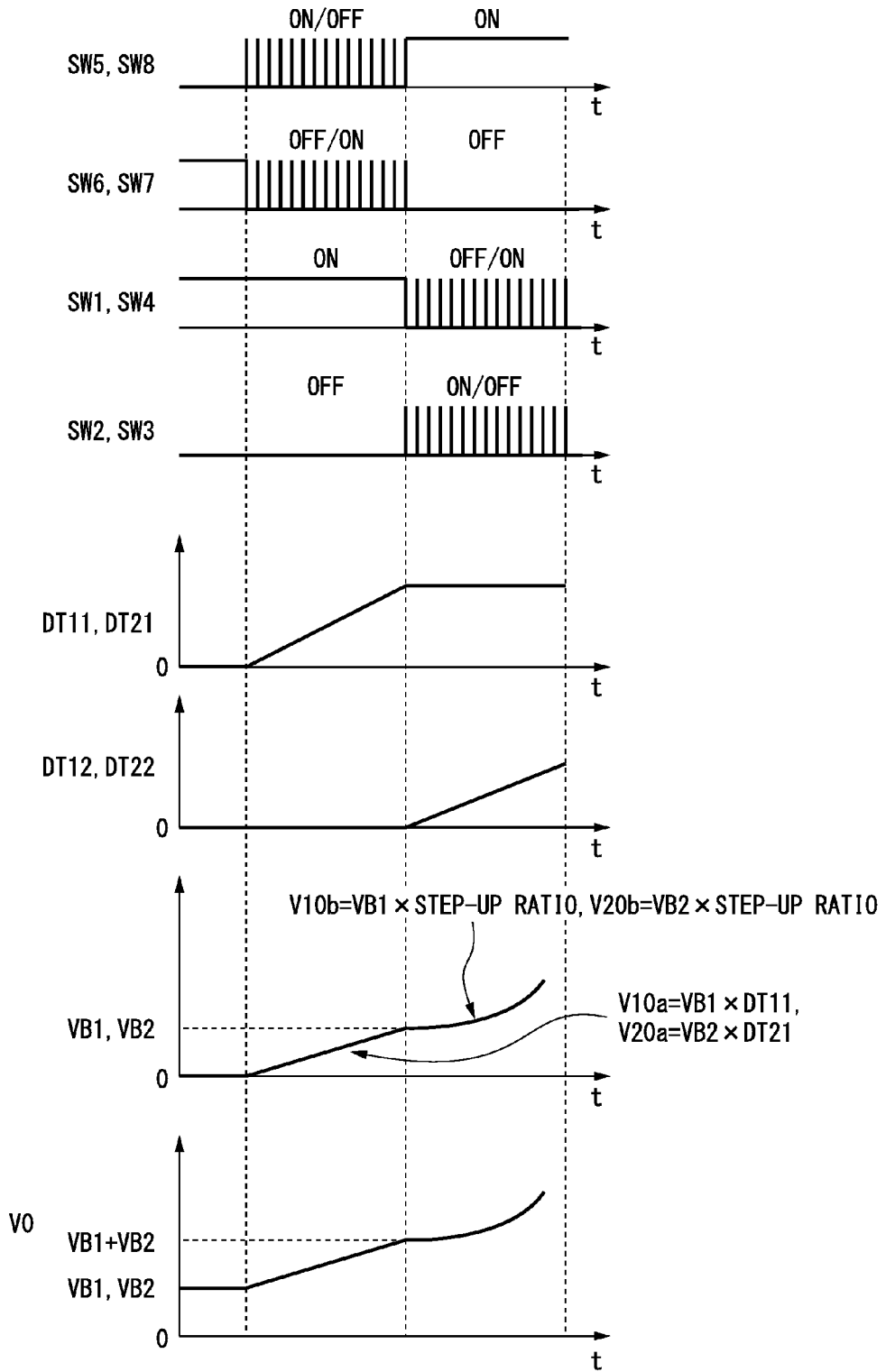

POWER DEVICE

BACKGROUND OF THE INVENTION

Field of the Invention

The present invention relates to a power device. Priority is claimed on Japanese Patent Application No. 2013-119939, filed Jun. 6, 2013, the content of which is incorporated herein by reference.

Description of Related Art

A power system which includes a DC-DC converter, two switches including first and second switches, and two power sources including first and second power sources has been known. The power system switches between a serial connection state where the first and second power sources are connected in series and a parallel connection state where the first and second power sources are connected in parallel based on ON/OFF state of the first and second switches, and connects the first and second power sources in the serial connection state or the parallel connection state with an electrical load, while the power system adjusts a voltage applied to the electrical load using the DC-DC converter (for example, refer to Japanese Unexamined Patent Application, First Publication No. 2012-152079).

A power device which includes a step-up converter, four relays including first to fourth relays, and two secondary batteries has been known. The power device switches between a serial connection state where the two secondary batteries are connected in series and a parallel connection state where the two secondary batteries are connected in parallel based on ON/OFF state of the first to fourth relays, and connects the two secondary batteries in the serial connection state or the parallel connection state with an electrical load, while the power device adjusts a voltage applied to the electrical load using the step-up converter (for example, refer to Japanese Unexamined Patent Application, First Publication No. 2012-60838).

According to the power system and power device of the related art described above, when the power device switches between the serial connection state and the parallel connection state, the first power source (or the secondary battery) is disconnected from the electrical load and step-up and step-down operations are performed only using the second power source (or the secondary battery). Thereby, a voltage needed to be supplied from the second power source (or the secondary battery) is increased. Therefore, it is not easy to control the balance of the voltage supplied from the first power source and that of the second power source (or the secondary batteries).

Moreover, if in addition to the electrical load, a load, which is connected to only the first power source (or the secondary battery), is provided as the power system of the related art described above, there is a possibility that the balance of the voltage supplied from the first power source (or the secondary battery) and that of the second power source (or the secondary battery) is unstable.

The present invention provides a power device which can easily set an arbitrary voltage and easily stabilize a balance of charge and discharge of a first power source and a second power source when the power device controls a voltage applied to a load by switching connection states of the first power source and the second power source for the load.

SUMMARY OF THE INVENTION (1) A power device according to one aspect of the present invention may include a first power source and a second power source, a load configured to be driven by power supplied from the first power source and the second power source, and a voltage control unit configured to control a voltage to be applied to the load. The voltage control unit may include a loop circuit, a plurality of switches configured to conduct a loop current to the loop circuit, and a first direct-current power converter circuit and a second direct-current power converter circuit. The loop circuit may include at least a first reactor and a second reactor. The first reactor and the second reactor may be connected each other in series. The plurality of switches may include a first switching group of switches and a second switching group of switches. The first direct-current power converter circuit may include the first reactor, and the first switching group. The first direct-current power converter circuit may be connected to the first power source. The second direct-current power converter circuit may include the second reactor, and the second switching group. The second direct-current power converter circuit may be connected to the second power source. The loop circuit may be formed by connecting the first direct-current power converter circuit and the second direct-current power converter circuit via common first and second connecting points.

(2) In the power device described in (1), the voltage control unit may be configured to generate the loop current which discharges the first power source and charges the second power source or the loop current which charges the first power source and discharges the second power source based on a duty of ON and OFF switching operations of each switch.

(3) In the power device described in (1) or (2), the voltage control unit may be configured to control the voltage, which is applied to the load, (a) to be an arbitral voltage in a range from a voltage of the first power source or a voltage of the second power source to a summed voltage of the voltage of the first power source and the voltage of the second power source, or (b) to be an arbitral voltage, which is equal to or more than the summed voltage of the voltage of the first power source and the voltage of the second power source, based on a duty of ON and OFF switching operations of each switch.

(4) In the power device described in any one of (1) to (3), the voltage control unit may include first to sixth nodes. A positive electrode of the second power source may be connected to the first node. A negative electrode of the second power source may be connected to the second node. A positive electrode of the first power source may be connected to the third node. A negative electrode of the first power source may be connected to the fourth node. A first end of the second reactor may be connected to the fifth node, and a second end of the second reactor may be connected to the third node. A first end of the first reactor may be connected to the sixth node, and a second end of the first reactor may be connected to the second node. The voltage control unit may include a first switch of the plurality of switches, a second switch of the plurality of switches, a third switch of the plurality of switches, and a fourth switch of the plurality of switches. A first end of the first switch may be connected to the third node, and a second end of the first switch may be connected to the sixth node. A first end of the second switch may be connected to the sixth node, and a second end of the second switch may be connected to the fourth node. A first end of the third switch may be connected to the first node and a second end of the third switch may be connected to the fifth node. A first end of the fourth switch may be connected to the fifth node, and a second end of the fourth switch may be connected to the second node. The first switching group of the first direct-current power converter circuit may include the first and second switches. The second switching group of the second direct-current power converter circuit may include the third and fourth switches. The first connecting point and second connecting point may be the second node and the third node, respectively.

(5) In the power device described in any one of (1) to (3), the voltage control unit may include first to sixth nodes. A positive electrode of the second power source may be connected to the first node. A negative electrode of the second power source may be connected to the second node. A positive electrode of the first power source may be connected to the third node. A negative electrode of the first power source may be connected to the fourth node. A first end of the second reactor may be connected to the fifth node, and a second end of the second reactor may be connected to the second node. A first end of the first reactor may be connected to the sixth node, and a second end of the first reactor may be connected to the third node. The voltage control unit may include, a first switch of the plurality of switches, a second switch of the plurality of switches, a third switch of the plurality of switches, and a fourth switch of the plurality of switches. A first end of the first switch may be connected to the second node, and a second end of the first switch may be connected to the sixth node. A first end of the second switch may be connected to the sixth node, and a second end of the second switch may be connected to the fourth node. A first end of the third switch may be connected to the first node, and a second end of the third switch may be connected to the fifth node. A first end of the fourth switch may be connected to the fifth node, and a second end of the fourth switch may be connected to the third node. The first switching group of the first direct-current power converter circuit may include the first and second switches. The second switching group of the second direct-current power converter circuit may include the third and fourth switches. The first connecting point and second connecting point may be the second node and the third node, respectively.

(6) In the power device described in (5), each first and fourth switch may be a bidirectional switch. The voltage control unit may include a fifth switch of the plurality of switches, and a sixth switch of the plurality of switches. A first end of the fifth switch may be connected to the first node, and a second end of the fifth switch may be connected to the sixth node. A first end of the sixth switch may be connected to the fifth node, and a second end of the sixth switch may be connected to the fourth node. The first switching group of the first direct-current power converter circuit may include the first, second, and fifth switches. The second switching group of the second direct-current power converter circuit may include the third, fourth, and sixth switches.

(7) In the power device described in (5), the voltage control unit may include a seventh node provided between the second node and the second reactor, an eighth node provided between the third node and the first reactor, a fifth switch of the plurality of switches, a sixth switch of the plurality of switches, a seventh switch of the plurality of switches, and an eighth switch of the plurality of switches. A first end of the fifth switch may be connected to the third node, and a second end of the fifth switch may be connected to the eighth node. A first end of the sixth switch may be connected to the eighth node, and a second end of the sixth switch may be connected to the fourth node. A first end of the seventh switch may be connected to the first node, and a second end of the seventh switch may be connected to the seventh node. A first end of the eighth switch may be connected to the seventh node, and a second end of the eighth switch may be connected to the second node. The first switching group of the first direct-current power converter circuit may include the first, second, fifth, and sixth switches. The second switching group of the second direct-current power converter circuit may include the third, fourth, seventh, and eighth switches.

(8) In the power device described in any one of (1) to (7), the first reactor and the second reactor may be magnetically coupled.

(9) In the power device described in (8), the first reactor and the second reactor may be provided to perform magnetic-field cancellation.

(10) In the power device described in (3), the voltage control unit may be configured (a) to control the switching operation using the duty represented by the voltage of the first power source when the voltage control unit steps down the voltage of the first power source and outputs the step-down voltage from the first direct-current power converter circuit or when the voltage control unit steps up the voltage of the second power source and outputs the step-up voltage from the second direct-current power converter circuit, and (b) to control the switching operation using the duty represented by the voltage of the second power source when the voltage control unit steps down the voltage of the second power source and outputs the step-down voltage from the second direct-current power converter circuit or when the voltage control unit steps up the voltage of the first power source and outputs the step-up voltage from the first direct-current power converter circuit.

According to the power device of the aspect described in (1), by flowing the loop current, which acts as a so-called energy buffer for a transport of an electric charge between the first power source and the second power source, through the loop circuit, a balance of charge and discharge of each first power source and the second power source can be easily stabilized.

Moreover, according to the power device of the aspect described in (2), by controlling the duty of the switching operation of each switch, the balance of charge and discharge of each first power source and second power source can be stabilized almost automatically, without requiring, for example, a feedback control.

Moreover, according to the power device of the aspect described in (3), by controlling the duty of the switching operation of each switch, an arbitrary operation point can be easily set when the voltage is adjusted.

Moreover, according to the power device of the aspect described in (4), by controlling the duty of the switching operation of each switch, the voltage to be applied to the load can be easily set to be an arbitrary voltage in a range from the voltage of the first power source or the voltage of the second power source to the summed voltage of the voltage of the first power source and the voltage of the second power source.

Moreover, according to the power device of the aspect described in (5), by controlling the duty of the switching operation of each switch, the voltage to be applied to the load can be easily set to be an arbitrary voltage which is equal to or more than the summed voltage of the voltage of the first power source and the voltage of the second power source.

Moreover, according to the power device of the aspect described in (6) or (7), by controlling the duty of the switching operation of each switch, the voltage to be applied to the load can be easily set to be an arbitrary voltage in a range from the voltage of the first power source or the voltage of the second power source to the summed voltage of the voltage of the first power source and the voltage of the second power source, or to be an arbitrary voltage which is equal to or more than the summed voltage of the voltage of the first power source and the voltage of the second power source.

Moreover, according to the power device of the aspect described in (8), the frequency of each current flowing through the first reactor and second reactor can be greater than a switching frequency, and a frequency of magnetostrictive noise generated in the first and second reactors can be increased to outside the audible band.

Moreover, according to the power device of the aspect described in (9), a generation of magnetic saturation in the first and second reactors is suppressed. Thereby, each element can be reduced in size.

Moreover, according to the power device of the aspect described in (10), a divergence of control responses can be prevented when the voltage to be applied to the load is adjusted.

BRIEF DESCRIPTION OF THE DRAWINGS

FIG. 6B is a diagram showing ON/OFF of each switching device and a variation of each current when the power device according to the first embodiment of the present invention is in the regenerative operation of the second control mode.

FIG. 7 is a diagram showing a variation of ON/OFF of each switching device, a variation of each first duty and second duty, and a variation of a load voltage when the power device according to the first embodiment of the present invention is in the second control mode.

FIG. 11A is a diagram showing ON/OFF of each switching device and a variation of each current when the power device according to the first embodiment of the present invention is in the powering operation of the fourth control mode.

FIG. 11B is a diagram showing ON/OFF of each switching device and a variation of each current when the power device according to the first embodiment of the present invention is in the regenerative operation of the fourth control mode.

FIG. 13B is a diagram showing a loop current flow when the power device according to the first embodiment of the present invention is in the fifth control mode.

FIG. 23 is a diagram showing a variation of ON/OFF of each switching device, the variation of each first duty and second duty, and a variation of a load voltage when the power device according to the second embodiment of the present invention is in the second control mode.

FIG. 25B is a diagram showing ON/OFF of each switching device and the variation of each current when the power device according to the second embodiment of the present invention is in regenerative operation of the third control mode.

FIG. 28 is a diagram showing a variation of each first and second voltage, and the variation of each output voltage when the power device according to the second embodiment of the present invention is in a fifth control mode.

FIG. 38 is a diagram showing a variation of ON/OFF of each switching device, a variation of each first step-down duty and second step-down duty, a variation of each first step-up duty and second step-up duty, and the variation of each voltage when the power device according to the second variation of the second embodiment of the present invention is in a second control mode.

DESCRIPTION OF EMBODIMENTS

Hereinafter, a power device according to an embodiment of the present invention will be described with reference to the attached drawings.

The power device according to the embodiment of the present invention provides a direct-current power to a load such as an inverter. The inverter controls a power mode and a regenerative mode of an electric motor which can produce, for example, a drive force to run a vehicle.

First Embodiment

Figure 1:
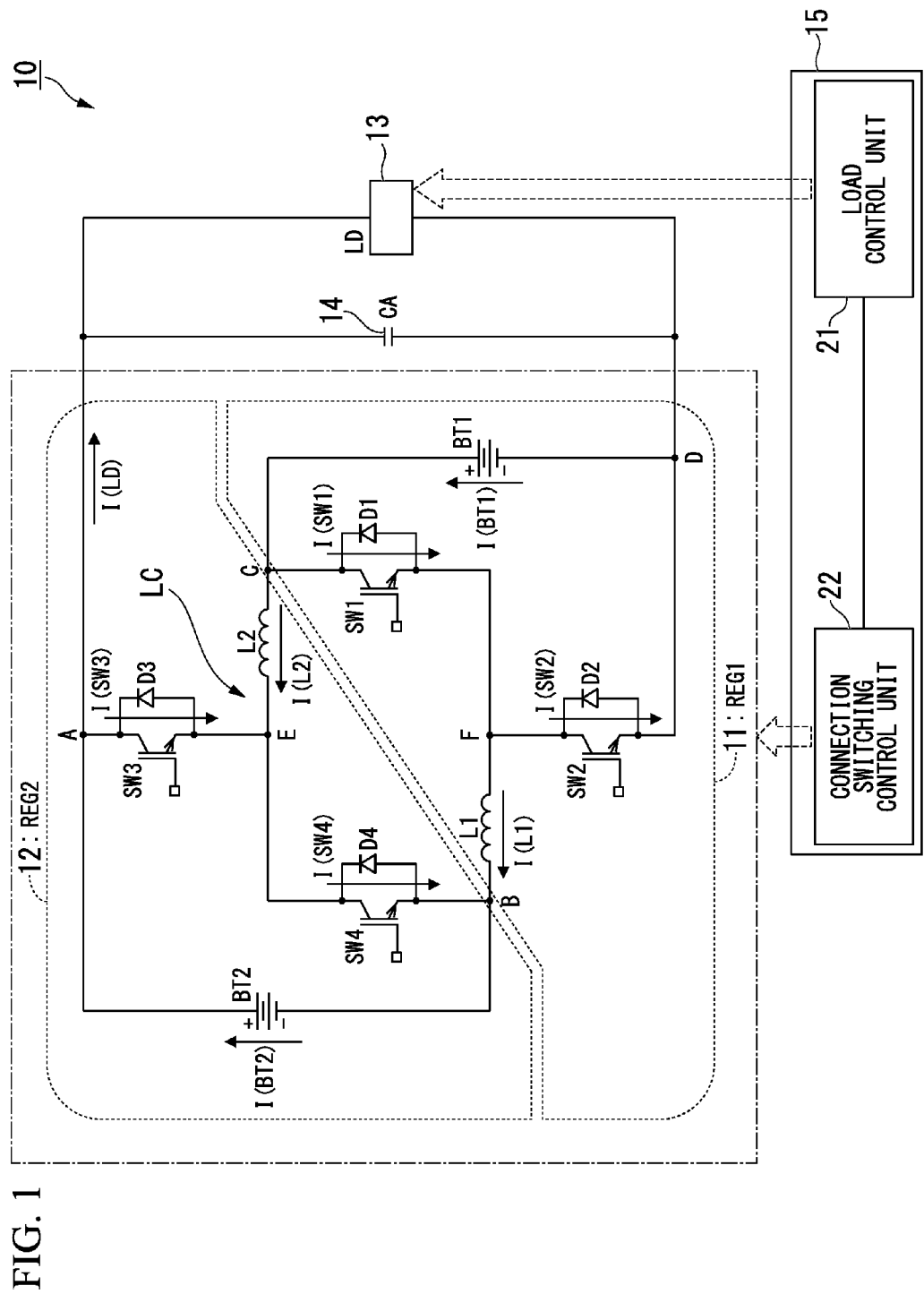
FIG. 1 is a configuration diagram showing a power device according to a first embodiment of the present invention.

As shown in FIG. 1, a power device 10 according to a first embodiment of the present invention includes a first direct-current power converter circuit (REG1) 11, a second direct-current power converter circuit (REG2) 12, a load (LD) 13, a capacitor (CA) 14, and a control device 15. The load 13 can be driven using a direct-current power supplied from the first and second direct-current power converter circuits 11 and 12, and supply a generated direct-current power to the first and second direct-current power converter circuits 11 and 12. The capacitor (CA) 14 is connected to both ends of the load 13.

The first direct-current power converter circuit (REG1) 11 includes a first power source BT1 such as a battery, first and second switching devices SW1 and SW2 such as IGBT (Insulated Gate Bipolar mode Transistor), which configure a first switch group, and a first reactor L1.

The second direct-current power converter circuit (REG2) 12 includes a second power source BT2 such as a battery, third and fourth switching devices SW3 and SW4 such as IGBT, which configure a second switch group, and a second reactor L2.

A voltage difference between a first voltage VB1 output from the first power source BT1 and a second voltage VB2 output from the second power source BT2 is a predetermined voltage difference Vd (=VB2−VB1).

The power device 10 includes first to sixth nodes A to F.

A positive electrode of the second power source BT2 is connected to the first node A, and a negative electrode of the second power source BT2 is connected to the second node B. A positive electrode of the first power source BT1 is connected to the third node C, and a negative electrode of the first power source 13T1 is connected to the fourth node D. One end of the second reactor L2 is connected to the fifth node E, and the other end of the second reactor L2 is connected to the third node C. One end of the first reactor L1 is connected to the sixth node F, and the other end of the first reactor L1 is connected to the second node B.

A collector and an emitter of the first switching device SW1 are connected to the third node C and the sixth node F, respectively. A collector and an emitter of the second switching device SW2 are connected to the sixth node F and the fourth node D, respectively. A collector and an emitter of the third switching device SW3 are connected to the first node A and the fifth node E, respectively. A collector and an emitter of the fourth switching device SW4 are connected to the fifth node E and the second node B, respectively. Diodes D1 to D4 are connected between the emitter and collector of the switching devices SW1 to SW4, respectively. The direction from the emitter to the collector of each switching device SW1 to SW4 is a forward direction of each diode D1 to D4.

The first and second direct-current power converter circuits 11 and 12 are connected each other via the second node B and the third node C, which are common connecting points. A loop circuit LC is formed by connecting at least the first and second reactors L1 and L2 in series.

In more detail, in the loop circuit LC, the first reactor L1 and the first switching device SW1 included in the first direct-current power converter circuit 11 and the second reactor L2 and the fourth switching device SW4 included in the second direct-current power converter circuit 12 are connected in series. The first reactor L1 and the first switching device SW1 included in the first direct-current power converter circuit 11 are connected in series, via the sixth node F, between the second node B and the third node C. The second reactor L2 and the fourth switching device SW4 included in the second direct-current power converter circuit 12 are connected in series, via the fifth node E, between the third node C and the second node B.

The first and second direct-current power converter circuits 11 and 12 are controlled based on pulse-width-modulated signals (PWM signals) output from the control device 15 and input into a gate of each switching device SW1 to SW4 so that the first and second direct-current power converter circuits 11 and 12 are driven independently from each other.

In more detail, the first and second direct-current power converter circuits 11 and 12 are controlled so that a switching operation for at least one of a pair of the first and second switching devices SW1 and SW2 included in the first direct-current power converter circuit 11 and a pair of the third and fourth switching devices SW3 and SW4 included in the second direct-current power converter circuit 12 is performed. In this switching operation, each switching device SW1 to SW4 is switched between close (ON) and open (OFF).

Figure 2A:
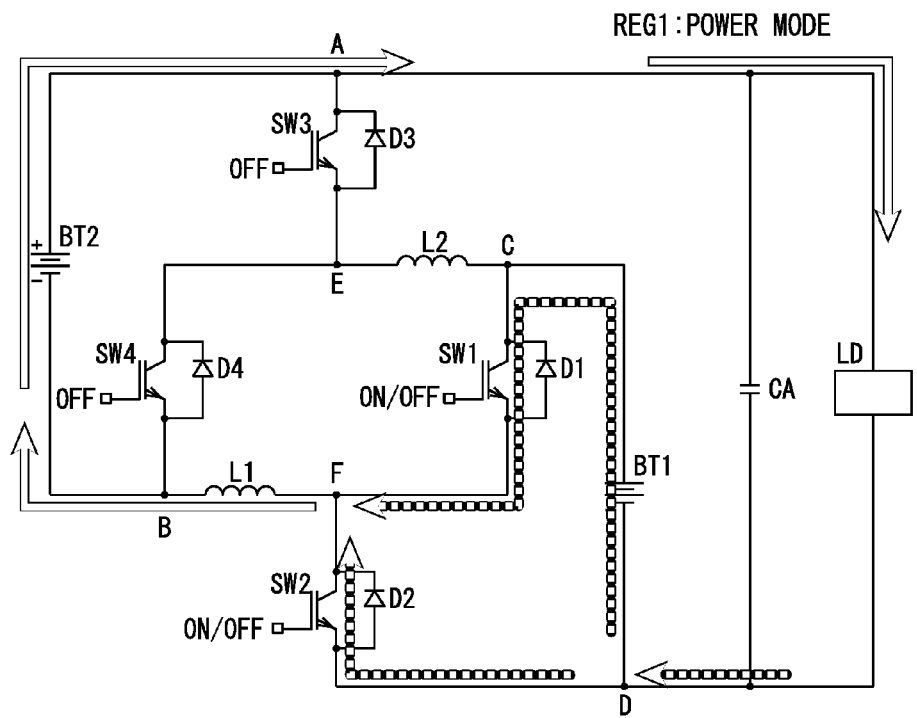
FIG. 2A is a diagram showing ON/OFF of each switching device and a current flow when a first direct-current power converter circuit included in the power device according to the first embodiment of the present invention is in a power mode.
Figure 3A:
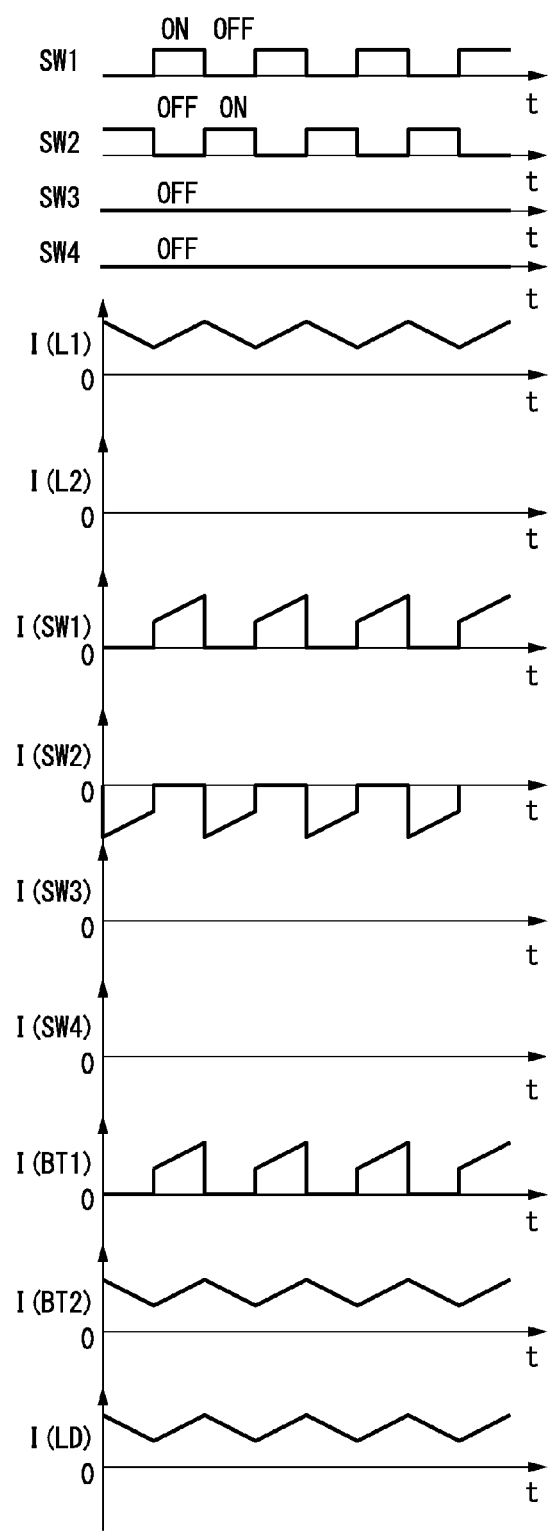
FIG. 3A is a diagram showing ON/OFF of each switching device and a variation of each current when the first direct-current power converter circuit included in the power device according to the first embodiment of the present invention is in the power mode.

For example, as shown in FIGS. 2A and 3A, when the first direct-current power converter circuit 11 is in a power mode where the first direct-current power converter circuit 11 supplies a direct-current power to the load 13, the first switching device SW1 is turned on and the second switching device SW2 is turned off. Thereby, current flows into the load 13 via the first power source BT1, the first switching device SW1, the first reactor L1, and the second power source BT2 in series. On the other hand, by turning off the first switching device SW1 and turning on the second switching device SW2, a circulating current flows via the second switching device SW2 and the second diode D2, the first reactor L1, and the second power source BT2 in series.

Figure 2B:
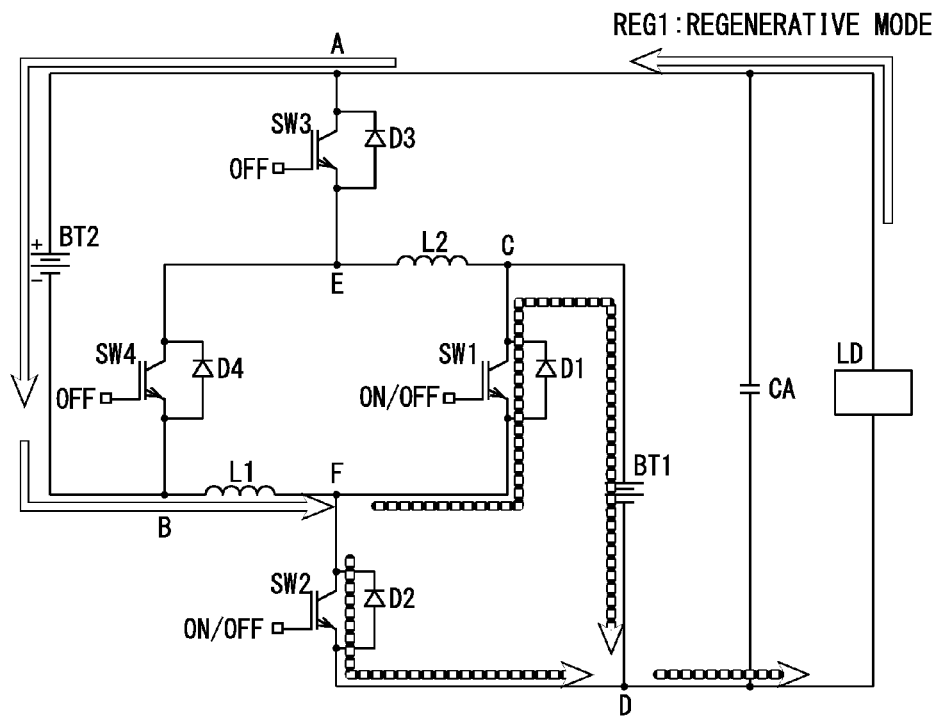
FIG. 2B is a diagram showing ON/OFF of each switching device and a current flow when the first direct-current power converter circuit included in the power device according to the first embodiment of the present invention is in a regenerative mode.
Figure 3B:
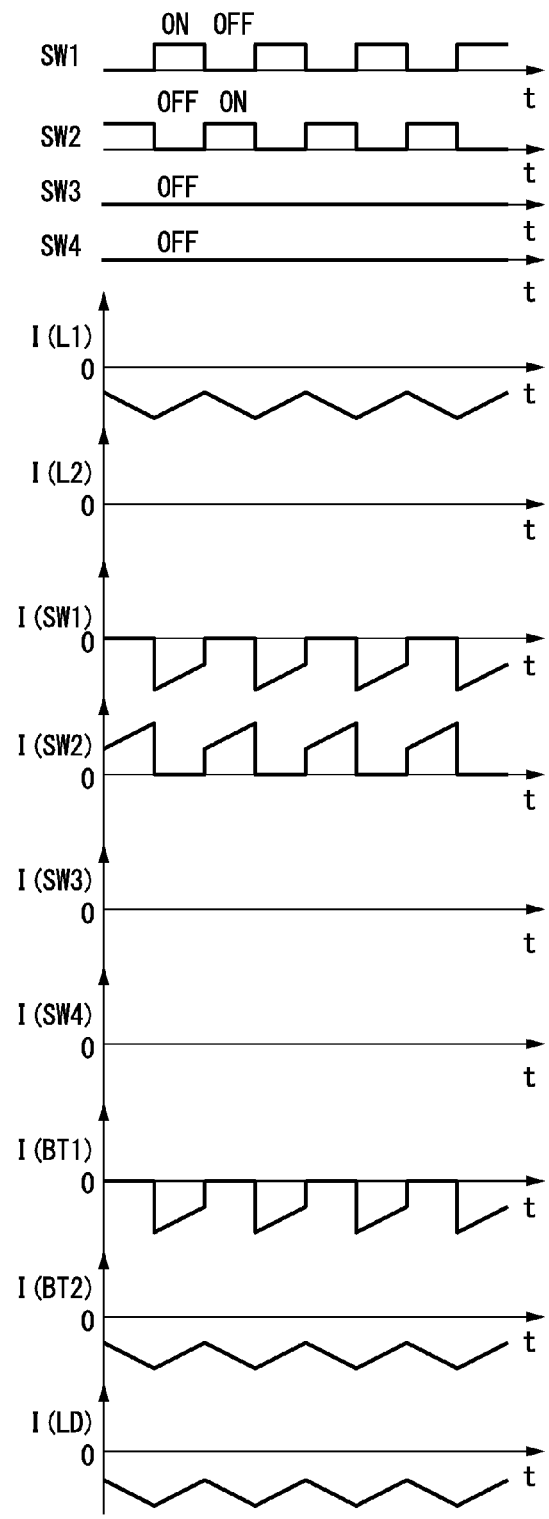
FIG. 3B is a diagram showing ON/OFF of each switching device and a variation of each current when the first direct-current power converter circuit included in the power device according to the first embodiment of the present invention is in the regenerative mode.

For example, as shown in FIGS. 2B and 3B, when the first direct-current power converter circuit 11 is in a regenerative mode where a direct-current power is supplied from to the load 13, the first switching device SW1 is turned off and the second switching device SW2 is turned on. Thereby, current flows via the second power source BT2, the first reactor L1, and the second switching device SW2 in series. On the other hand, by turning on the first switching device SW1 and turning off the second switching device SW2, current flows via the second power source BT2, the first reactor L1, and the first switching device SW1 and the first diode D1, and the first power source BT1 in series.

Figure 2C:
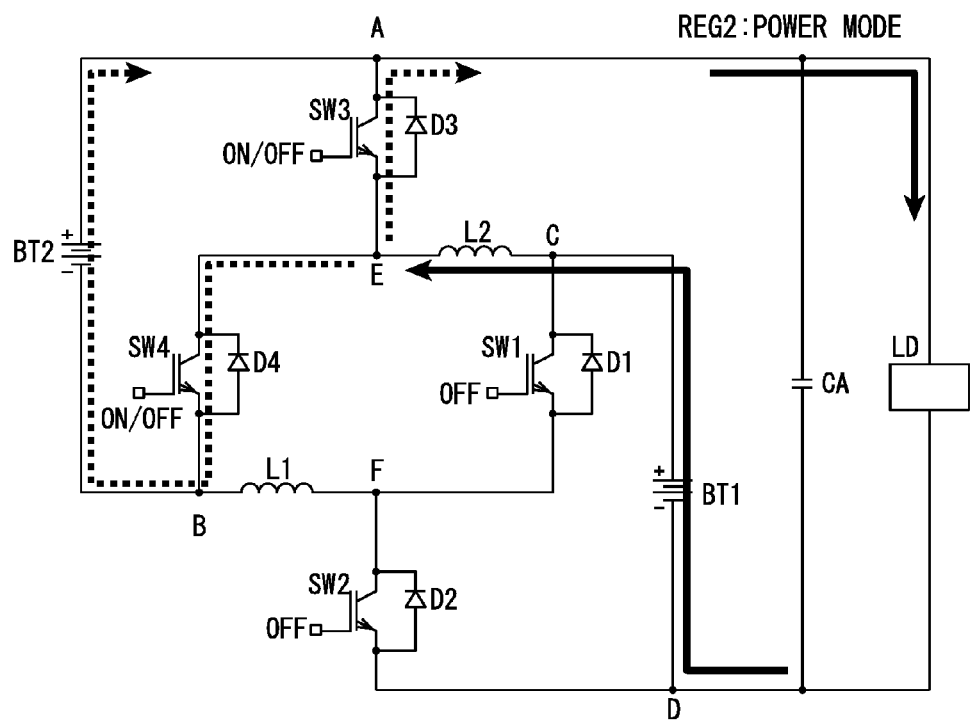
FIG. 2C is a diagram showing ON/OFF of each switching device and a current flow when a second direct-current power converter circuit included in the power device according to the first embodiment of the present invention is in a power mode.
Figure 3C:
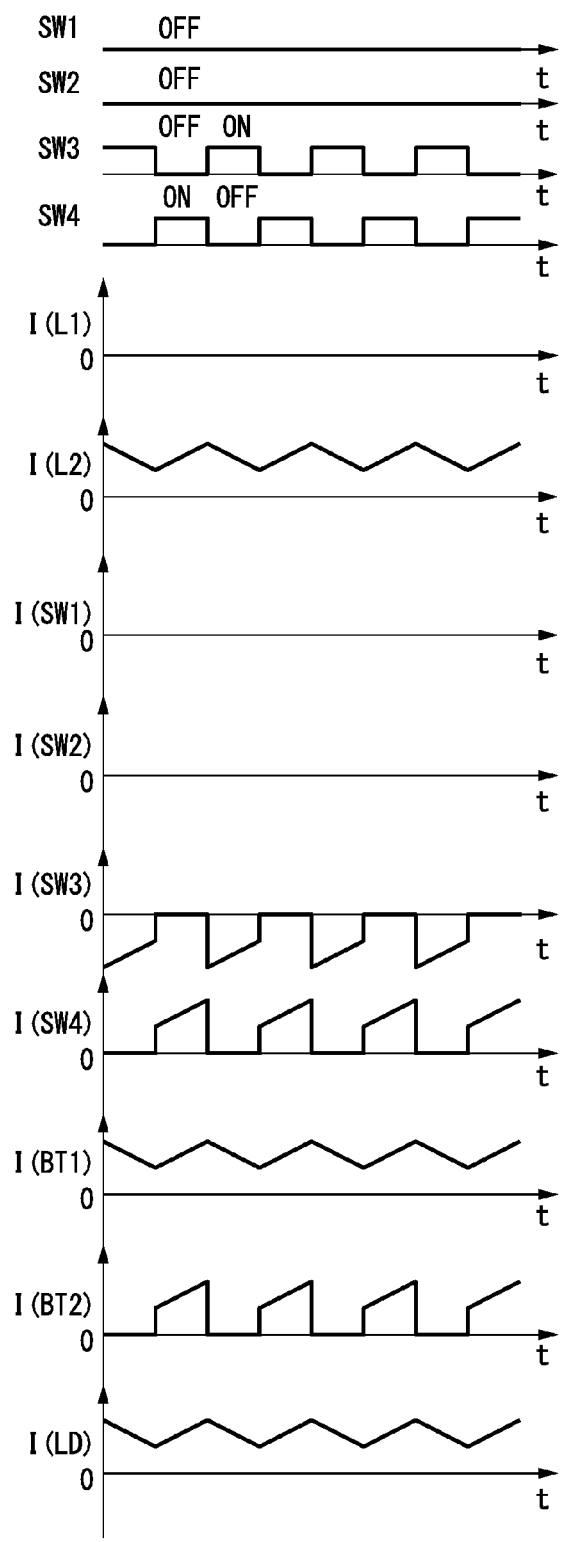
FIG. 3C is a diagram showing ON/OFF of each switching device and the variation of each current when the second direct-current power converter circuit included in the power device according to the first embodiment of the present invention is in the power mode.

For example, as shown in FIGS. 2C and 3C, when the second direct-current power converter circuit 12 is in a power mode where the second direct-current power converter circuit 12 supplies a direct-current power to the load 13, the fourth switching device SW4 is turned on and the third switching device SW3 is turned off. Thereby, current flows into the load 13 via the first power source BT1, the second reactor L2, the fourth switching device SW4, and the second power source BT2 in series. On the other hand, by turning off the fourth switching device SW4 and turning on the third switching device SW3, a circulating current flows via the first power source BT1, the second reactor L2, and the third switching device SW3 and the third diode D3 in series.

Figure 2D:
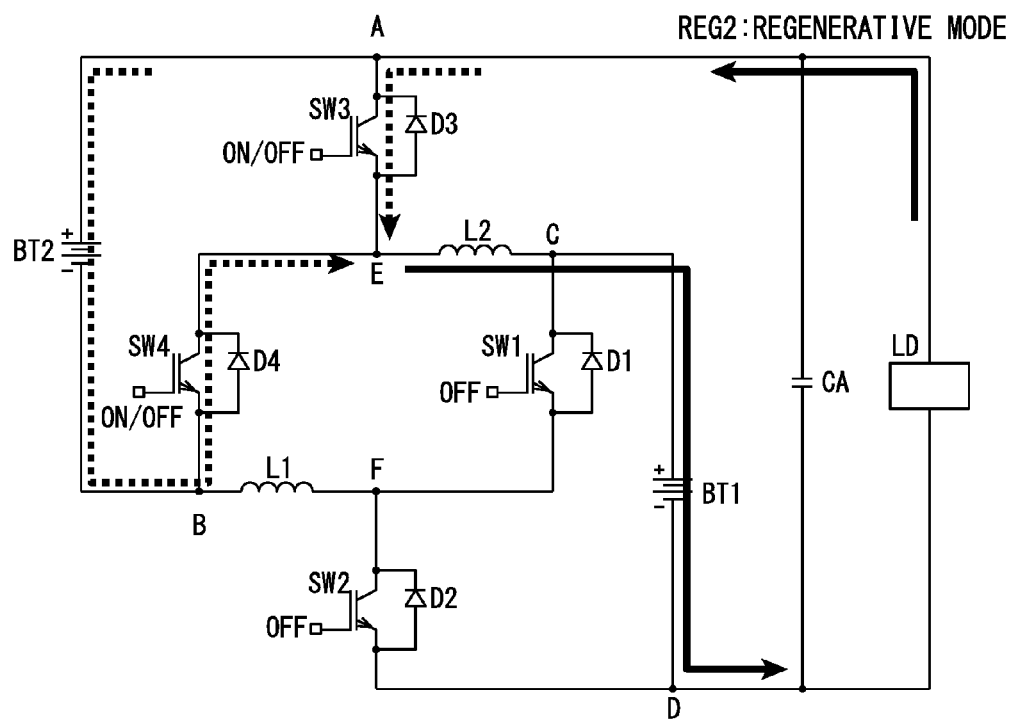
FIG. 2D is a diagram showing ON/OFF of each switching device and a current flow when the second direct-current power converter circuit included in the power device according to the first embodiment of the present invention is in a regenerative mode.
Figure 3D:
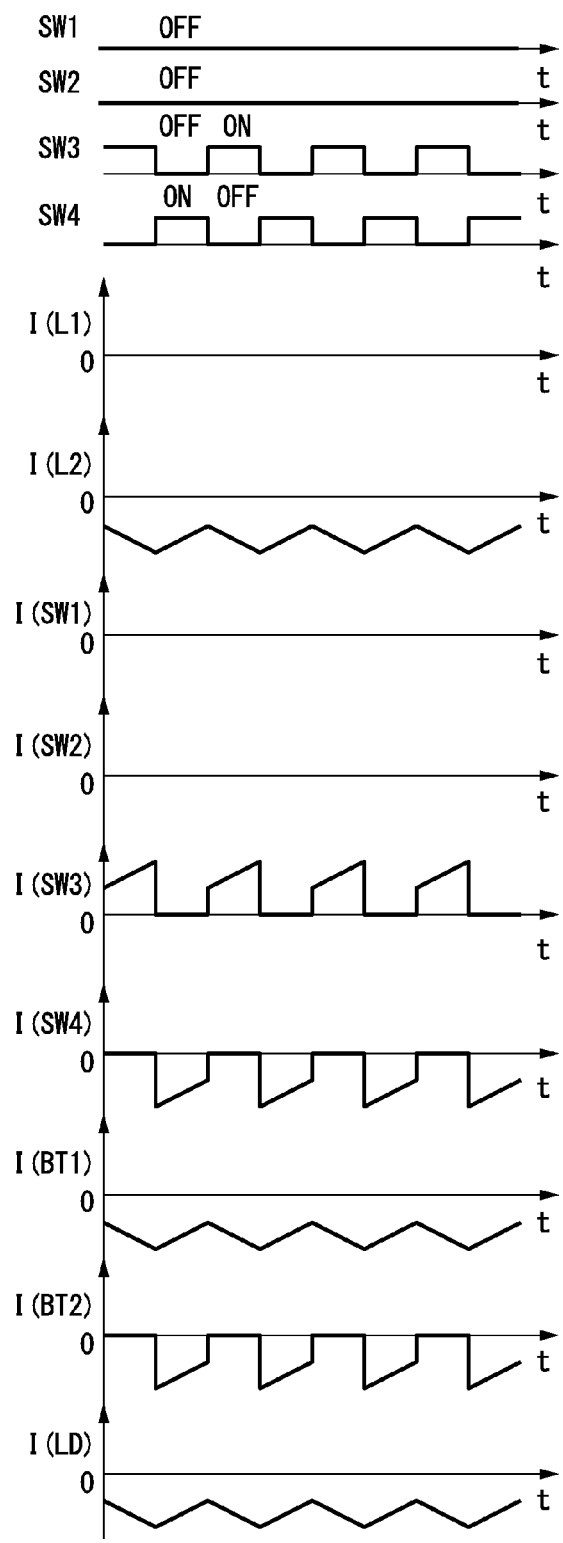
FIG. 3D is a diagram showing ON/OFF of each switching device and a variation of each current when the second direct-current power converter circuit included in the power device according to the first embodiment of the present invention is in the regenerative mode.

For example, as shown in FIGS. 2D and 3D, when the second direct-current power converter circuit 12 is in a regenerative mode where a direct-current power is supplied from to the load 13, the fourth switching device SW4 is turned off and the third switching device SW3 is turned on. Thereby, current flows via the third switching device SW3, the second reactor L2, the first power source BT1 in series. On the other hand, by turning on the fourth switching device SW4 and turning off the third switching device SW3, current flows via the second power source BT2, the fourth switching device SW4 and the fourth diode D4, the second reactor L2, and the first power source BT1 in series.

In a current waveform based on a time t shown in FIGS. 3A to 3D, as shown in FIG. 1, a positive direction of a current (a first reactor current) I(L1) flowing through the first reactor L1 is from the sixth node F to the second node B. A positive direction of a current (a second reactor current) I(L2) flowing through the second reactor L2 is from the third node C to the fifth node E.

A positive direction of summed currents I(SW1) to I(SW4) of currents flowing through the switching devices SW1 to SW4 and the diodes D1 to D4, respectively, is from the collector to the emitter. A positive direction of each current I(BT1) and I(BT2) flowing through first and second power sources BT1 and BT2 is from the negative electrode to the positive electrode. A positive direction of a summed current I(LD) of currents flowing through the load 13 and the capacitor 14 is from the first node A to the fourth node D.

The control device 15 includes a load control unit 21 and a connection switching control unit 22.

The load control unit 21 controls the operation of the load 13. For example, if the load 13 includes an electric motor such as a three-phase brushless DC motor and an inverter for controlling the power mode and regenerative mode of the electric motor, the load control unit 21 controls a power conversion operation of the inverter. In more detail, when the electric motor is in the power mode, the load control unit 21 converts a direct-current power applied between both electrodes at the direct current side of the inverter into a three-phase alternating-current power, performs a commutation of a conduction for each phase of the electric motor sequentially, and thereby, each phase current, which is alternating-current, flows. On the other hand, when the electric motor is in the regenerative mode, the load control unit 21 converts the generated alternating-current power output from the electric motor into a direct-current power, while the load control unit 21 synchronizes the operations of the inverter based on a rotation angle of the electric motor.

The connection switching control unit 22 can drive the first and second direct-current power converter circuits 11 and 12 independently from each other by inputting signals (PWM signals) based on a pulse width modulation (PWM) into a gate of each switching device SW1 to SW4. The connection switching control unit 22 controls the first and second direct-current power converter circuits 11 and 12 so that a switching operation for at least one of a pair of the first and second switching devices SW1 and SW2 included in the first direct-current power converter circuit 11 and a pair of the third and fourth switching devices SW3 and SW4 included in the second direct-current power converter circuit 12 is performed. Thereby, the connection switching control unit 22 controls a voltage V0 to be applied to the load 13 (a load voltage) in the range from the larger of the first voltage VB1 of the first power source BT1 and the second voltage VB2 of the second power source BT2 to the summed voltage of the first voltage VB1 and the second voltage VB2 (=VB1+VB2).

For example, the voltage difference Vd (=VB2−VB1) is zero, the connection switching control unit 22 controls the load voltage V0 in the range from the first voltage VB1 (=the second voltage VB2) to the summed voltage of the first voltage VB1 and the second voltage VB2 (=VB1+VB2).

The connection switching control unit 22 controls a switching operation of the first switching device SW1 and the second switching device SW2 included in the first direct-current power converter circuit 11 based on a first duty DT1. In the switching operation, the first switching device SW1 and the second switching device SW2 are inverted and the alternative close and open (ON/OFF) switching operations of each switching device SW1 and SW2 are performed. As represented by the following equation (1), the first duty DT1 is defined by ON time t(SW1) of the first switching device SW1 and ON time t(SW2) of the second switching device SW2.

For example, when the first switching device SW1 is turned off and the second switching device SW2 is turned on, the first duty DT1 is 0%. On the other hand, when the first switching device SW1 is turned on and the second switching device SW2 is turned off, the first duty DT1 is 100%.

The connection switching control unit 22 can step down the first voltage VB1 based on the first duty DT1 and output the step-down voltage from the first direct-current power converter circuit 11. The connection switching control unit 22 controls output voltage V10 of the first direct-current power converter circuit 11 (in other words, the voltage applied between the second node B and the fourth node D) as the product of the first voltage VB1 and the first duty DT1 (VB1*DT1=V10).

$$DT1 = \frac{t(SW1)}{t(SW1) + t(SW2)} = \frac{V0 - VB1 - Vd}{VB1} \\ DT2 = \frac{t(SW4)}{t(SW3) + t(SW4)} = \frac{V0 - VB2 - Vd}{VB2} \quad (1)$$

The connection switching control unit 22 controls a switching operation of the third switching device SW3 and the fourth switching device SW4 included in the second direct-current power converter circuit 12 based on a second duty DT2. In the switching operation, the third switching device SW3 and the fourth switching device SW4 are inverted and the alternative close and open (ON/OFF) switching operations of each switching device SW3 and SW4 are performed. As represented by the equation (I) described above, the second duty DT2 is defined by ON time t(SW3) of the third switching device SW3 and ON time t(SW4) of the fourth switching device SW4.

For example, when the fourth switching device SW4 is turned off and the third switching device SW3 is turned on, the second duty DT2 is 0%. On the other hand, when the fourth switching device SW4 is turned on and the third switching device SW3 is turned off, the second duty DT2 is 100%.

The connection switching control unit 22 can step down the source voltage VB2 based on the second duty DT2 and output the step-down voltage from the second direct-current power converter circuit 12. The connection switching control unit 22 controls output voltage V20 of the second direct-current power converter circuit 12 (in other words, the voltage applied between the first node A and the third node C) as the product of the second voltage VB2 and the second duty DT2 (VB2*DT2=V20).

As represented by the equation (1) described above, the first duty DT1 is represented by the desired load voltage V0, the desired voltage difference Vd (=VB2−VB1), and the first voltage VB1 of the first power source BT1, and the second duty DT2 is represented by the desired load voltage V0, the desired voltage difference Vd (=VB2−VB1), and the second voltage VB2 of the second power source BT2. On the other hand, as represented by the following equation (2), based on the voltage difference Vd (=VB2−VB1), the first duty DT1 can be represented by the second voltage VB2 of the second power source BT2, and the second duty DT2 can be represented by the first voltage VB1 of the first power source BT1. In order to prevent a divergence of control responses, the connection switching control unit 22 may control switching operations using, not the duties DT1 and DT2 represented by the following equation (2), but the duties DT1 and DT2 represented by the equation (1) described above.

$$DT1 = \frac{V0 - VB2}{VB2 - Vd} \\ DT2 = \frac{V0 - VB1}{VB1 + Vd} \quad (2)$$

The power device 10 according to the first embodiment of the present invention includes the constitution described above. Hereinafter, the operation of the power device 10, in other words, the control operation of the connection switching control unit 22 will be described.

(First Control Mode of the First Embodiment)

In a first control mode, as shown in FIGS. 2A to 2D and 3A to 3D, the connection switching control unit 22 drives one of the first and second direct-current power converter circuits 11 and 12 at a time. Thereby, the connection switching control unit 22 can control the load voltage V0 to be in a range from the first voltage VB1 or the second voltage VB2 to the summed voltage of the first voltage VB1 and the second voltage VB2 (=VB1+VB2).

If the voltage difference Vd (=VB2−VB1) is zero, the connection switching control unit 22 can set the load voltage V0 to be equal to the first voltage VB1 (=the second voltage VB2) by connecting the first power source BT1 and the second power source BT2 with the load 13 in parallel.

Figure 4:
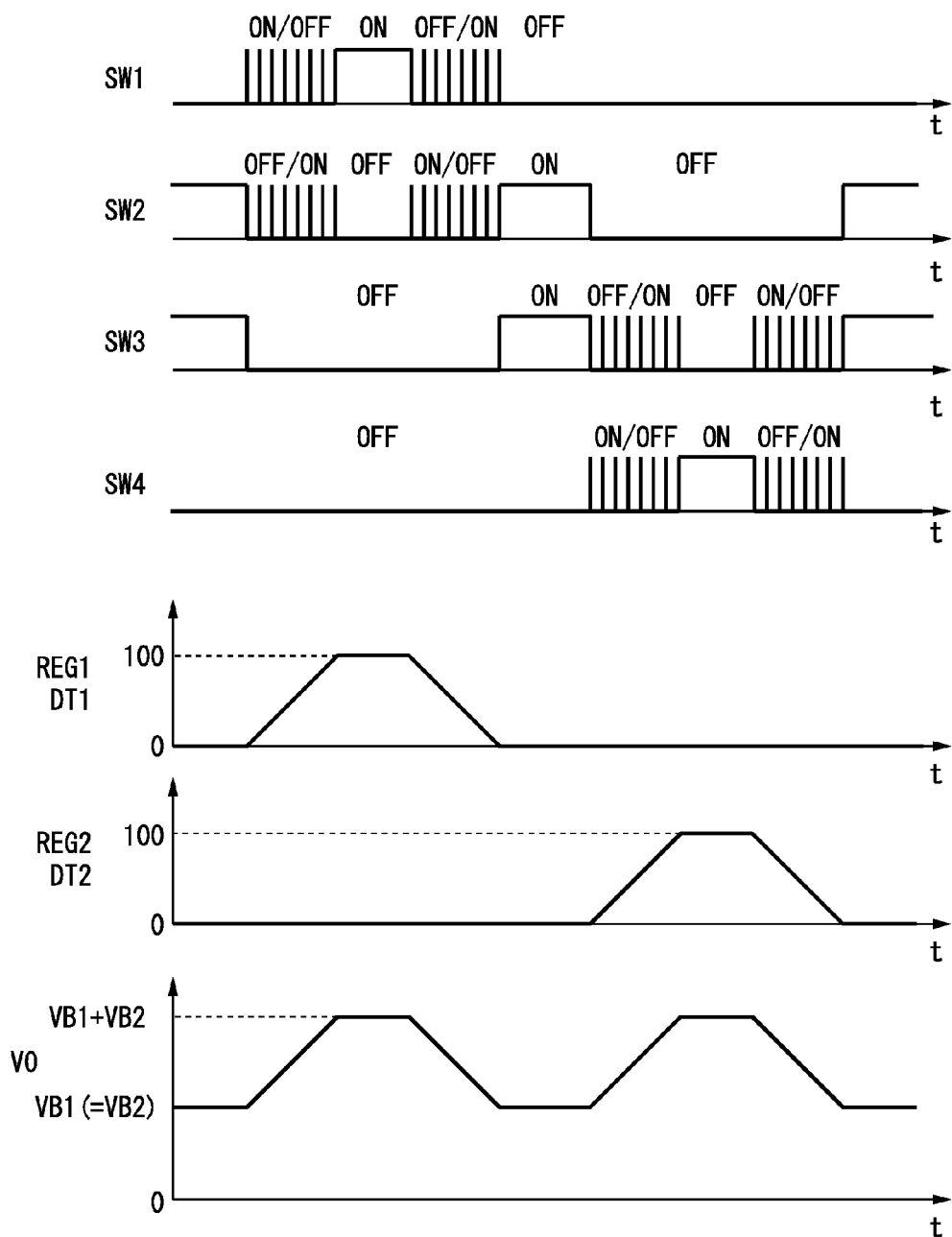
FIG. 4 is a diagram showing a variation of ON/OFF of each switching device, a variation of each first duty and second duty, and a variation of a load voltage when the power device according to the first embodiment of the present invention is in a first control mode.
Figure 5A:
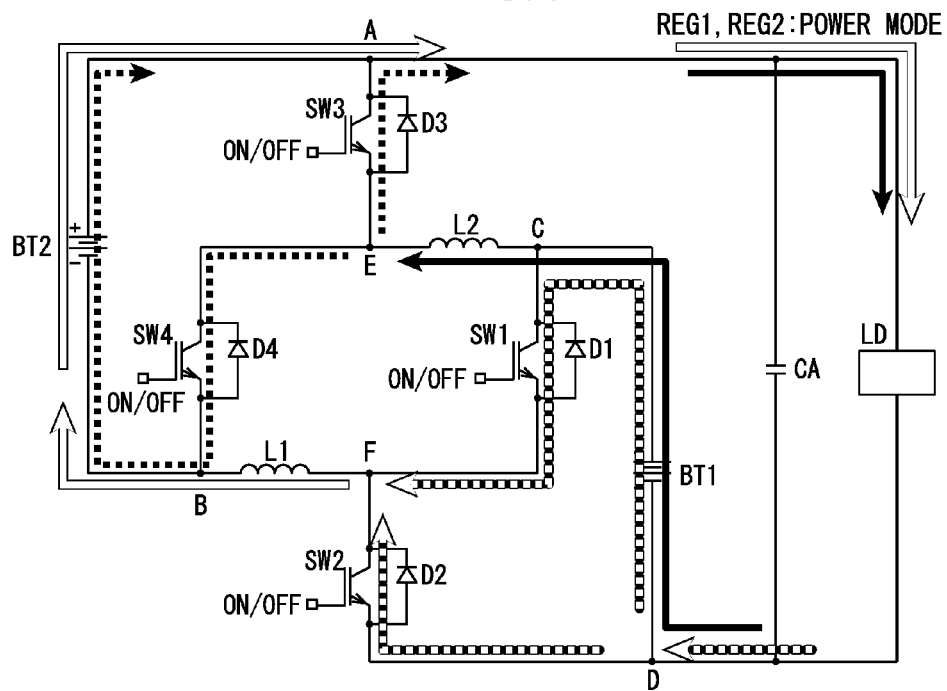
FIG. 5A is a diagram showing ON/OFF of each switching device and each current flow when the power device according to the first embodiment of the present invention is in powering operation of a second control mode.
Figure 5B:
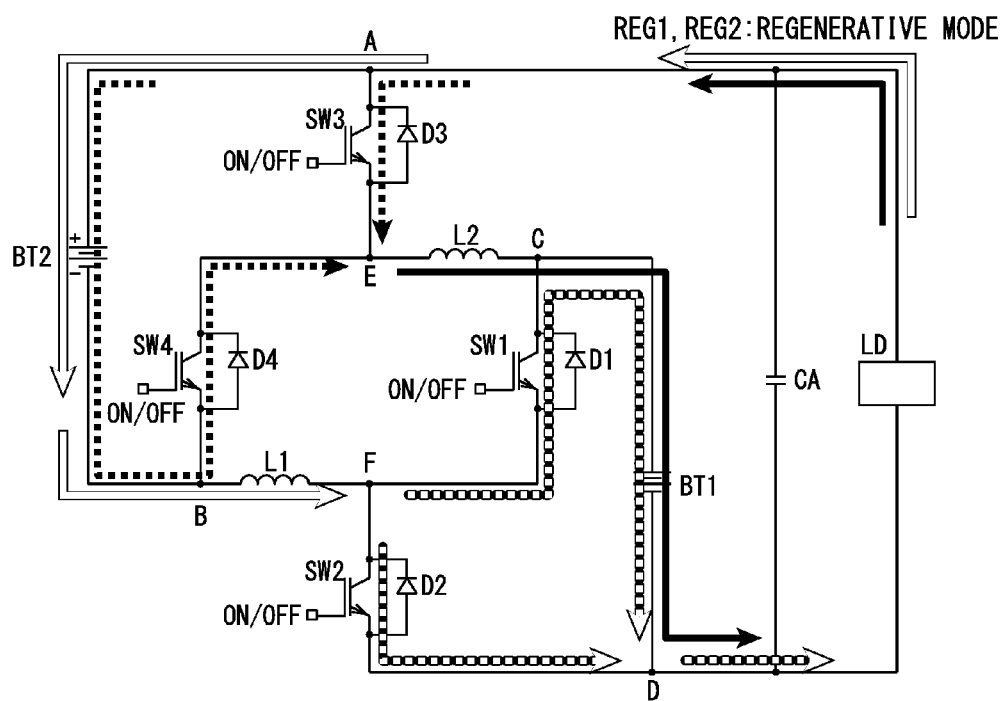
FIG. 5B is a diagram showing ON/OFF of each switching device and each current flow when the power device according to the first embodiment of the present invention is in regenerative operation of the second control mode.
Figure 6A:
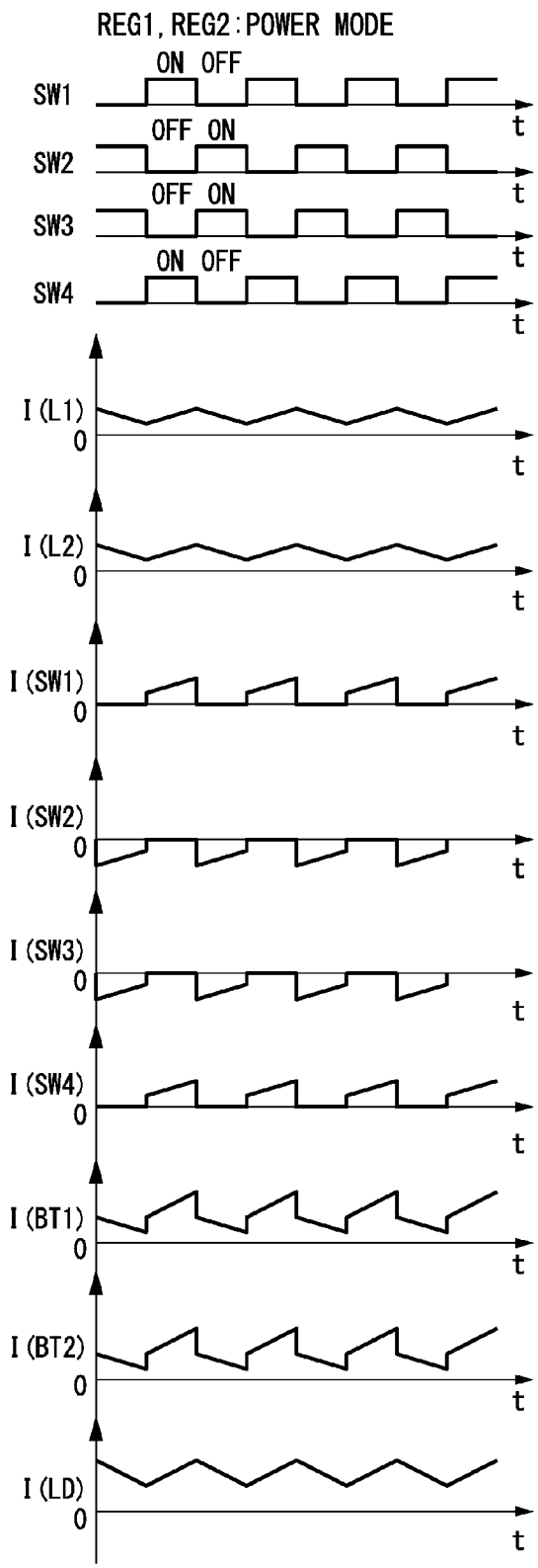
FIG. 6A is a diagram showing ON/OFF of each switching device and a variation of each current when the power device according to the first embodiment of the present invention is in the powering operation of the second control mode.

For example, as shown in FIG. 4, the connection switching control unit 22 connects the first and second power sources BT1 and BT2 with the load 13 in parallel by turning off the first and fourth switching devices SW1 and SW4, and turning on the second and third switching devices SW2 and SW3.

In the condition that the first and second power sources BT1 and BT2 are connected to the load 13 in parallel, the connection switching control unit 22 performs a switching operation of turning off the third switching device SW3 and gradually increasing the first duty DT1 from zero to 100%. Thereby, the electric power of the first power source BT1 is supplied to the load 13 and the capacitor 14 via the first reactor L1 and the second power source BT2. Thereby, the capacitor 14 is charged, and the load voltage V0 (=V10+VB2=VB1*DT1+VB2) is gradually increased based on the first duty DT1. When the first duty DT1 reaches 100%, the first and second power sources BT1 and BT2 are connected to the load 13 in series, and the load voltage V0 is equal to the summed voltage of the first voltage VB1 and the second voltage VB2 (=VB1+VB2). In the condition that the first and second power sources BT1 and BT2 are connected to the load 13 in series, the connection switching control unit 22 may turn on the fourth switching device SW4.

Moreover, in the condition that the first and second power sources BT1 and BT2 are connected to the load 13 in series, the connection switching control unit 22 performs a switching operation of gradually decreasing the first duty DT1 from 100% to zero. Thereby, an electrical charge charged in the capacitor 14 is supplied to the first power source BT1 via the second power source BT2 and the first reactor L1 while the electrical charge is consumed in the load 13.

Thereby, the first power source BT1 is charged, and the load voltage V0 (=V10+VB2=VB1*DT1+VB2) is gradually decreased based on the first duty DT1. When the first duty DT1 reaches zero, the connection switching control unit 22 turns on the third switching device SW3. Thereby, the first and second power sources BT1 and BT2 are connected to the load 13 in parallel, and the load voltage V0 is equal to the first voltage VB1 (=the second voltage VB2).

Similarly, in the condition that the first and second power sources BT1 and BT2 are connected to the load 13 in parallel, the connection switching control unit 22 performs a switching operation of turning off the switching device SW2 and gradually increasing the second duty DT2 from zero to 100%. Thereby, the electric power of the second power source BT2 is supplied to the load 13 and the capacitor 14 via the second reactor L2 and the first power source BT1. Thereby, the capacitor 14 is charged, and the load voltage V0 (=V20+VB1=VB2*DT2+VB1) is gradually increased based on the second duty DT2. When the second duty DT2 reaches 100%, the first and second power sources BT1 and BT2 are connected to the load 13 in series, and the load voltage V0 is equal to the summed voltage of the first voltage VB1 and the second voltage VB2 (=VB1+VB2). In the condition that the first and second power sources BT1 and BT2 are connected to the load 13 in series, the connection switching control unit 22 may turn on the first switching device SW1.

Moreover, in the condition that the first and second power sources BT1 and BT2 are connected to the load 13 in series, the connection switching control unit 22 performs a switching operation of gradually decreasing the second duty DT2 from 100% to zero. Thereby, the electrical charge charged in the capacitor 14 is supplied to the second power source BT2 via the first power source BT1 and the second reactor L2 while the electrical charge is consumed in the load 13.

Thereby, the second power source BT2 is charged, and the load voltage V0 (=V20+VB1=VB2*DT2+VB1) is gradually decreased based on the second duty DT2. When the second duty DT2 reaches zero, the connection switching control unit 22 turns on the second switching device SW2. Thereby, the first and second power sources BT1 and BT2 are connected to the load 13 in parallel, and the load voltage V0 is equal to the second voltage VB2 (=the first voltage VB1).

(Second Control Mode of the First Embodiment)

In a second control mode, as shown in FIGS. 5A, 5B, 6A, and 6B, the connection switching control unit 22 simultaneously drives the first and second direct-current power converter circuits 11 and 12. The phase of the switching operation of the first direct-current power converter circuit 11 is the same as that of the second direct-current power converter circuit 12. Thereby, the connection switching control unit 22 can control the load voltage V0 in the range from the first voltage VB1 or the second voltage VB2 to the summed voltage of the first voltage VB1 and the second voltage VB2 (=VB1+VB2). In this case, regarding the current flowing through each switching device SW1 to SW4, each diodes D1 to D4, and each reactor L1 and L2, the currents which flow in the operations of the first direct-current power converter circuit 11 do not interfere those in the operations of the second direct-current power converter circuit 12. The current flowing through each of the first and second power source BT1 and BT2, and the load 13 and the capacitor 14 is generated by combining currents based on the mutual operations of the first and second direct-current power converter circuits 11 and 12.

For example, if the voltage difference Vd (=VB2−VB1) is zero, as shown in FIG. 7, the connection switching control unit 22 connects the first and second power sources BT1 and BT2 with the load 13 in parallel by turning off the first and fourth switching devices SW1 and SW4 and turning on the second and third switching devices SW2 and SW3.

Figure 8:
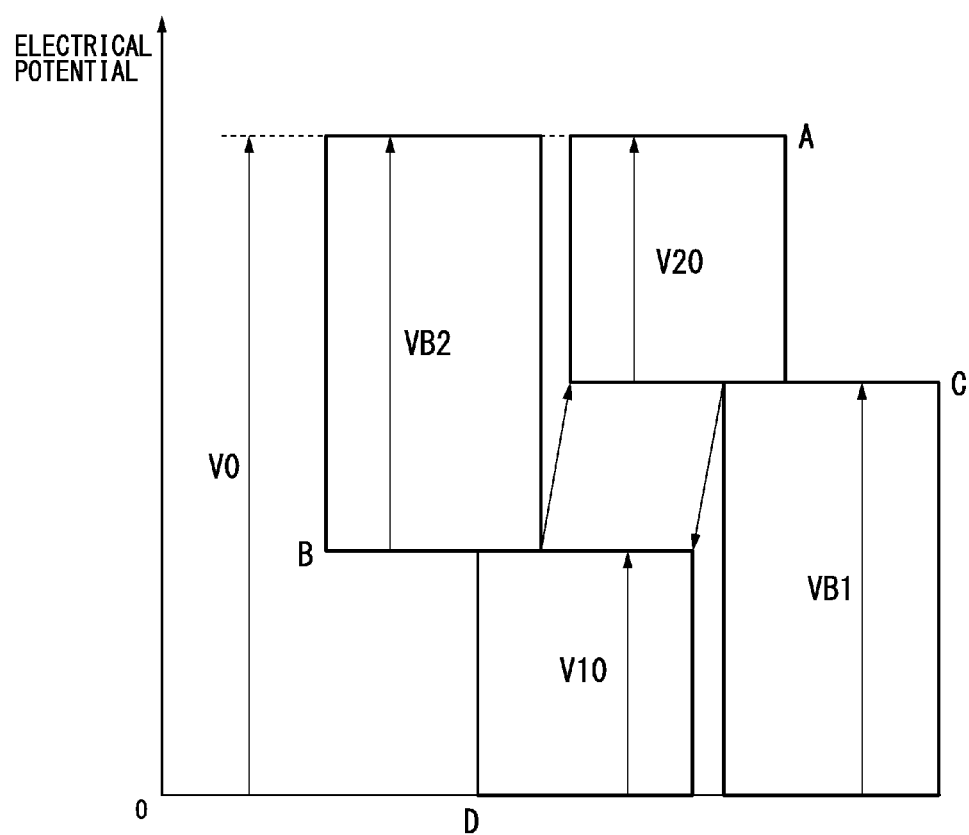
FIG. 8 is a diagram showing a relationship of the load voltage, first and second voltages, and each output voltage in the power device according to the first embodiment of the present invention.

In the condition that the first and second power sources BT1 and BT2 are connected to the load 13 in parallel, the connection switching control unit 22 performs a switching operation of gradually increasing the first and second duties DT1 and DT2 from zero to 100%. Thereby, the electric power is supplied to the load 13 and the capacitor 14. Thereby, the capacitor 14 is charged, and, as shown in FIG. 8, the load voltage V0 (=V10+VB2=VB1*DT1+VB2=V20+VB1=VB2*DT2+VB1) is gradually increased based on the first and second duties DT1 and DT2. As shown in FIG. 7, when the first and second duties DT1 and DT2 reach 100%, the first and second power sources BT1 and BT2 are connected to the load 13 in series, and the load voltage V0 is equal to the summed voltage of the first voltage VB1 and the second voltage VB2 (=VB1+VB2).

Moreover, in the condition that the first and second power sources BT1 and BT2 are connected to the load 13 in series, the connection switching control unit 22 performs a switching operation of gradually decreasing the first and second duties DT1 and DT2 from 100% to zero. Thereby, an electrical charge charged in the capacitor 14 is supplied to the first and second power sources BT1 and BT2 while the electrical charge is consumed in the load 13. Thereby, the first and second power sources BT1 and BT2 are charged, and, as shown in FIG. 8, the load voltage V0 (=V10+VB2=VB1*DT1+VB2=V20+VB1=VB2*DT2+VB1) is gradually decreased based on the first and second duties DT1 and DT2. As shown in FIG. 7, when the first and second duties DT1 and DT2 reach 0%, the first and second power sources BT1 and BT2 are connected to the load 13 in parallel, and the load voltage V0 is equal to the first voltage VB1 (=the second voltage VB2).

(Third Control Mode of the First Embodiment)

Figure 9A:
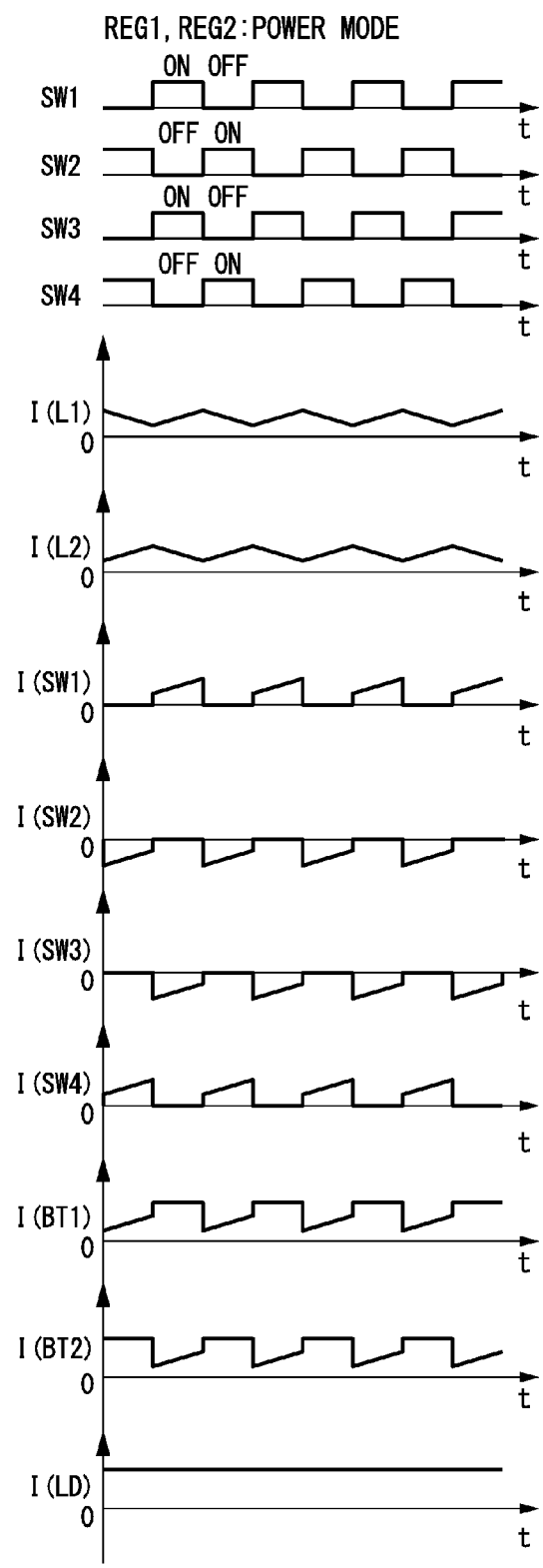
FIG. 9A is a diagram showing ON/OFF of each switching device and a variation of each current when the power device according to the first embodiment of the present invention is in powering operation of a third control mode.
Figure 9B:
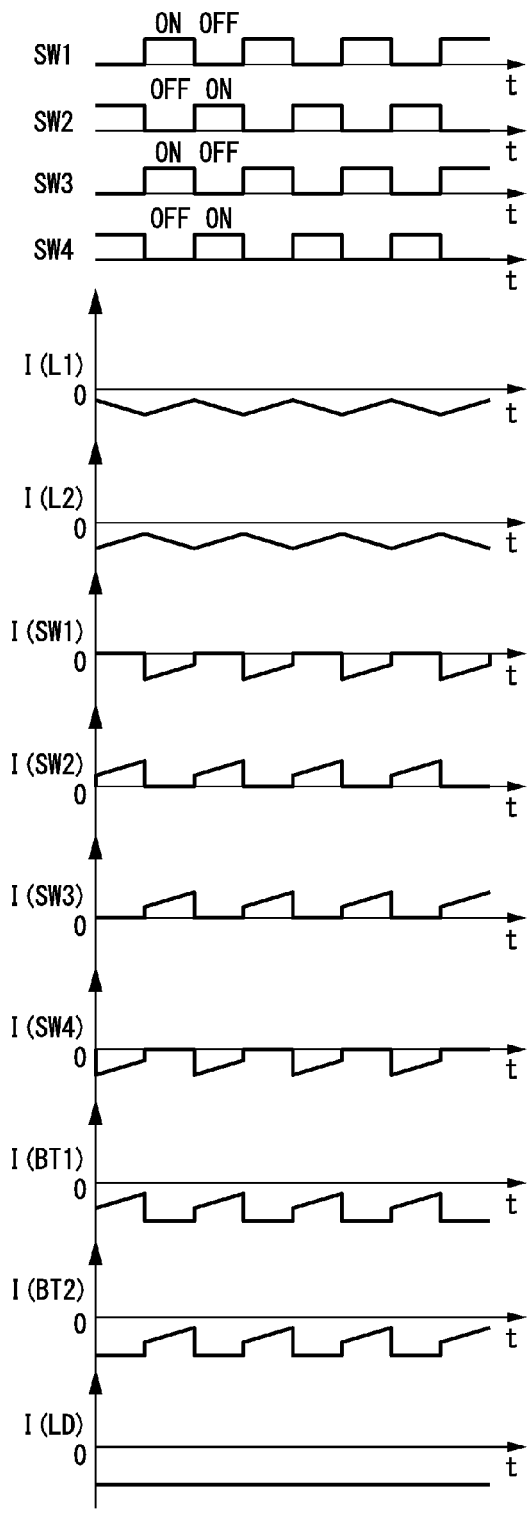
FIG. 9B is a diagram showing ON/OFF of each switching device and the variation of each current when the power device according to the first embodiment of the present invention is in regenerative operation of the third control mode.

In a third control mode, as shown in FIGS. 9A and 9B, the connection switching control unit 22 simultaneously drives the first and second direct-current power converter circuits 11 and 12. The phase of the switching operation of the first direct-current power converter circuit 11 is opposite to that of the second direct-current power converter circuit 12. Thereby, the connection switching control unit 22 can control the load voltage V0 in the range from the first voltage VB1 or the second voltage VB2 to the summed voltage of the first voltage VB1 and the second voltage VB2 (=VB1+VB2). Since the ripple of current based on the operation of the first direct-current power converter circuit 11 and that of the second direct-current power converter circuit 12 are superimposed in the opposite phase each other, the ripple of current flowing through the load 13 and the capacitor 14 can be decreased in comparison with the second control mode.

(Fourth Control Mode of the First Embodiment)

Figure 10A:
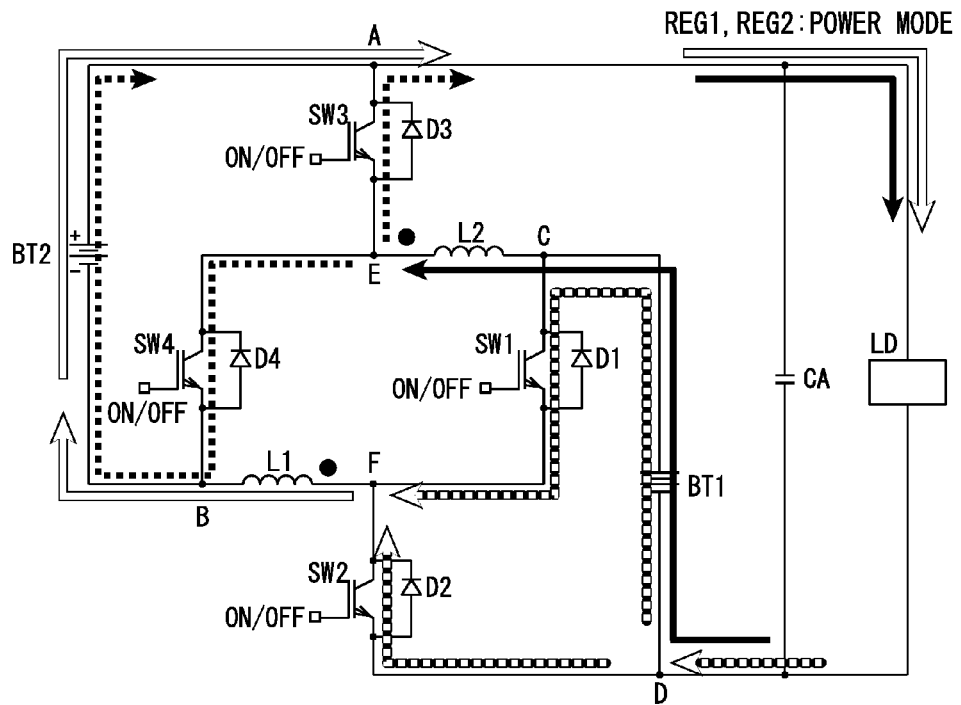
FIG. 10A is a diagram showing a state of each first and second reactor, ON/OFF of each switching device, and each current flow when the power device according to the first embodiment of the present invention is in powering operation of a fourth control mode.
Figure 10B:
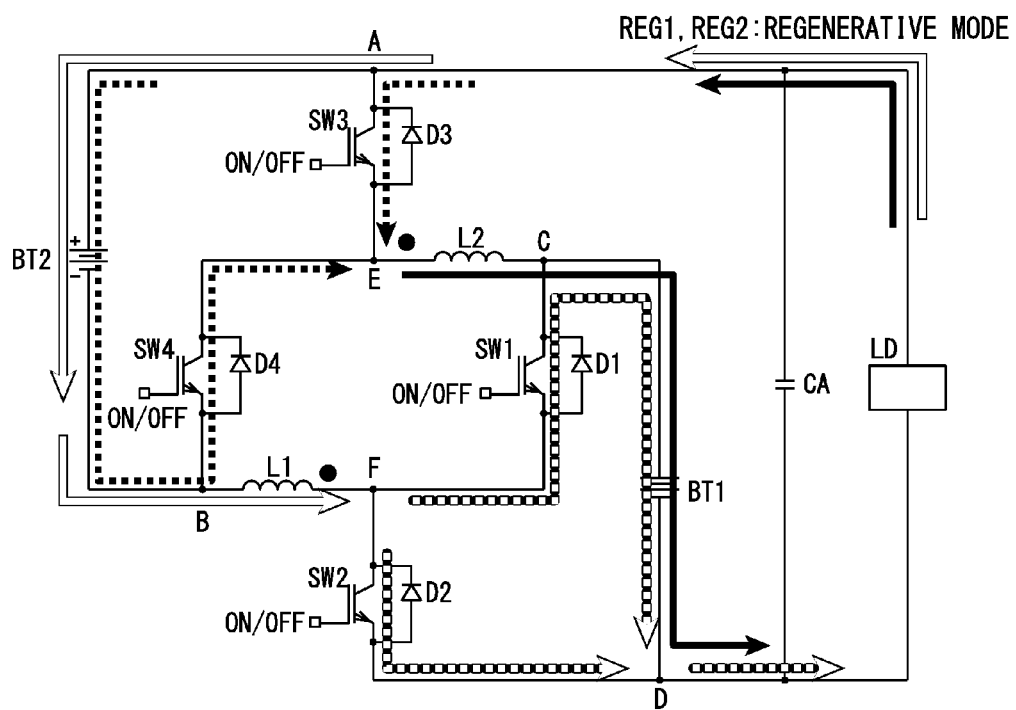
FIG. 10B is a diagram showing a state of each first and second reactor, ON/OFF of each switching device, and each current flow when the power device according to the first embodiment of the present invention is in regenerative operation of the fourth control mode.

In a fourth control mode, for example, as shown in FIGS. 10A and 10B, the connection switching control unit 22 simultaneously drives the first and second direct-current power converter circuits 11 and 12 in the condition that the first and second reactors L1 and L2 are magnetically coupled. The phase of the switching operation of the first direct-current power converter circuit 11 is arbitrarily shifted from that of the second direct-current power converter circuit 12 (for example, a phase shift is 180°). Thereby, the ripple frequency of each first and second reactor current I(L1) and I(L2) can be greater than a switching frequency. For example, even if the switching frequency is within an audible band, a frequency of magnetostrictive noise generated in the first and second reactors L1 and L2 can be set to be outside the audible band. Thereby, the noise can be suppressed.

The first and second reactors L1 and L2 are magnetically coupled by, for example, winding the first and second reactors L1 and L2 around a common core so that they share a magnetic path. Moreover, the first and second reactors L1 and L2 may be provided by, for example, winding the first and second reactors L1 and L2 around the common core so that they share a magnetic path in opposite directions (reverse phase). In this case, the first reactor current I(L1) and second reactor current I(L2) flow so that magnetizations of the magnetic path are canceled.

For example, in the condition that the first and second reactors L1 and L2 are magnetically coupled, in the power mode where the direct-current power is supplied to the load 13 as shown in FIG. 11A, the connection switching control unit 22 increases the first reactor current I(L1) by turning on the first switching device SW1 included in the first direct-current power converter circuit 11. Subsequently, by turning off the first switching device SW1, and then, by turning on the fourth switching device SW4 in the condition that the first reactor current I(L1) is decreasing, the second reactor current I(L2) is increased. Thereby, an inductive voltage caused by the magnetic coupling is generated in the first reactor L1, and the condition of the first reactor current I(L1) is changed from the decrease to the increase. Subsequently, by turning off the fourth switching device SW4, the second reactor current I(L2) is decreased, and the first reactor current I(L1) is decreased.

Moreover, the connection switching control unit 22 increases the second reactor current I(L2) by turning on the fourth switching device SW4 included in the second direct-current power converter circuit 12.

Subsequently, by turning off the fourth switching device SW4, and then, by turning on the first switching device SW1 in the condition that the second reactor current I(L2) is decreasing, the first reactor current I(L1) is increased. Thereby, an inductive voltage caused by the magnetic coupling is generated in the second reactor L2, and the condition of the second reactor current I(L2) is changed from the decrease to the increase. Subsequently, by turning off the first switching device SW1, the first reactor current I(L1) is decreased, and the second reactor current I(L2) is decreased.

Thereby, the connection switching control unit 22 sets the frequency of each first and second reactor current I(L1) and I(L2) to be the twice of the switching frequency, and the frequency of magnetostrictive noise generated in the first and second reactors L1 and L2 can be increased to outside the audible band.

Similarly, as shown in FIG. 11B, in the regenerative mode where the direct-current power is supplied from the load 13, the connection switching control unit 22 decreases an absolute value of the first reactor current I(L1) by turning on the first switching device SW1 included in the first direct-current power converter circuit 11. Subsequently, by turning off the first switching device SW1, and then, by turning on the fourth switching device SW4 in the condition that the absolute value of first reactor current I(L1) is increasing, an absolute value of the second reactor current I(L2) is decreased. Thereby, an inductive voltage caused by the magnetic coupling is generated in the first reactor L1, and the condition of the absolute value of first reactor current I(L1) is changed from the increase to the decrease. Subsequently, by turning off the fourth switching device SW4, the absolute value of second reactor current I(L2) is increased, and the absolute value of first reactor current I(L1) is increased.

Moreover, the connection switching control unit 22 decreases the absolute value of second reactor current I(L2) by turning on the fourth switching device SW4 included in the second direct-current power converter circuit 12. Subsequently, by turning off the fourth switching device SW4, and then, by turning on the first switching device SW1 in the condition that the absolute value of second reactor current I(L2) is increasing, the absolute value of first reactor current I(L1) is decreased. Thereby, an inductive voltage caused by the magnetic coupling is generated in the second reactor L2, and the condition of the absolute value of second reactor current I(L2) is changed from the increase to the decrease. Subsequently, by turning off the first switching device SW1, the absolute value of first reactor current I(L1) is increased, and the absolute value of second reactor current I(L2) is increased.

Thereby, the connection switching control unit 22 sets the frequency of each first and second reactor current I(L1) and I(L2) to be the twice of the switching frequency, and a frequency of magnetostrictive noise generated in the first and second reactors L1 and L2 can be increased to be outside the audible band.

(Fifth Control Mode of the First Embodiment)

In a fifth control mode, when the connection switching control unit 22 simultaneously drives the first and second direct-current power converter circuits 11 and 12, the connection switching control unit 22 can arbitrarily control the first voltage VB1, the second voltage VB2, and the load voltage V0 by changing at least one of the first and second duties DT1 and DT2.

For example, if the first duty DT1 is different from the second duty DT2, the step-up ratio of the first direct-current power converter circuit 11 (the ratio of a first voltage VB1 and the load voltage) is different from that of the second direct-current power converter circuit 12 (the ratio of a second voltage VB2 and the load voltage). Therefore, an electric charge is transported between the first power source BT1 and the second power source BT2. Thereby, the first and second voltages VB1 and VB2 are changed, and are balanced based on the step-up ratios of the first and second direct-current power converter circuits 11 and 12.

Figure 12:
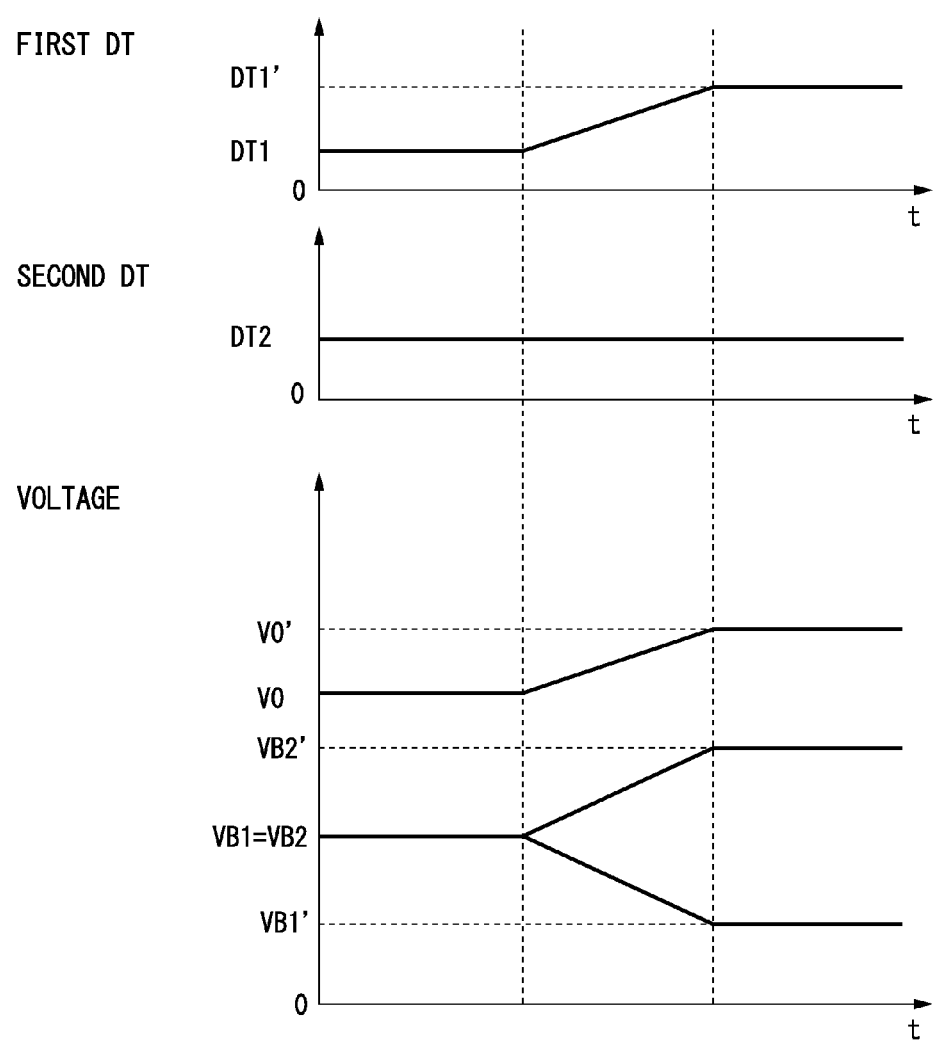
FIG. 12 is a diagram showing a variation of each first duty and second duty, and a variation of each voltage when the power device according to the first embodiment of the present invention is in a fifth control mode.

For example, as shown in FIG. 12, regarding the first and second duties DT1 and DT2 in the condition that the voltage difference Vd (=VB2−VB1) is zero, if the first duty DT1 is changed into a first duty DT1', the first duty DT1' is represented by the following equation (3) using first and second voltages VB1" and VB2' and a load voltage V0' in the balanced condition.

In the following equation (3), for example, given an electric power is not transported between the load 13 and the first and second power sources BT1 and BT2, a loss at each element is negligible, and a change of each first and second voltage VB1 and VB2 is linear with respect to the transport of electric charge, a first voltage change (=VB1'−VB1) is considered to be equal to a second voltage change (=VB2'−VB2). Therefore, the first and second voltages VB1' and VB2' and the load voltage V0' in the balanced condition is represented by the following equation (4).

$$DT1 = \frac{V0 - VB1}{VB1}, DT2 = \frac{V0 - VB2}{VB2} \atop DT1' = \frac{V0' - VB1'}{VB1'}, DT2 = \frac{V0' - VB2'}{VB2'}$$ (3)

$$V0 = \frac{(VB1 + VB2)(DT1' + 1)(DT2 + 1)}{(DT1' + DT2 + 2)} \atop VB1' = \frac{(VB1 + VB2)(DT2 + 1)}{(DT1' + DT2 + 2)} \atop VB2' = \frac{(VB1 + VB2)(DT1' + 1)}{(DT1' + DT2 + 2)}$$ (4)

Figure 13A:
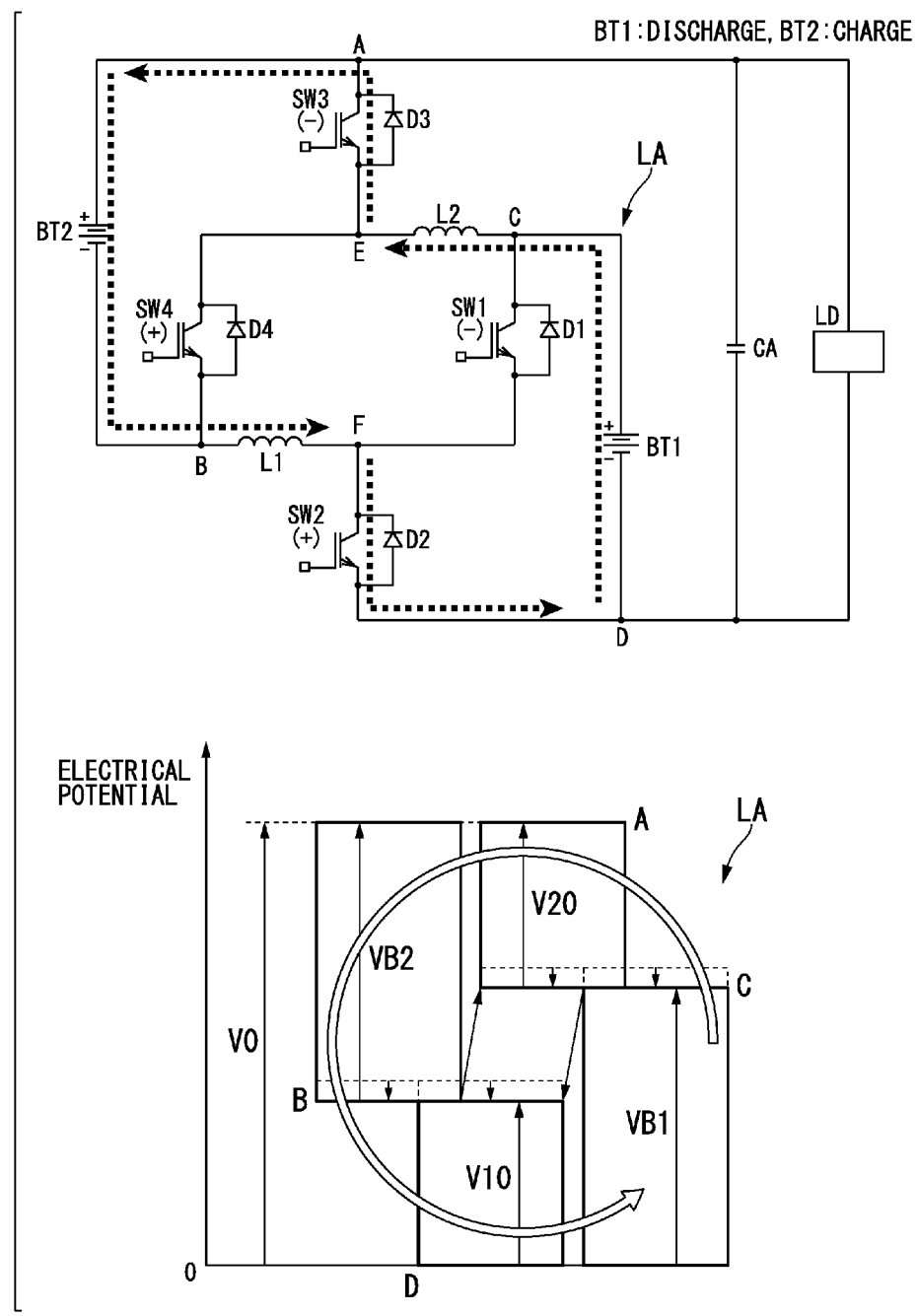
FIG. 13A is a diagram showing a loop current flow when the power device according to the first embodiment of the present invention is in the fifth control mode.

For example, as shown in FIG. 13A, if the connection switching control unit 22 decreases the output voltage V10 of the first direct-current power converter circuit 11 (=VB1*DT1) and increases the output voltage V20 of the second direct-current power converter circuit 12 (=VB2*DT2) while the connection switching control unit 22 maintains the load voltage V0, the connection switching control unit 22 decreases the first duty DT1 and increases the second duty DT2. Thereby, a loop current LA, which acts as a so-called energy buffer for the transport of the electric charge between the first power source BT1 and the second power source BT2, is generated so that the first power source BT1 is discharged and the second power source BT2 is charged. The loop current LA circulates through the third node C, the first node A, the second node B, and the fourth node D in series.

For example, as shown in FIG. 13B, if the connection switching control unit 22 increases the output voltage V10 (=VB1*DT1) and decreases the output voltage V20 (=VB2*DT2) while the connection switching control unit 22 maintains the load voltage V0, the connection switching control unit 22 increases the first duty DT1 and decreases the second duty DT2. Thereby, a loop current LB, which acts as a so-called energy buffer for the transport of the electric charge between the first power source BT1 and the second power source BT2, is generated so that the second power source BT2 is discharged and the first power source BT1 is charged. The loop current LB circulates through the first node A, the third node C, the fourth node D, and the second node B in series.

(Sixth Control Mode of the First Embodiment)

In relation to the first to fourth control modes, the connection switching control unit 22 in a sixth control mode can control the load voltage V0 to be correspond to an arbitrary target load voltage Va by adjusting the first and second duties DT1 and DT2. The first and second duties DT1 and DT2 are controlled by the first voltage VB1 and the second voltage VB2.

For example, if the first duty DT1 increases, the output voltage V10 of the first direct-current power converter circuit 11 (=VB1*DT1) increases and the step-up ratio of the load voltage V0 for the second voltage VB2 increases. Thereby, the connection switching control unit 22 makes the load voltage V0 converge on the arbitrary target load voltage Va by increasing the first duty DT1 under a condition of (Va/VB2)>(V0/VB2) and decreasing the first duty DT1 under a condition of (Va/VB2)<(V0/VB2).

For example, if the second duty DT2 increases, the output voltage V20 of the second direct-current power converter circuit 12 (=VB2*DT2) increases and the step-up ratio of the load voltage V0 for the first voltage VB1 increases. Thereby, the connection switching control unit 22 makes the load voltage V0 converge on the arbitrary target load voltage Va by increasing the second duty DT2 under a condition of (Va/VB1)>(V0/VB1) and decreasing the second duty DT2 under a condition of (Va/VB1)<(V0/VB1).

(Seventh Control Mode of the First Embodiment)

In relation to the sixth control mode, the connection switching control unit 22 in a seventh control mode can control the voltage difference Vd (=VB2−VB1) to be small by adjusting the first and second duties DT1 and DT2 if the first voltage VB1 is different from the second voltage VB2.

For example, given a change of each first and second voltage VB1 and VB2 is linear with respect to the transport of electric charge, the first and second voltages VB1 and VB2 are the same voltage (=(VB1+VB2)/2) when the electric charges are balanced by transporting the electric charges between the first and second power sources BT1 and BT2. When the load voltage V0 reaches the arbitrary target load voltage Va and the first and second voltages VB1 and VB2 are the same, the step-up ratio is Va/((VB1+VB2)/2).

Thereby, the connection switching control unit 22 increases the first duty DT1 under a condition of (Va/((VB1+VB2)/2))>(V0/VB2) and decreases the first duty DT1 under a condition of (Va/((VB1+VB2)/2))<(V0/VB2). Moreover, the connection switching control unit 22 increases the second duty DT2 under a condition of (Va/((VB1+VB2)/2))>(V0/VB1) and decreases the second duty DT2 under a condition of (Va/((VB1+VB2)/2))<(V0/VB1). Thereby, the connection switching control unit 22 makes the load voltage V0 converge on the arbitrary target load voltage Va, and makes the first and second voltages VB1 and VB2 converge on the same voltage.

(Eighth Control Mode of the First Embodiment)

Figure 14:
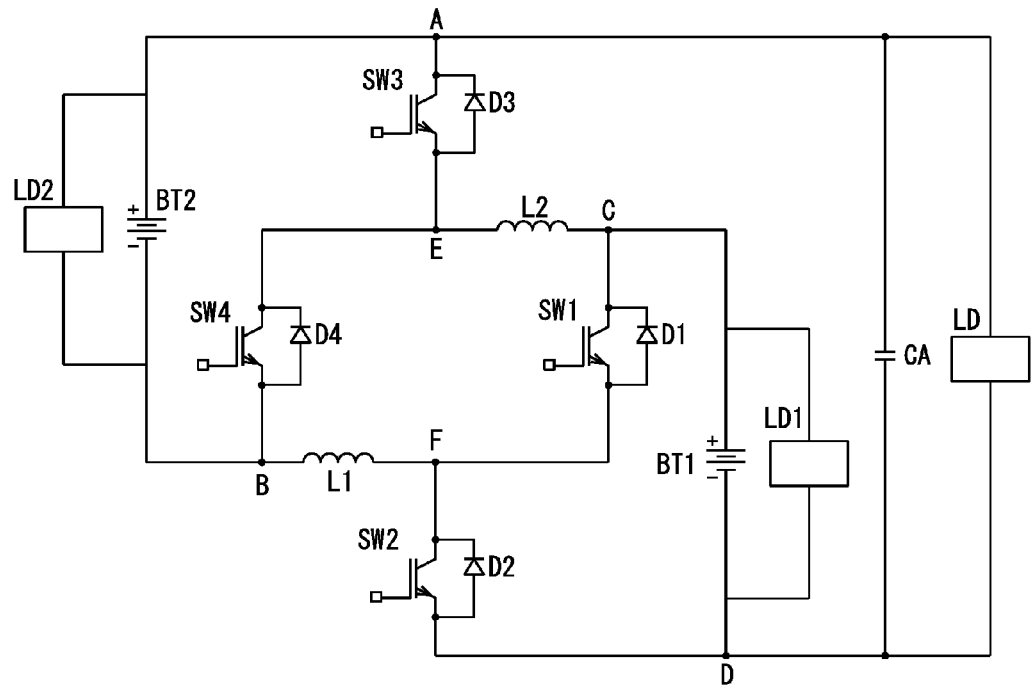
FIG. 14 is a configuration diagram showing a power device according to the first embodiment of the present invention in an eighth control mode.

In relation to the sixth and seventh control modes, as shown in FIG. 14, even if a load (for example, the first and second loads LD1 and LD2) is connected to at least one of the first and second power sources BT1 and BT2, the connection switching control unit 22 in an eighth control mode can control the voltage difference Vd (=VB2−VB1) to be small.

For example, while in a state other than a state in which the first and second power sources BT1 and BT2 are connected to the load 13 in parallel (i.e., the step-up ratio is equal to 1), if the quantity of the electric charge, which is input into and output from the first power source BT1 based on the condition of the load, is different from that of the second power source BT2, the amount of charge of the first power source BT1 (for example, the state of charge SOC) is different from that of the second power source BT2, and thereby, the voltage difference Vd (=VB2−VB1) is caused. In this case, the connection switching control unit 22 can controls the voltage difference Vd (=VB2−VB1) to be small by adjusting the first and second duties DT1 and DT2. Thereby, even if the connection condition of the first and second power sources BT1 and BT2 for the load 13 is changed into the parallel connection condition, a flow of excess current to cancel the voltage difference Vd (=VB2−VB1) can be prevented.

(Ninth Control Mode of the First Embodiment)

Figure 15:
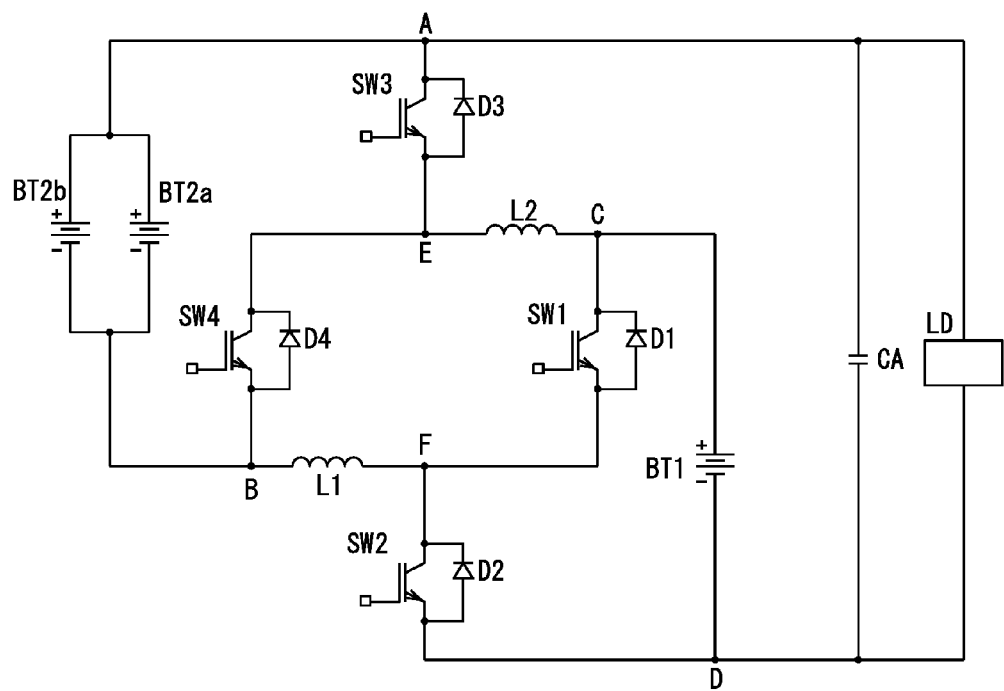
FIG. 15 is a configuration diagram showing a power device according to the first embodiment of the present invention in a ninth control mode.

In relation to the sixth and eighth control modes, as shown in FIG. 15, even if the total capacity of the first power source BT1 is different from that of the second power source BT2 (for example, a power source including a power source BT2a and a power source BT2b connected in parallel to each other), the connection switching control unit 22 in a ninth control mode can control the voltage difference Vd (=VB2−VB1) to be small.

For example, if the first and second power sources BT1 and BT2 are in other than the condition that the first and second power sources BT1 and BT2 are connected to the load 13 in parallel (in other words, the condition that the step-up ratio is equal to 1) and the quantity of the electric charge, which is input into and output from the first power source BT1, is the same as that of the second power source BT2, the voltage difference Vd (=VB2−VB1) is caused when the amount of charge of the first power source BT1 (for example, the state of charge SOC) is different from that of the second power source BT2 due to the difference between the total capacity of the first power source BT1 and that of the second power source BT2. In this case, the connection switching control unit 22 can controls the voltage difference Vd (=VB2−VB1) to be small by adjusting the first and second duties DT1 and DT2. Thereby, even if the connection condition of the first and second power sources BT1 and BT2 for the load 13 is changed into the parallel connection condition, a flow of excess current to cancel the voltage difference Vd (=VB2−VB1) can be prevented.

As described above, the power device 10 according to the first embodiment of the present invention can easily control the load voltage V0 to be an arbitrary voltage, which is in the range from the larger of the first voltage VB1 and the second voltage VB2 to the summed voltage of the first voltage VB1 and the second voltage VB2 (=VB1+VB2), by controlling the first duty DT1 and the second duty DT2.

Moreover, by generating the loop circuit LC by the first and second direct-current power converter circuits 11 and 12, and generating the loop currents LA and LB, which act as the so-called energy buffer for the transport of the electric charge between the first power source BT1 and the second power source BT2, the balance of charge and discharge of each first power source BT1 and second power source BT2 can be stabilized almost automatically without requiring, for example, feedback control.

When the first direct-current power converter circuit 11 performs a step-down operation, the first duty DT1 represented by the first voltage VB1 is used. When the second direct-current power converter circuit 12 performs a step-down operation, the second duty DT2 represented by the second voltage VB2 is used. Thereby, a divergence of control responses can be prevented.

Moreover, by magnetically coupling the first reactor L1 and the second reactor L2, the frequency of each first and second reactor current I(L1) and I(L2) can be greater than the switching frequency, and a frequency of magnetostrictive noise generated in the first and second reactors L1 and L2 can be increased to outside the audible band.

Moreover, by providing the first reactor L1 and the second reactor L2 so as to perform a magnetic-field cancellation, a generation of magnetic saturation in the first and second reactors L1 and L2 is suppressed. Thereby, each element can be reduced in size.

Second Embodiment

Figure 16:
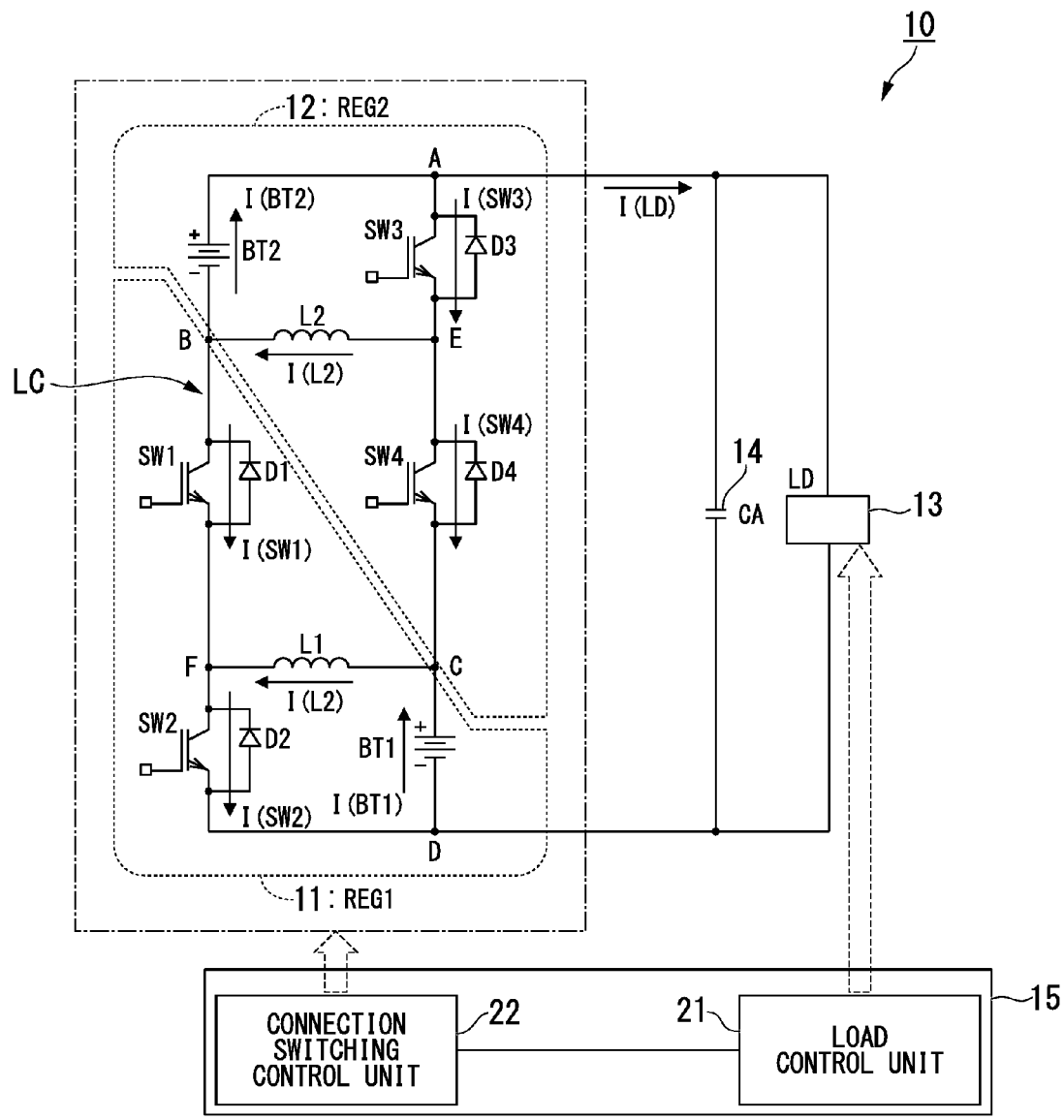
FIG. 16 is a configuration diagram showing a power device according to a second embodiment of the present invention.

As shown in FIG. 16, a power device 10 according to a second embodiment of the present invention includes a first direct-current power converter circuit (REG1) 11, a second direct-current power converter circuit (REG2) 12, a load (LD) 13, a capacitor (CA) 14, and a control device 15. The load 13 can be driven using a direct-current power supplied from the first and second direct-current power converter circuits 11 and 12, and supply a generated direct-current power to the first and second direct-current power converter circuits 11 and 12. The capacitor (CA) 14 is connected to both ends of the load 13.

The first direct-current power converter circuit (REG1) 11 includes a first power source BT1 such as a battery, first and second switching devices SW1 and SW2 such as IGBT (Insulated Gate Bipolar mode Transistor), which configure a first switch group, and a first reactor L1.

The second direct-current power converter circuit (REG2) 12 includes a second power source BT2 such as a battery, third and fourth switching devices SW3 and SW4 such as IGBT, which configure a second switch group, and a second reactor L2.

A voltage difference between a first voltage VB1 output from the first power source BT1 and a second voltage VB2 output from the second power source BT2 is a predetermined voltage difference Vd including zero (=VB2−VB1).

The power device 10 includes first to sixth nodes A to F.

A positive electrode of the second power source BT2 is connected to the first node A, and a negative electrode of the second power source BT2 is connected to the second node B. A positive electrode of the first power source BT1 is connected to the third node C, and a negative electrode of the first power source BT1 is connected to the fourth node D. One end of the second reactor L2 is connected to the fifth node E, and the other end of the second reactor L2 is connected to the second node B. One end of the first reactor L1 is connected to the sixth node F, and the other end of the first reactor L1 is connected to the third node C.

A collector and an emitter of the first switching device SW1 are connected to the second node B and the sixth node F, respectively. A collector and an emitter of the second switching device SW2 are connected to the sixth node F and the fourth node D, respectively. A collector and an emitter of the third switching device SW3 are connected to the first node A and the fifth node E, respectively. A collector and an emitter of the fourth switching device SW4 are connected to the fifth node E and the third node C, respectively. Diodes D1 to D4 are connected between the emitter and collector of the switching devices SW1 to SW4, respectively. The direction from the emitter to the collector of each switching device SW1 to SW4 is a forward direction of each diode D1 to D4.

The first and second direct-current power converter circuits 11 and 12 are connected each other via the second node B and the third node C, which are common connecting points. A loop circuit LC is formed by connecting at least the first and second reactors L1 and L2 in series.

In more detail, in the loop circuit LC, the first reactor L1 and the first switching device SW1 included in the first direct-current power converter circuit 11 and the second reactor L2 and the fourth switching device SW4 included in the second direct-current power converter circuit 12 are connected in series. The first reactor L1 and the first switching device SW1 included in the first direct-current power converter circuit 11 are connected in series, via the sixth node F, between the third node C and the second node B. The second reactor L2 and the fourth switching device SW4 included in the second direct-current power converter circuit 12 are connected in series, via the fifth node E, between the second node B and the third node C.

The first and second direct-current power converter circuits 11 and 12 are controlled based on pulse-width-modulated signals (PWM signals) output from the control device 15 and input into a gate of each switching device SW1 to SW4 so that the first and second direct-current power converter circuits 11 and 12 are driven independently from each other.

In more detail, the first and second direct-current power converter circuits 11 and 12 are controlled so that a switching operation for at least one of a pair of the first and second switching devices SW1 and SW2 included in the first direct-current power converter circuit 11 and a pair of the third and fourth switching devices SW3 and SW4 included in the second direct-current power converter circuit 12 is performed. In this switching operation, close (ON) and open (OFF) of each switching device SW1 to SW4 are switched alternately.

Figure 17A:
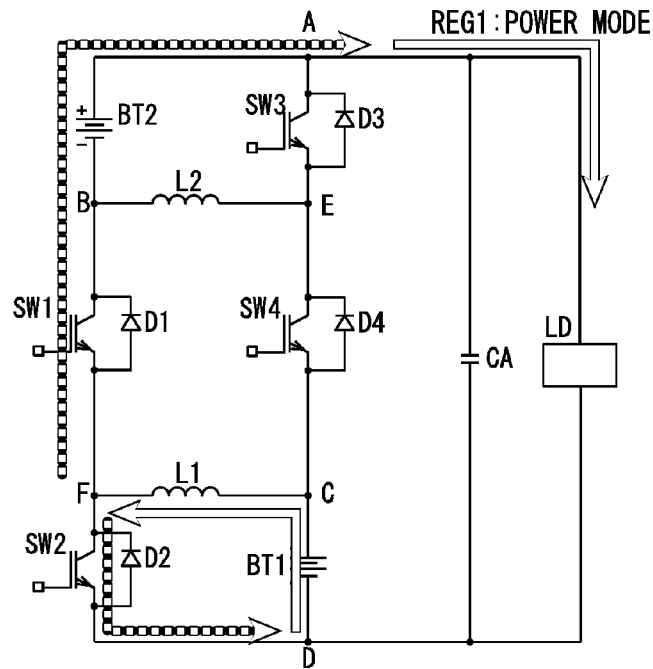
FIG. 17A is a diagram showing ON/OFF of each switching device and a current flow when a first direct-current power converter circuit included in the power device according to the second embodiment of the present invention is in a power mode.
Figure 18A:
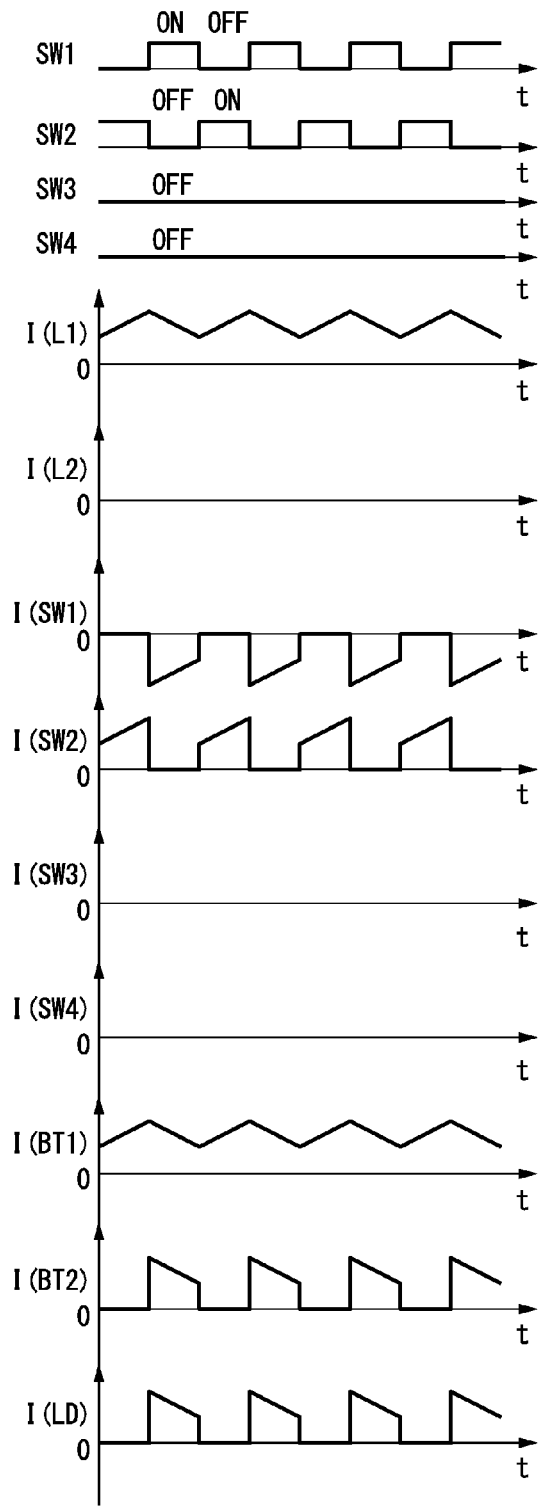
FIG. 18A is a diagram showing ON/OFF of each switching device and a variation of each current when the first direct-current power converter circuit included in the power device according to the second embodiment of the present invention is in the power mode.

For example, as shown in FIGS. 17A and 18A, when the first direct-current power converter circuit 11 is in a power mode where the first direct-current power converter circuit 11 supplies a direct-current power to the load 13, the first switching device SW1 is turned off and the second switching device SW2 is turned on. Thereby, the first reactor L1 is excited by flowing a circulating current through the first power source BT1, the first reactor L1, and the second switching device SW2 in series, and a first reactor current I(L1) flowing through the first reactor L1 is increased. On the other hand, by turning on the first switching device SW1 and turning off the second switching device SW2, current flows into the load 13 via the first power source BT1, the first reactor L1, the first switching device SW1 and the first diode D1, and the second power source BT2.

Figure 17B:
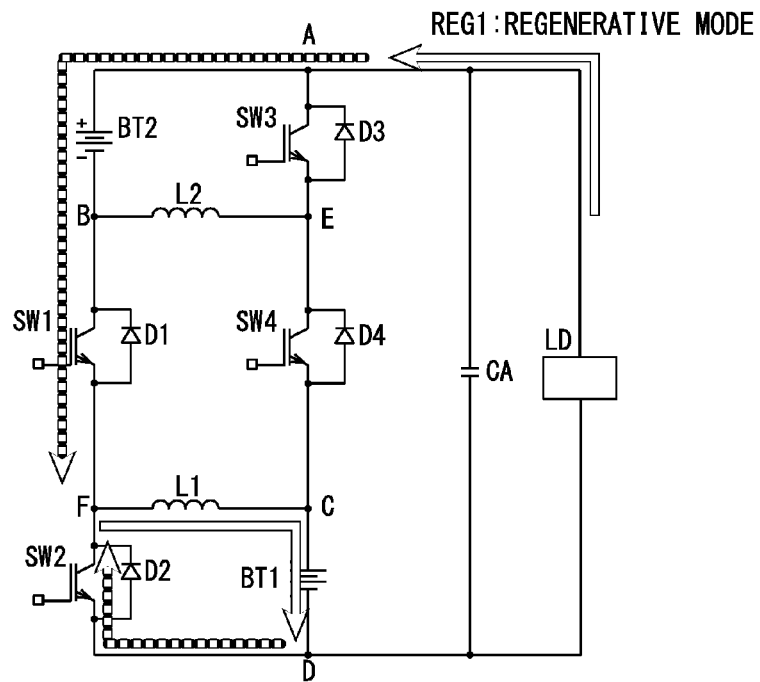
FIG. 17B is a diagram showing ON/OFF of each switching device and a current flow when the first direct-current power converter circuit included in the power device according to the second embodiment of the present invention is in a regenerative mode.
Figure 18B:
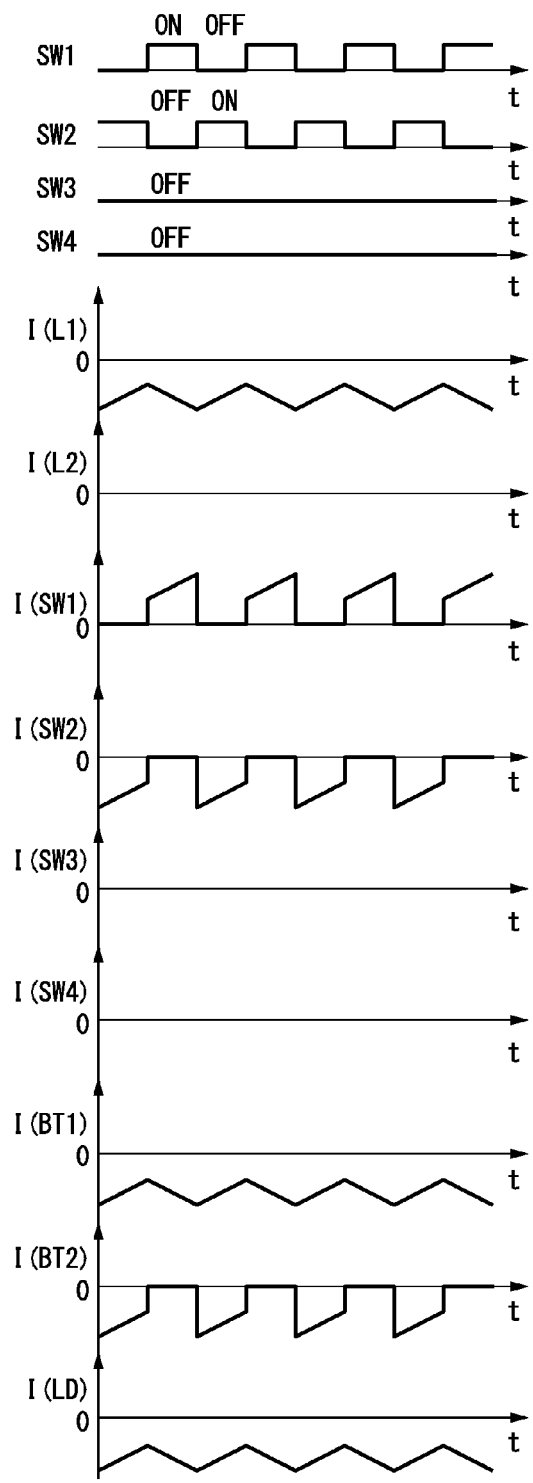
FIG. 18B is a diagram showing ON/OFF of each switching device and a variation of each current when the first direct-current power converter circuit included in the power device according to the second embodiment of the present invention is in the regenerative mode.

For example, as shown in FIGS. 17B and 18B, when the first direct-current power converter circuit 11 is in a regenerative mode where a direct-current power is supplied from to the load 13, the first switching device SW1 is turned on and the second switching device SW2 is turned off. Thereby, current flows via the second power source BT2, the first switching device SW1, the first reactor L1, and the first power source BT1 in series. On the other hand, by turning off the first switching device SW1 and turning on the second switching device SW2, a circulating current flows via the second switching device SW2 and the second diode D2, the first reactor L1, and the first power source BT1 in series.

Figure 17C:
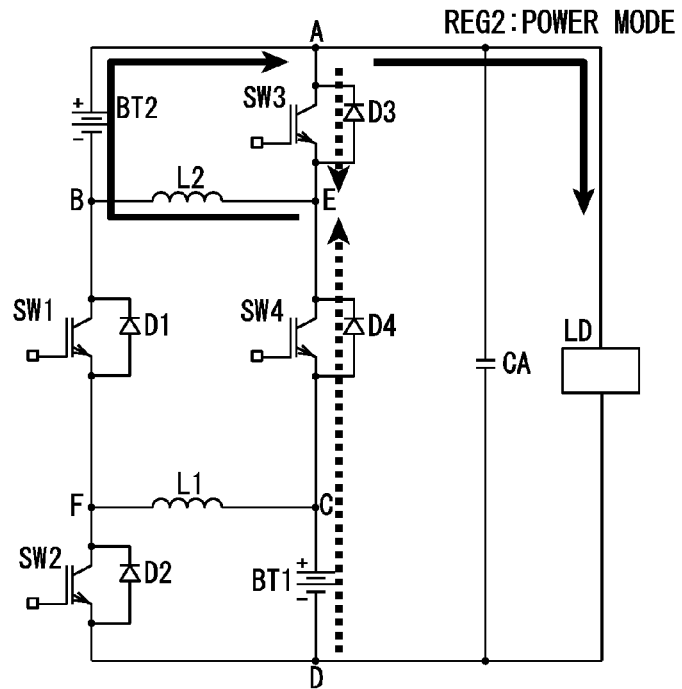
FIG. 17C is a diagram showing ON/OFF of each switching device and a current flow when a second direct-current power converter circuit included in the power device according to the second embodiment of the present invention is in a power mode.
Figure 18C:
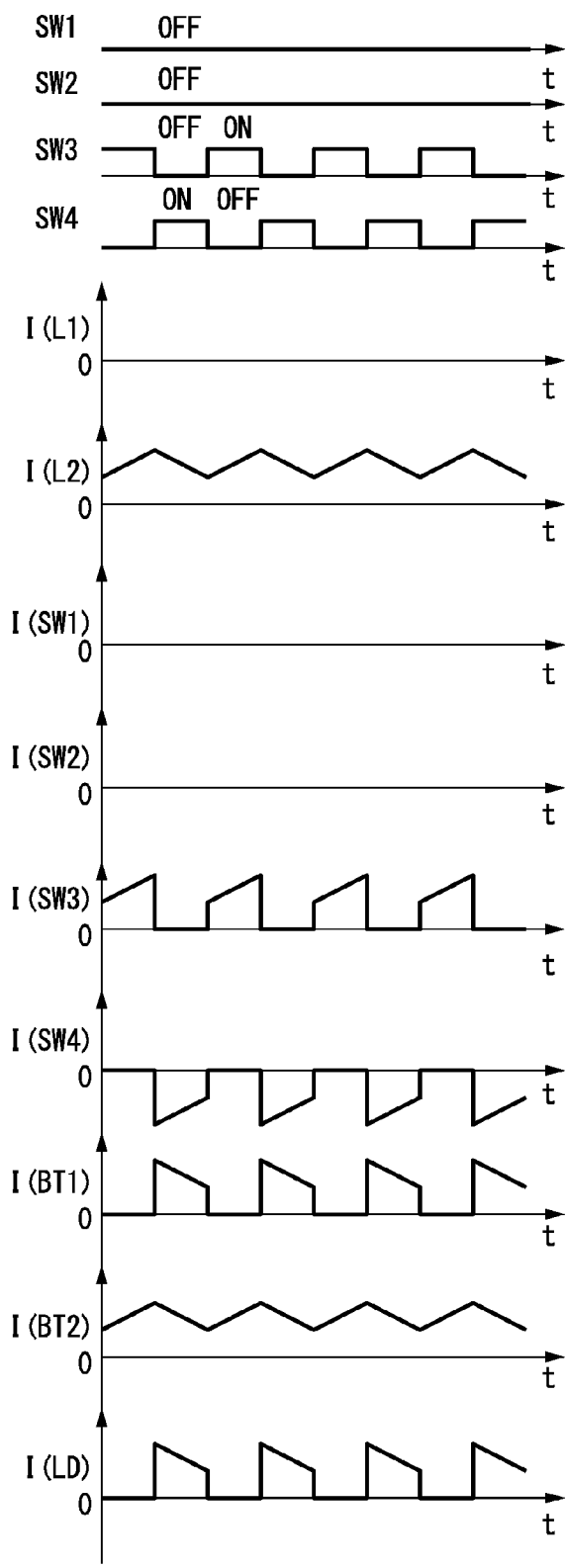
FIG. 18C is a diagram showing ON/OFF of each switching device and a variation of each current when the second direct-current power converter circuit included in the power device according to the second embodiment of the present invention is in the power mode.

For example, as shown in FIGS. 17C and 18C, when the second direct-current power converter circuit 12 is in a power mode where the second direct-current power converter circuit 12 supplies a direct-current power to the load 13, the fourth switching device SW4 is turned off and the third switching device SW3 is turned on. Thereby, the second reactor L2 is excited by flowing a circulating current through the second power source BT2, the third switching device SW3, and the second reactor L2 in series, and a second reactor current I(L2) flowing through the second reactor L2 is increased. On the other hand, by turning on the fourth switching device SW4 and turning off the third switching device SW3, current flows into the load 13 via the first power source BT1, the fourth switching device SW4 and the fourth diode D4, the second reactor L2, and the second power source BT2.

Figure 17D:
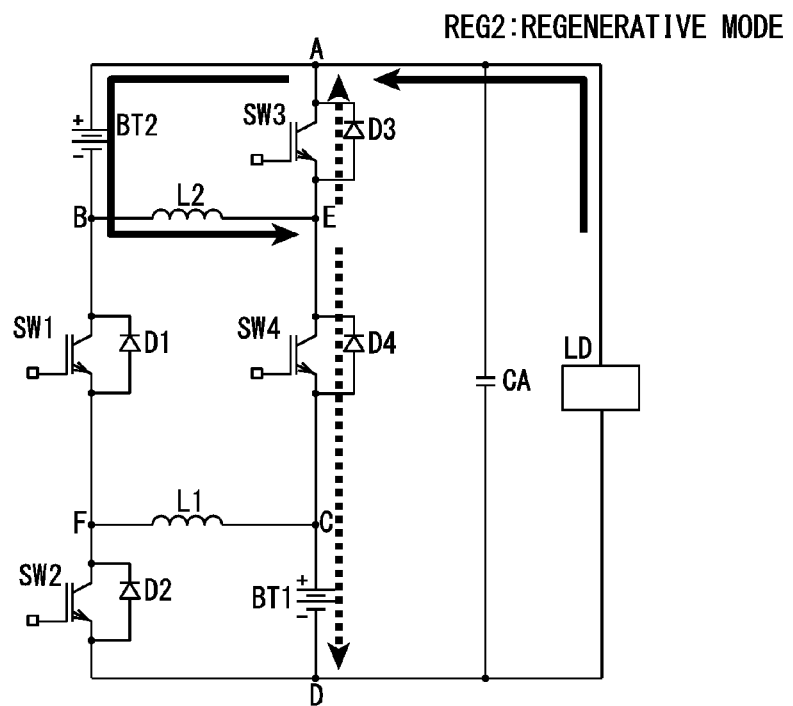
FIG. 17D is a diagram showing ON/OFF of each switching device and a current flow when the second direct-current power converter circuit included in the power device according to the second embodiment of the present invention is in a regenerative mode.
Figure 18D:
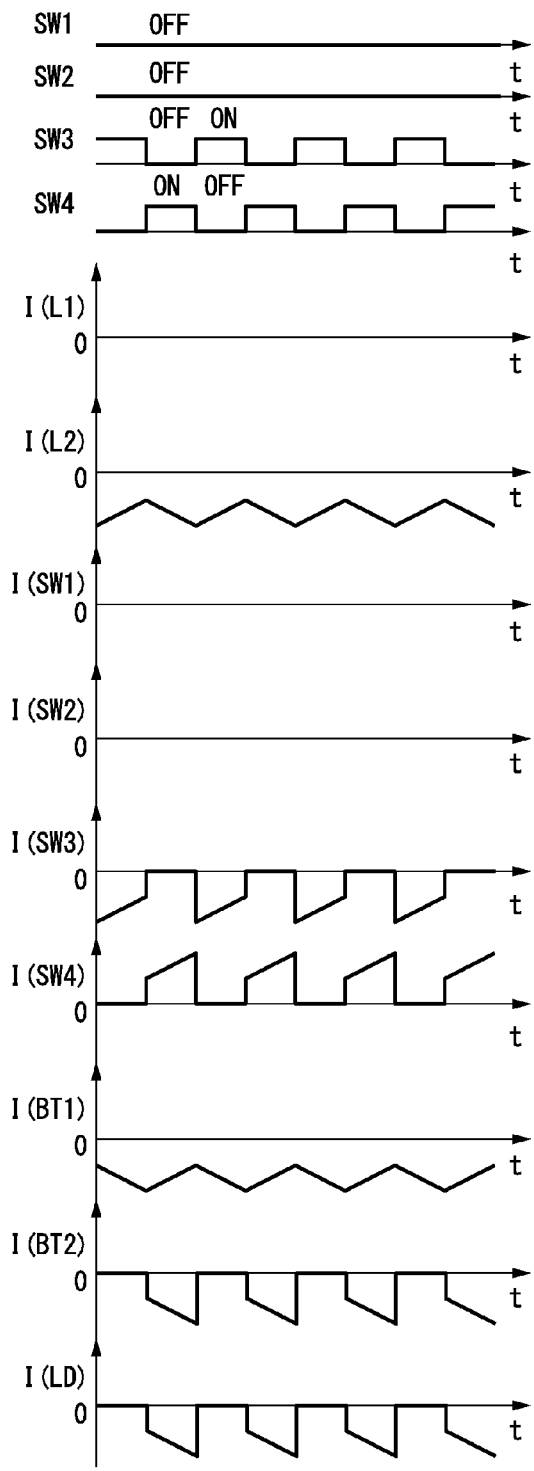
FIG. 18D is a diagram showing ON/OFF of each switching device and a variation of each current when the second direct-current power converter circuit included in the power device according to the second embodiment of the present invention is in the regenerative mode.

For example, as shown in FIGS. 17D and 18D, when the second direct-current power converter circuit 12 is in a regenerative mode where a direct-current power is supplied from to the load 13, the fourth switching device SW4 is turned on and the third switching device SW3 is turned off. Thereby, current flows via the second power source BT2, the second reactor L2, the fourth switching device SW4, and the first power source BT1 in series. On the other hand, by turning off the fourth switching device SW4 and turning on the third switching device SW3, a circulating current flows via the second reactor L2, the third switching device SW3 and the third diode D3, and the second power source BT2 in series.

In a current waveform based on a time t shown in FIGS. 18A to 18D, as shown in FIG. 16, a positive direction of the first reactor current I(L1) flowing through the first reactor L1 is from the third node C to the sixth node F. A positive direction of the second reactor current I(L2) flowing through the second reactor L2 is from the fifth node E to the second node B. A positive direction of summed currents I(SW1) to I(SW4) of currents flowing through the switching devices SW1 to SW4 and the diodes D1 to D4, respectively, is from the collector to the emitter. A positive direction of each current I(BT1) and I(BT2) flowing through first and second power sources BT1 and BT2 is from the negative electrode to the positive electrode. A positive direction of a summed current I(LD) of currents flowing through the load 13 and the capacitor 14 is from the first node A to the fourth node D.

The control device 15 includes a load control unit 21 and a connection switching control unit 22.

The load control unit 21 controls the operation of the load 13. For example, if the load 13 includes an electric motor such as a three-phase brushless DC motor and an inverter for controlling the power mode and regenerative mode of the electric motor, the load control unit 21 controls a power conversion operation of the inverter. In more detail, when the electric motor is in the power mode, the load control unit 21 converts a direct-current power applied between both electrodes at the direct current side of the inverter into a three-phase alternating-current power, performs a commutation of a conduction for each phase of the electric motor sequentially, and thereby, each phase current, which is alternating-current, flows. On the other hand, when the electric motor is in the regenerative mode, the load control unit 21 converts the generated alternating-current power output from the electric motor into a direct-current power, while the load control unit 21 synchronizes based on a rotation angle of the electric motor.

The connection switching control unit 22 can drive the first and second direct-current power converter circuits 11 and 12 independently from each other by inputting signals (PWM signals) based on a pulse width modulation (PWM) into a gate of each switching device SW1 to SW4. The connection switching control unit 22 controls the first and second direct-current power converter circuits 11 and 12 so that a switching operation for at least one of a pair of the first and second switching devices SW1 and SW2 included in the first direct-current power converter circuit 11 and a pair of the third and fourth switching devices SW3 and SW4 included in the second direct-current power converter circuit 12 is performed. Thereby, the connection switching control unit 22 controls a voltage V0 to be applied to the load 13 (a load voltage) to be equal to or more than the summed voltage of the first voltage VB1 and the second voltage VB2 (=VB1+VB2).

The connection switching control unit 22 controls a switching operation of the first switching device SW1 and the second switching device SW2 included in the first direct-current power converter circuit 11 based on a first duty DT1. In the switching operation, the first switching device SW1 and the second switching device SW2 are inverted and the alternative close and open (ON/OFF) switching operations of each switching device SW1 and SW2 are performed. As represented by the following equation (5), the first duty DT1 is defined by ON time t(SW1) of the first switching device SW1 and ON time t(SW2) of the second switching device SW2.

For example, when the first switching device SW1 is turned on and the second switching device SW2 is turned off, the first duty DT1 is 0%. On the other hand, when the first switching device SW1 is turned off and the second switching device SW2 is turned on, the first duty DT1 is 100%.

The connection switching control unit 22 can step up the first voltage VB1 based on the first duty DT1 and output the step-up voltage from the first direct-current power converter circuit 11. The connection switching control unit 22 controls output voltage V10 of the first direct-current power converter circuit 11 (in other words, the voltage applied between the second node B and the fourth node D) based on the first voltage VB1 and the first duty DT1.

$$DT1 = \frac{t(SW2)}{t(SW1)+t(SW2)} = \frac{V0-2\cdot VB2+Vd}{V0-VB2} \quad (5)$$
$$DT2 = \frac{t(SW3)}{t(SW3)+t(SW4)} = \frac{V0-2\cdot VB1-Vd}{V0-VB1}$$

The connection switching control unit 22 controls a switching operation of the third switching device SW3 and the fourth switching device SW4 included in the second direct-current power converter circuit 12 based on a second duty DT2. In the switching operation, the third switching device SW3 and the fourth switching device SW4 are inverted and the alternative close and open (ON/OFF) switching operations of each switching device SW3 and SW4 are performed. As represented by the equation (5) described above, the second duty DT2 is defined by ON time t(SW3) of the third switching device SW3 and ON time t(SW4) of the fourth switching device SW4.

For example, when the fourth switching device SW4 is turned on and the third switching device SW3 is turned off, the second duty DT2 is 0%. On the other hand, when the fourth switching device SW4 is turned off and the third switching device SW3 is turned on, the second duty DT2 is 100%.

The connection switching control unit 22 can step up the second voltage VB2 based on the second duty DT2 and output the step-up voltage from the second direct-current power converter circuit 12. The connection switching control unit 22 controls output voltage V20 of the second direct-current power converter circuit 12 (in other words, the voltage applied between the first node A and the third node C) based on the second voltage VB2 and the second duty DT2.

As represented by the equation (5) described above, the first duty DT1 is represented by the desired load voltage V0, the desired voltage difference Vd (=VB2−VB1), and the second voltage VB2 of the second power source BT2, and the second duty DT2 is represented by the desired load voltage V0, the desired voltage difference Vd (=VB2−VB1), and the first voltage VB1 of the first power source BT1. On the other hand, as represented by the following equation (6), based on the voltage difference Vd (=VB2−VB1), the first duty DT1 can be represented by the first voltage VB1 of the first power source BT1, and the second duty DT2 can be represented by the second voltage VB2 of the second power source BT2. In order to prevent a divergence of control responses, the connection switching control unit 22 may control switching operations using, not the duties DT1 and DT2 represented by the following equation (6), but the duties DT1 and DT2 represented by the equation (5) described above.

$$DT1 = \frac{V0-2\cdot VB1-Vd}{V0-VB1-Vd} \quad (6)$$
$$DT2 = \frac{V0-2\cdot VB2+Vd}{V0-VB2+Vd}$$

The power device 10 according to the second embodiment of the present invention includes the constitution described above. Hereinafter, the operation of the power device 10, in other words, the control operation of the connection switching control unit 22 will be described.

(First Control Mode of the Second Embodiment)

In a first control mode, as shown in FIGS. 17A to 17D and 18A to 18D, the connection switching control unit 22 drives one of the first and second direct-current power converter circuits 11 and 12 at a time. Thereby, the connection switching control unit 22 can control the load voltage V0 to be equal to or more than the summed voltage of the first voltage VB1 and the second voltage VB2 (=VB1+VB2).

Figure 19:
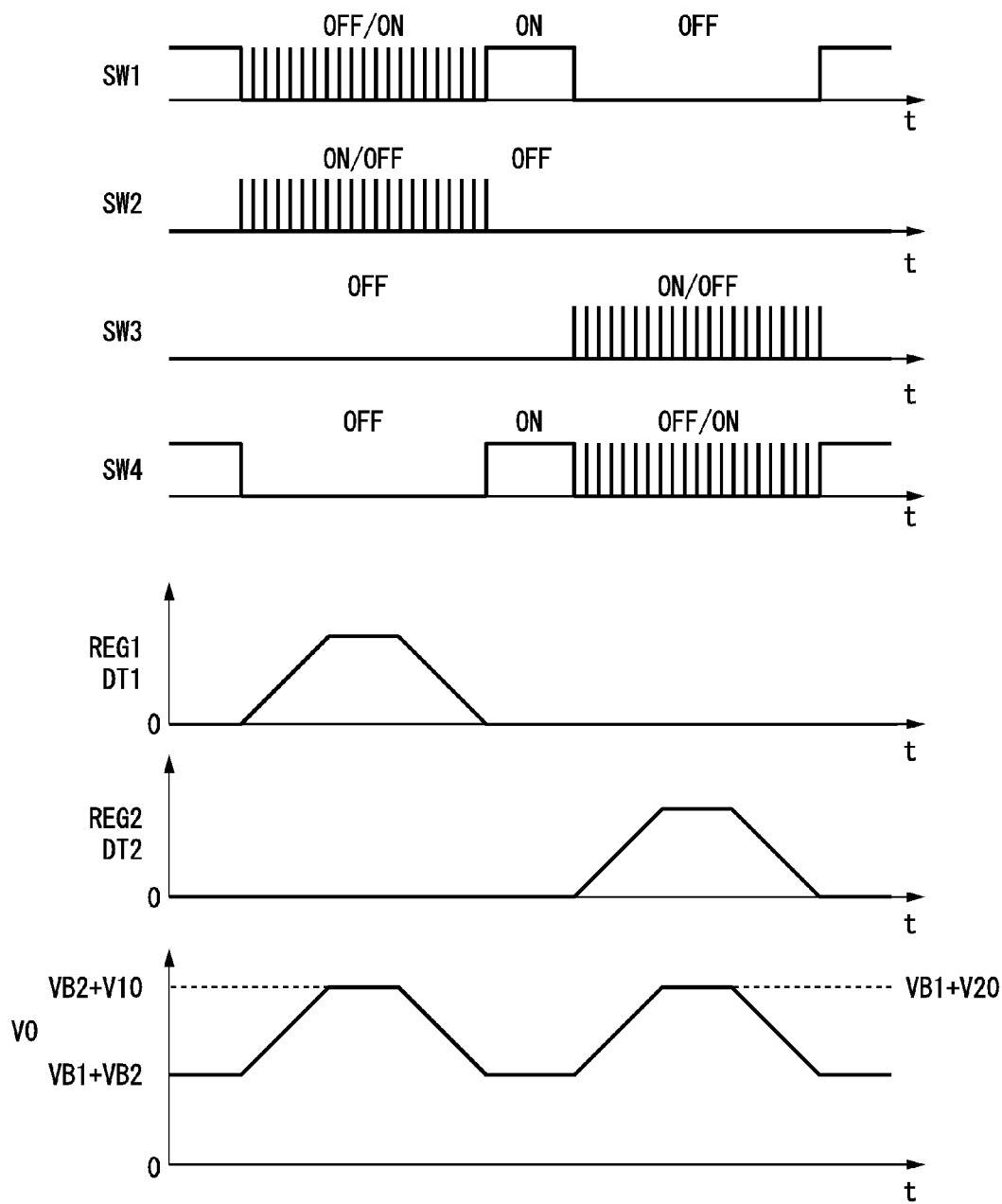
FIG. 19 is a diagram showing a variation of ON/OFF of each switching device, a variation of each first duty and second duty, and a variation of a load voltage when the power device according to the second embodiment of the present invention is in a first control mode.
Figure 20A:
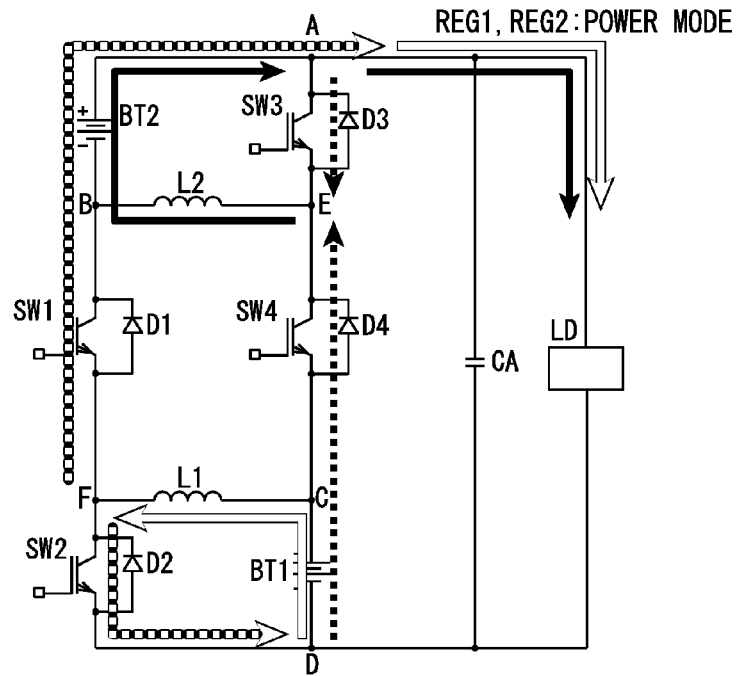
FIG. 20A is a diagram showing ON/OFF of each switching device and each current flow when the power device according to the second embodiment of the present invention is in powering operation of a second control mode.
Figure 20B:
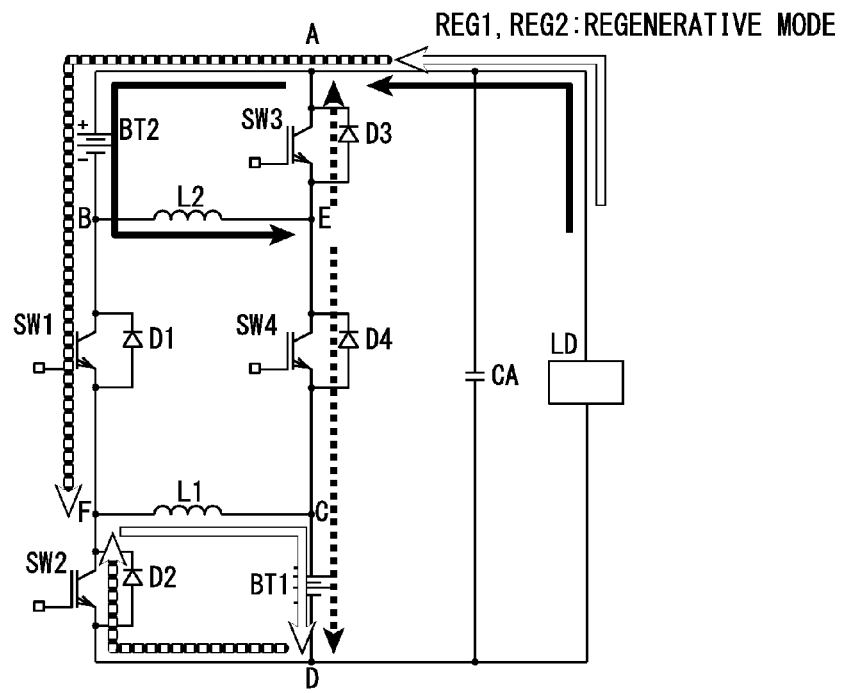
FIG. 20B is a diagram showing ON/OFF of each switching device and each current flow when the power device according to the second embodiment of the present invention is in regenerative operation of the second control mode.
Figure 21A:
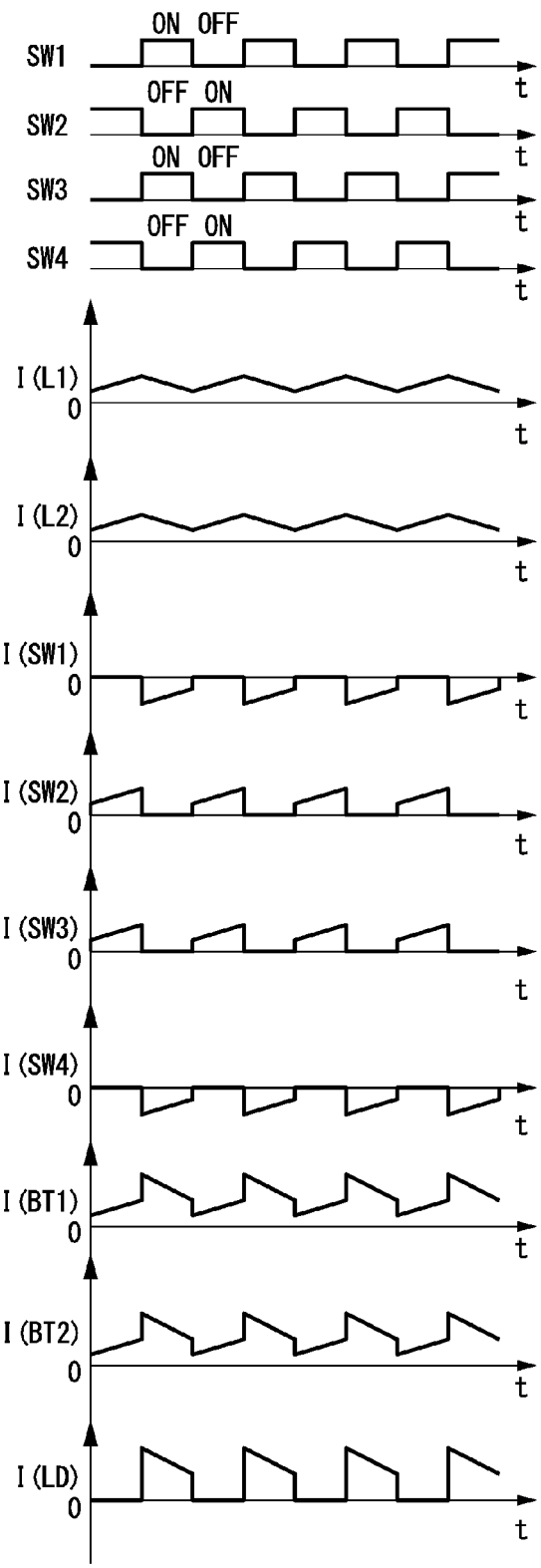
FIG. 21A is a diagram showing ON/OFF of each switching device and a variation of each current when the power device according to the second embodiment of the present invention is in the powering operation of the second control mode.
Figure 21B:
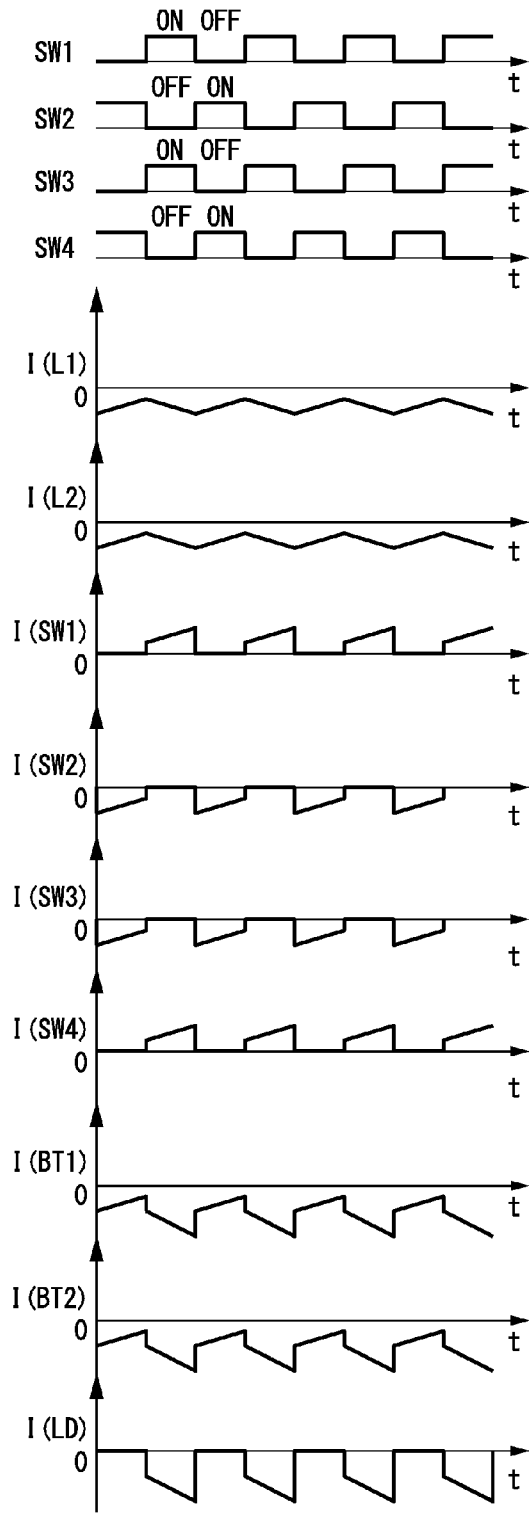
FIG. 21B is a diagram showing ON/OFF of each switching device and the variation of each current when the power device according to the second embodiment of the present invention is in the regenerative operation of the second control mode.
Figure 22A:
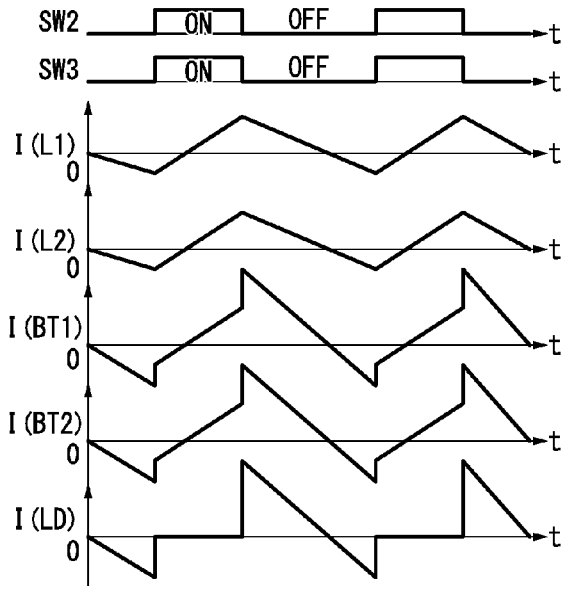
FIG. 22A is a diagram showing ON/OFF of each switching device and the variation of each current when the power device according to the second embodiment of the present invention is in the powering operation of the second control mode.
Figure 22B:
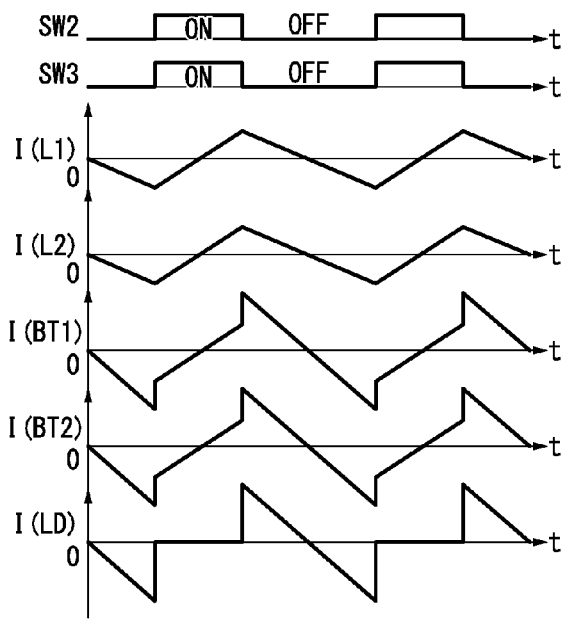
FIG. 22B is a diagram showing ON/OFF of each switching device and the variation of each current when a load included in the power device according to the second embodiment of the present invention in the second control mode is stopped.
Figure 22C:
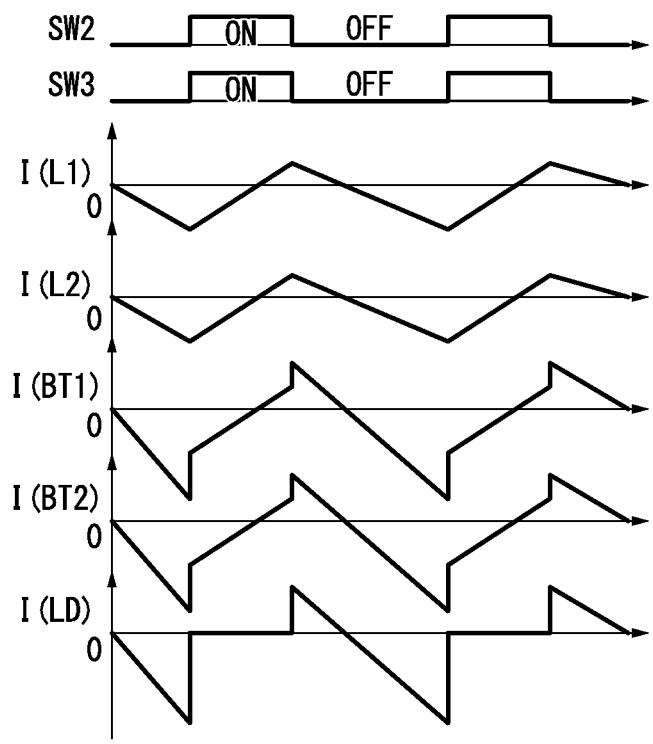
FIG. 22C is a diagram showing ON/OFF of each switching device and the variation of each current when the power device according to the second embodiment of the present invention is in the regenerative operation of the second control mode.

For example, as shown in FIG. 19, the connection switching control unit 22 connects the first and second power sources BT1 and BT2 with the load 13 in series by turning on the first and fourth switching devices SW1 and SW4, and turning off the second and third switching devices SW2 and SW3.

In the condition that the first and second power sources BT1 and BT2 are connected to the load 13 in series, the connection switching control unit 22 performs a switching operation of turning off the fourth switching device SW4 and gradually increasing the first duty DT1 from zero. Thereby, the output voltage V10 of the first direct-current power converter circuit 11 is gradually increased to more than the first voltage VB1 by a back electromotive force of the first reactor L1, and the electric power of the first power source BT1 is supplied to the load 13 and the capacitor 14 via the first reactor L1 and the second power source BT2. Thereby, the capacitor 14 is charged, and the load voltage V0 (=V10+VB2) is gradually increased based on the first duty DT1.

Moreover, the connection switching control unit 22 performs a switching operation of gradually decreasing the first duty DT1 to zero. Thereby, an electrical charge charged in the capacitor 14 is supplied to the first power source BT1 via the second power source BT2 and the first reactor L1 while the electrical charge is consumed in the load 13. Thereby, the first power source BT1 is charged, and the load voltage V0 (=V10+VB2) is gradually decreased based on the first duty DT1. When the first duty DT1 reaches zero, the connection switching control unit 22 turns on the first switching device SW1. Thereby, the first and second power sources BT1 and BT2 are connected to the load 13 in series, and the load voltage V0 is equal to the summed voltage of the first voltage VB1 and the second voltage VB2 (=VB1+VB2). In the condition that the first and second power sources BT1 and BT2 are connected to the load 13 in series, the connection switching control unit 22 may turn on the fourth switching device SW4.

Similarly, in the condition that the first and second power sources BT1 and BT2 are connected to the load 13 in series, the connection switching control unit 22 performs a switching operation of turning off the first switching device SW1 and gradually increasing the second duty DT2 from zero. Thereby, the output voltage V20 of the second direct-current power converter circuit 12 is gradually increased to more than the second voltage VB2 by a back electromotive force of the second reactor L2, and the electric power of the second power source BT2 is supplied to the load 13 and the capacitor 14 via the second reactor L2 and the first power source BT1. Thereby, the capacitor 14 is charged, and the load voltage V0 (=V20+VB1) is gradually increased based on the second duty DT2.

Moreover, the connection switching control unit 22 performs a switching operation of gradually decreasing the second duty DT2 to zero. Thereby, an electrical charge charged in the capacitor 14 is supplied to the second power source BT2 via the first power source BT1 and the second reactor L2 while the electrical charge is consumed in the load 13. Thereby, the second power source BT2 is charged, and the load voltage V0 (=V20+VB1) is gradually decreased based on the second duty DT2. When the second duty DT2 reaches zero, the connection switching control unit 22 turns on the fourth switching device SW4. Thereby, the first and second power sources BT1 and BT2 are connected to the load 13 in series, and the load voltage V0 is equal to the summed voltage of the first voltage VB1 and the second voltage VB2 (=VB1+VB2). In the condition that the first and second power sources BT1 and BT2 are connected to the load 13 in series, the connection switching control unit 22 may turn on the first switching device SW1.

(Second Control Mode of the Second Embodiment)

In a second control mode, as shown in FIGS. 20A, 20B, 21A, 21B, and 22A to 22C, the connection switching control unit 22 simultaneously drives the first and second direct-current power converter circuits 11 and 12. The phase of the switching operation of the first direct-current power converter circuit 11 is the same as that of the second direct-current power converter circuit 12. Thereby, the connection switching control unit 22 can control the load voltage V0 to be equal to or more than the summed voltage of the first voltage VB1 and the second voltage VB2 (=VB1+VB2). In this case, regarding the current flowing through each switching device SW1 to SW4, each diodes D1 to D4, and each reactor L1 and L2, the currents which flow in the operations of the first direct-current power converter circuit 11 do not interfere those in the operations of the second direct-current power converter circuit 12. The current flowing through each first and second power source BT1 and BT2, and the load 13 and the capacitor 14 is generated by combining currents based on the mutual operations of the first and second direct-current power converter circuits 11 and 12.

For example, as shown in FIG. 23, the connection switching control unit 22 connects the first and second power sources BT1 and BT2 with the load 13 in series by turning on the first and fourth switching devices SW1 and SW4, and turning off the second and third switching devices SW2 and SW3.

Figure 24:
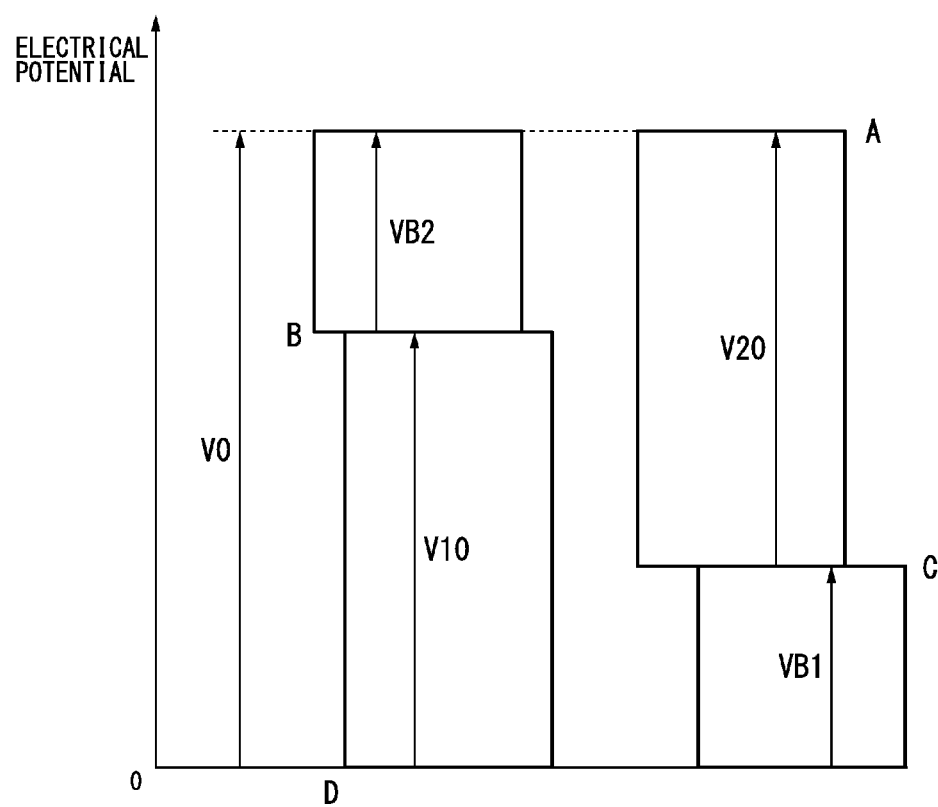
FIG. 24 is a diagram showing a relationship of the load voltage, first and second voltages, and each output voltage in the power device according to the second embodiment of the present invention.

In the condition that the first and second power sources BT1 and BT2 are connected to the load 13 in series, the connection switching control unit 22 performs a switching operation of gradually increasing the first and second duties DT1 and DT2 from zero. Thereby, the output voltage V10 of the first direct-current power converter circuit 11 is gradually increased to more than the first voltage VB1 by a back electromotive force of the first reactor L1, the output voltage V20 of the second direct-current power converter circuit 12 is gradually increased to more than the second voltage VB2 by a back electromotive force of the second reactor L2, and the electric power is supplied to the load 13 and the capacitor 14. Thereby, the capacitor 14 is charged, and the load voltage V0 (=V10+VB2=V20+VB1) as shown in FIG. 24 is gradually increased based on the first and second duties DT1 and DT2.

Moreover, the connection switching control unit 22 performs a switching operation of gradually decreasing the first and second duties DT1 and DT2 to zero. Thereby, an electrical charge charged in the capacitor 14 is supplied to the first and second power sources 13T1 and BT2 while the electrical charge is consumed in the load 13. Thereby, the first and second power sources BT1 and BT2 are charged, and the load voltage V0 (=V10+VB2=V20+VB1) is gradually decreased based on the first and second duties DT1 and DT2. When the first and second duties DT1 and DT2 reach zero, the first and second power sources BT1 and BT2 are connected to the load 13 in series, and the load voltage V0 is equal to the summed voltage of the first voltage VB1 and the second voltage VB2 (=VB1+VB2).

(Third Control Mode of the Second Embodiment)

Figure 25A:
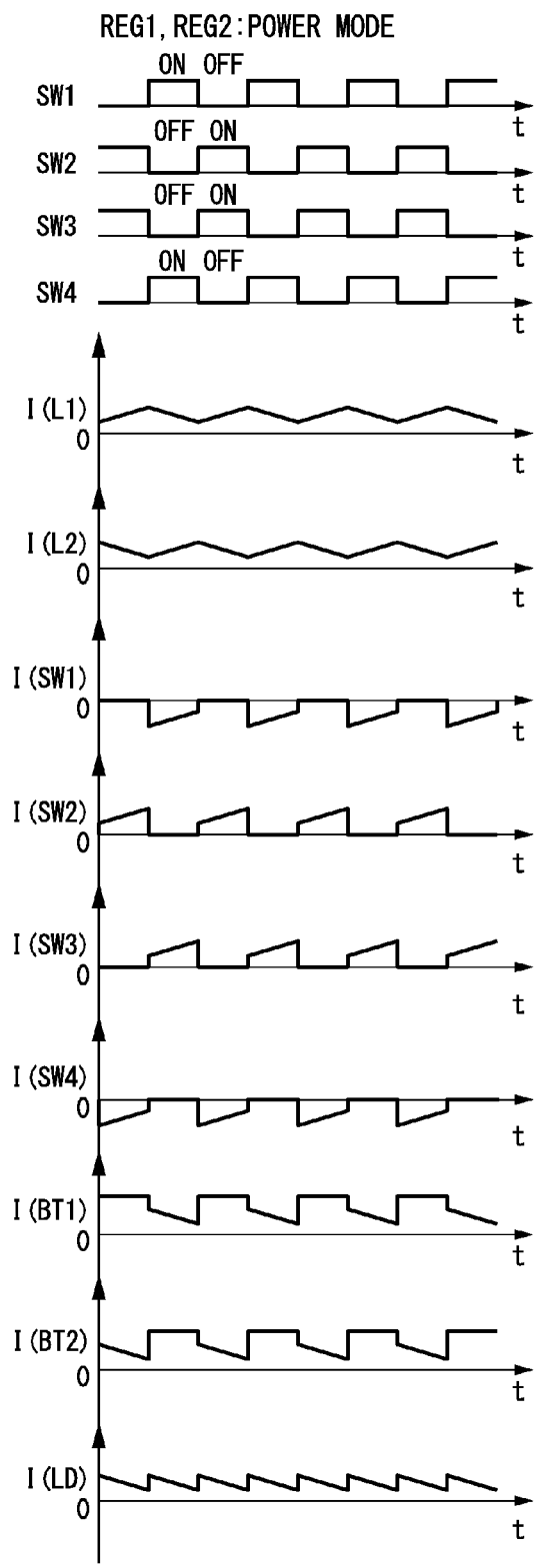
FIG. 25A is a diagram showing ON/OFF of each switching device and the variation of each current when the power device according to the second embodiment of the present invention is in powering operation of a third control mode.

In a third control mode, as shown in FIGS. 25A and 25B, the connection switching control unit 22 simultaneously drives the first and second direct-current power converter circuits 11 and 12. The phase of the switching operation of the first direct-current power converter circuit 11 is opposite to that of the second direct-current power converter circuit 12. Thereby, the connection switching control unit 22 can control the load voltage V0 to be equal to or more than the summed voltage of the first voltage VB1 and the second voltage VB2 (=VB1+VB2). Since the ripple of current based on the operation of the first direct-current power converter circuit 11 and that of the second direct-current power converter circuit 12 are superimposed in the opposite phase each other, the ripple of current flowing through the load 13 and the capacitor 14 can be decreased in comparison with the second control mode.

(Fourth Control Mode of the Second Embodiment)

In a fourth control mode, the connection switching control unit 22 simultaneously drives the first and second direct-current power converter circuits 11 and 12 in the condition that the first and second reactors L1 and L2 are magnetically coupled. The phase of the switching operation of the first direct-current power converter circuit 11 is arbitrarily shifted from that of the second direct-current power converter circuit 12 (for example, a phase shift is 180°). Thereby, the ripple frequency of each first and second reactor current I(L1) and I(L2) can be greater than the switching frequency. For example, even if the switching frequency is within an audible band, a frequency of magnetostrictive noise generated in the first and second reactors L1 and L2 can be set to be outside the audible band. Thereby, the noise can be suppressed.

The first and second reactors L1 and L2 are magnetically coupled by, for example, winding the first and second reactors L1 and L2 around a common core so that they share a magnetic path. Moreover, the first and second reactors L1 and L2 may be provided by, for example, winding the first and second reactors L1 and L2 around a common core so that they share a magnetic path in opposite directions each other (reverse phase). In this case, the first reactor current I(L1) and second reactor current I(L2) flow so that magnetizations of the magnetic path are canceled.

Figure 26:
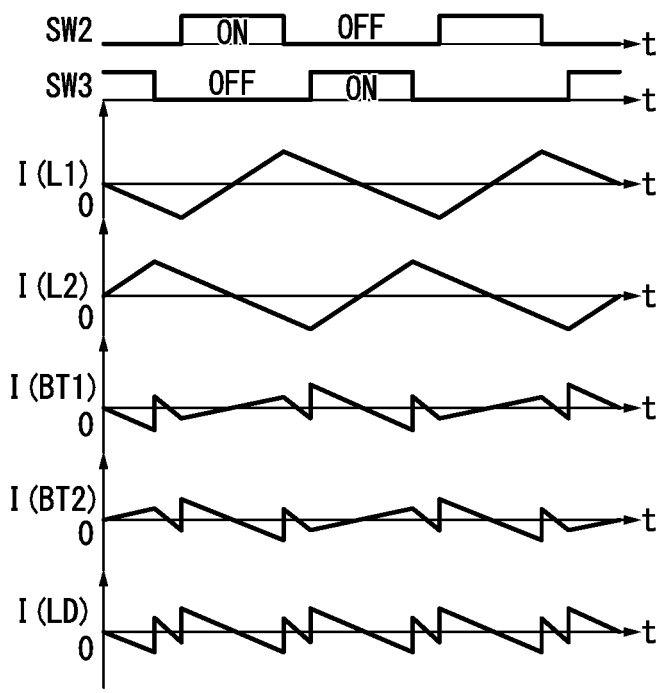
FIG. 26 is a diagram showing ON/OFF of each switching device and the variation of each current when a load, which is included in the power device according to the second embodiment of the present invention in a fourth control mode, is stopped and the power device does not have a magnetic coupling.

For example, as shown in FIG. 26, in the condition that the first and second reactors L1 and L2 are not magnetically coupled, the connection switching control unit 22 switches the increase condition and decrease condition of the first reactor current I(L1) by switching ON and OFF of the second switching device SW2. Moreover, the connection switching control unit 22 switches the increase condition and decrease condition of the second reactor current I(L2) by switching ON and OFF of the third switching device SW3.

Figure 27:
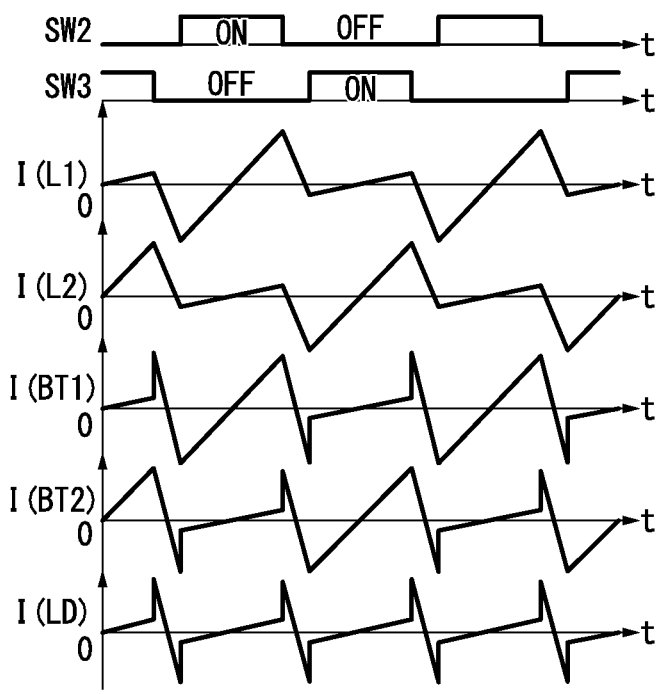
FIG. 27 is a diagram showing ON/OFF of each switching device and the variation of each current when the load, which is included in the power device according to the second embodiment of the present invention in the fourth control mode, is stopped and the power device has the magnetic coupling.

On the other hand, for example, as shown in FIG. 27, in the condition that the first and second reactors L1 and L2 are magnetically coupled, the connection switching control unit 22 increases the first reactor current I(L1) by turning on the second switching device SW2 included in the first direct-current power converter circuit 11. Subsequently, by turning off the second switching device SW2, and then, by turning on the third switching device SW3 in the condition that the first reactor current I(L1) is decreasing, the second reactor current I(L2) is increased. Thereby, an inductive voltage caused by the magnetic coupling is generated in the first reactor L1, and the condition of the first reactor current I(L1) is changed from the decrease to the increase. Subsequently, by turning off the third switching device SW3, the second reactor current I(L2) is decreased, and the first reactor current I(L1) is decreased.

Moreover, the connection switching control unit 22 increases the second reactor current I(L2) by turning on the third switching device SW3 included in the second direct-current power converter circuit 12.

Subsequently, by turning off the third switching device SW3, and then, by turning on the second switching device SW2 in the condition that the second reactor current I(L2) is decreasing, the first reactor current I(L1) is increased. Thereby, an inductive voltage caused by the magnetic coupling is generated in the second reactor L2, and the condition of the second reactor current I(L2) is changed from the decrease to the increase. Subsequently, by turning off the second switching device SW2, the first reactor current I(L1) is decreased, and the second reactor current I(L2) is decreased.

(Fifth Control Mode of the Second Embodiment)

In a fifth control mode, when the connection switching control unit 22 simultaneously drives the first and second direct-current power converter circuits 11 and 12, the connection switching control unit 22 can arbitrarily control the first voltage VB1, the second voltage VB2, and the load voltage V0 by changing at least one of the first and second duties DT1 and DT2.

For example, if the first duty DT1 is different from the second duty DT2, the step-up ratio of the first direct-current power converter circuit 11 (the ratio of the first voltage VB1 of the first direct-current power converter circuit 11) is different from that of the second direct-current power converter circuit 12 (the ratio of the second voltage VB2 of the second direct-current power converter circuit 12 and the output voltage V20). Thereby, an electric charge is transported between the first power source BT1 and the second power source BT2. Thereby, the first and second voltages VB1 and VB2 are changed, and are balanced based on the step-up ratios of the first and second direct-current power converter circuits 11 and 12.

For example, as shown in FIG. 28, in the condition that the summed voltage of the first voltage VB1 and the output voltage V20 (VB1+V20) is different from the summed voltage of the second voltage VB2 and the output voltage V10 (VB2+V10), the electric charge is transported between the first and second power sources BT1 and BT2. Thereby, in the balanced condition, the summed voltage of the first voltage VB1' and the output voltage V20' (VB1'+V20') is equal to the summed voltage of the second voltage VB2' and the output voltage V10' (VB2'+V10').

Figure 29A:
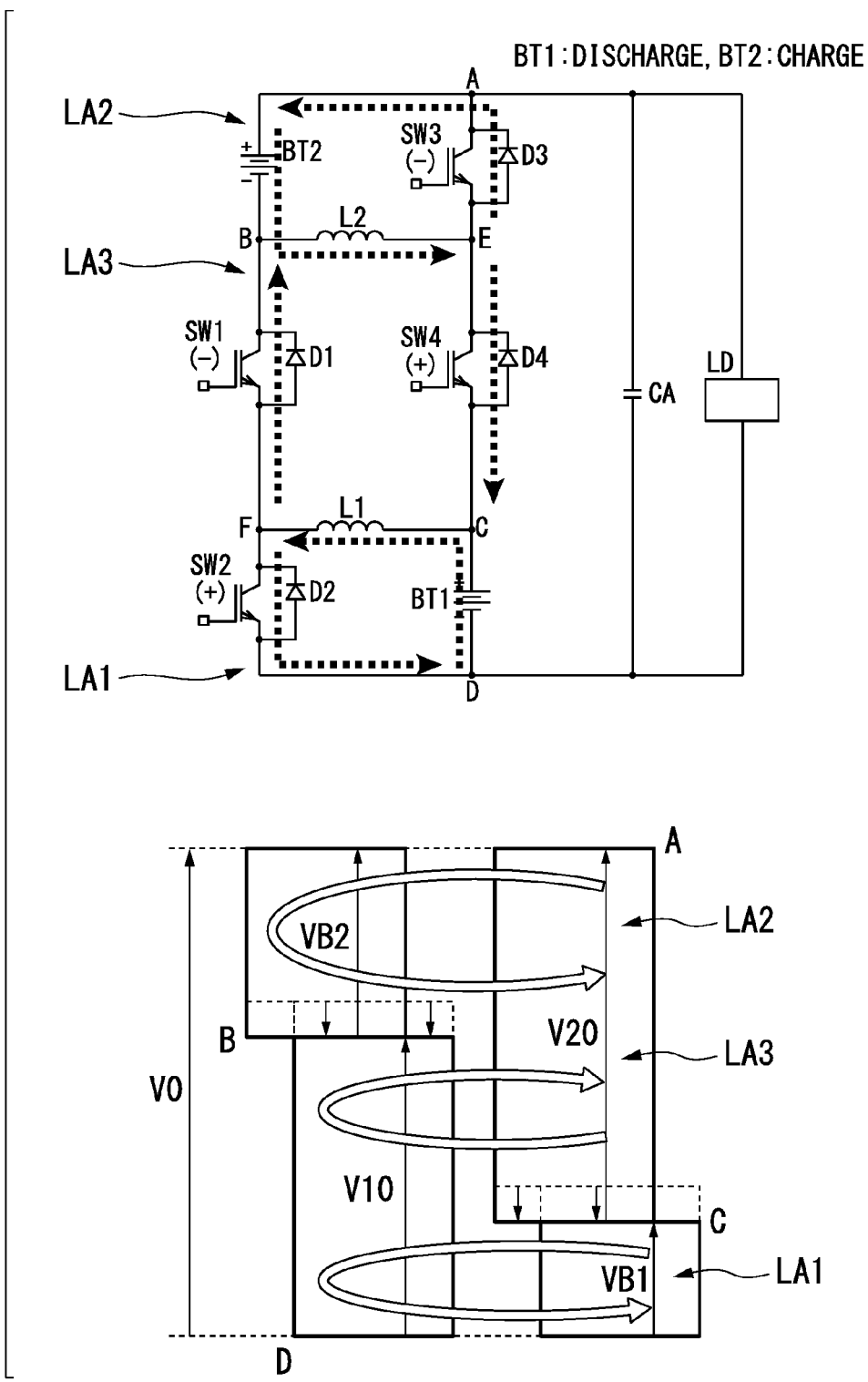
FIG. 29A is a diagram showing flows of first to third loop currents when the power device according to the second embodiment of the present invention is in the fifth control mode.

For example, as shown in FIG. 29A, if the connection switching control unit 22 increases the step-up ratio of the first direct-current power converter circuit 11 (=V10/VB1) and decreases the step-up ratio of the second direct-current power converter circuit 12 (=V20/VB2) while the connection switching control unit 22 maintains the load voltage V0, the connection switching control unit 22 increases the first duty DT1 and decreases the second duty DT2. Thereby, three loop currents LA1, LA2, and LA3, which act as a so-called energy buffer for the transport of the electric charge between the first power source BT1 and the second power source BT2, are generated so that the first power source BT1 is discharged and the second power source BT2 is charged. The first loop current LA1 circulates through the third node C, the sixth node F, and the fourth node D in series. The second loop current LA2 circulates through the first node A, the second node B, and the fifth node E in series. The third loop current LA3 circulates through the third node C, the sixth node F, the second node B, and the fifth node E in series so that the third loop current LA3 is connected to the first loop current LA1 and second loop current LA2.

Figure 29B:
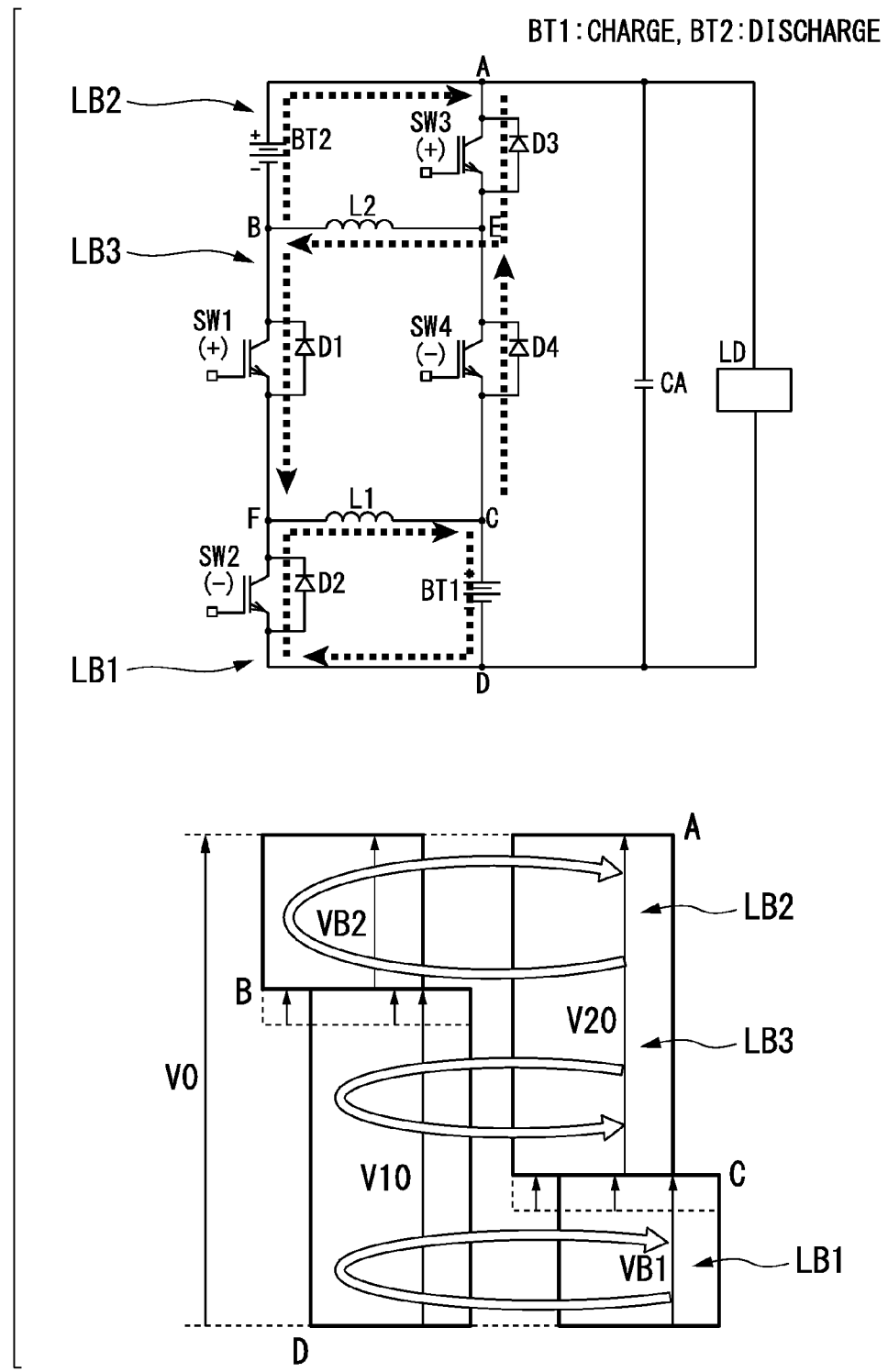
FIG. 29B is a diagram showing flows of the first to third loop currents when the power device according to the second embodiment of the present invention is in the fifth control mode.

As shown in FIG. 29B, if the connection switching control unit 22 decreases the step-up ratio of the first direct-current power converter circuit 11 (=V10/VB1) and increases the step-up ratio of the second direct-current power converter circuit 12 (=V20/VB2) while the connection switching control unit 22 maintains the load voltage V0, the connection switching control unit 22 decreases the first duty DT1 and increases the second duty DT2. Thereby, three loop currents LB1, LB2, and LB3, which act as a so-called energy buffer for the transport of the electric charge between the first power source BT1 and the second power source BT2, are generated so that the second power source BT2 is discharged and the first power source BT1 is charged. The first loop current LB1 circulates through the sixth node F, the third node C, and the fourth node D in series. The second loop current LB2 circulates through the first node A, the fifth node E, and the second node B in series. The third loop current LB3 circulates through the sixth node F, the third node C, the fifth node E, and the second node B in series so that the third loop current LB3 is connected to the first loop current LB1 and second loop current LB2.

(Sixth to Ninth Control Modes of the Second Embodiment)

In relation to the first to fourth control modes, the connection switching control unit 22 in sixth to ninth control modes can control any one of parameters to corresponded to an arbitrary target value while the connection switching control unit 22 maintains each parameters other than the one parameter at an arbitrary value by adjusting the first and second duties DT1 and DT2. The parameters include the load voltage V0, the voltage difference Vd (=VB2−VB1), the first voltage VB1, and the second voltage VB2.

In the sixth control mode, the connection switching control unit 22 can control the load voltage V0 to correspond to an arbitrary target load voltage Va while the connection switching control unit 22 maintains the value of each parameter other than the load voltage V0 independently from the condition of the load 13.

In the seventh control mode, the connection switching control unit 22 can control the voltage difference Vd (=VB2−VB1) to correspond to an arbitrary target voltage difference Vda while the connection switching control unit 22 maintains the value of each parameter other than the voltage difference Vd (=VB2−VB1) independently from the charge and discharge conditions of the first and second power sources BT1 and BT2.

In the eighth control mode, the connection switching control unit 22 can control the first voltage VB1 to correspond to an arbitrary target first voltage VB1a while the connection switching control unit 22 maintains the value of each parameter other than the first voltage VB1 independently from the condition of the first power source BT1.

In the ninth control mode, the connection switching control unit 22 can control the second voltage VB2 to correspond to an arbitrary target second voltage VB2a while the connection switching control unit 22 maintains the value of each parameter other than the second voltage VB2 independently from the condition of the second power source BT2.

(Tenth Control Mode of the Second Embodiment)

Figure 30A:
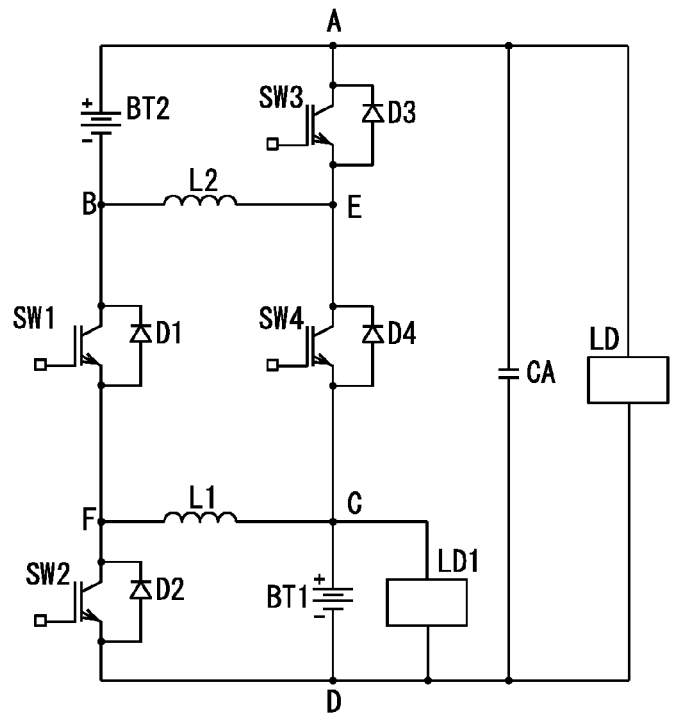
FIG. 30A is a configuration diagram showing the power device according to the second embodiment of the present invention in a tenth control mode.
Figure 30B:
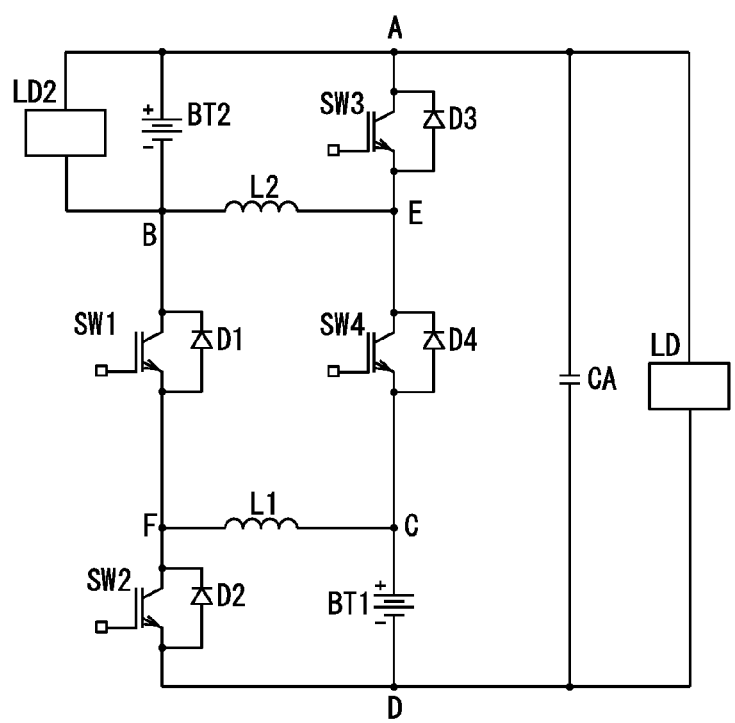
FIG. 30B is a configuration diagram showing the power device according to the second embodiment of the present invention in the tenth control mode.
Figure 30C:
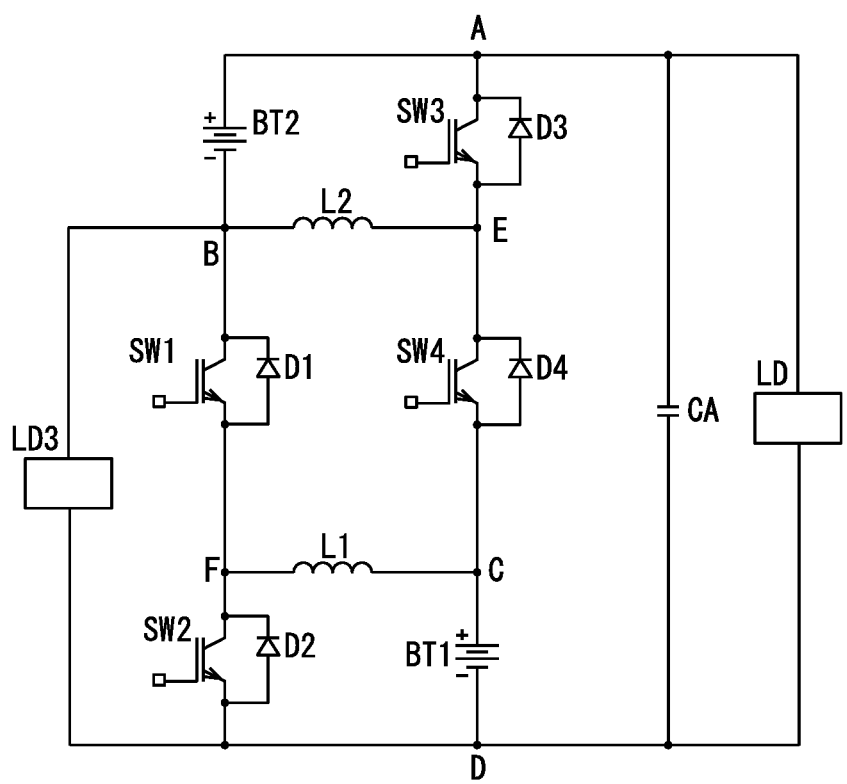
FIG. 30C is a configuration diagram showing the power device according to the second embodiment of the present invention in the tenth control mode.

In relation to the first to ninth control modes, as shown in FIGS. 30A to 30C, if other loads (for example, first to third loads LD1, LD2, and LD3) are connected in addition to the load 13, the connection switching control unit 22 in a tenth control mode can control a voltage at any location to correspond an arbitrary target value by adjusting the first and second duties DT1 and DT2.

As described above, the power device 10 according to the second embodiment of the present invention can easily control the load voltage V0 to be an arbitrary voltage, which is equal to or more than the summed voltage of the first voltage VB1 and the second voltage VB2 (=VB1+VB2), by controlling the first duty DT1 and the second duty DT2.

Moreover, by generating the loop circuit LC in the first and second direct-current power converter circuits 11 and 12, and generating the loop currents LA1 to LA3 and LB1 to LB3, which act as a so-called energy buffer for the transport of the electric charge between the first power source BT1 and the second power source BT2, the balance of charge and discharge of each first power source BT1 and second power source BT2 can be stabilized almost automatically, without requiring, for example, a feedback control.

When the first direct-current power converter circuit 11 performs a step-up operation, the first duty DT1 represented by the second voltage VB2 is used. When the second direct-current power converter circuit 12 performs a step-up operation, the second duty DT2 represented by the first voltage VB1 is used. Thereby, a divergence of control responses can be prevented.

Moreover, since the first reactor L1 and the second reactor L2 are magnetically coupled, the frequency of each first and second reactor current I(L1) and I(L2) can be greater than the switching frequency, and a frequency of magnetostrictive noise generated in the first and second reactors L1 and L2 can be increased to outside the audible band.

Moreover, since the first reactor L1 and the second reactor L2 are provided to perform a magnetic-field cancellation, a generation of magnetic saturation in the first and second reactors L1 and L2 is suppressed. Thereby, each element can be reduced in size.

(First Variation of the Second Embodiment)

Figure 31:
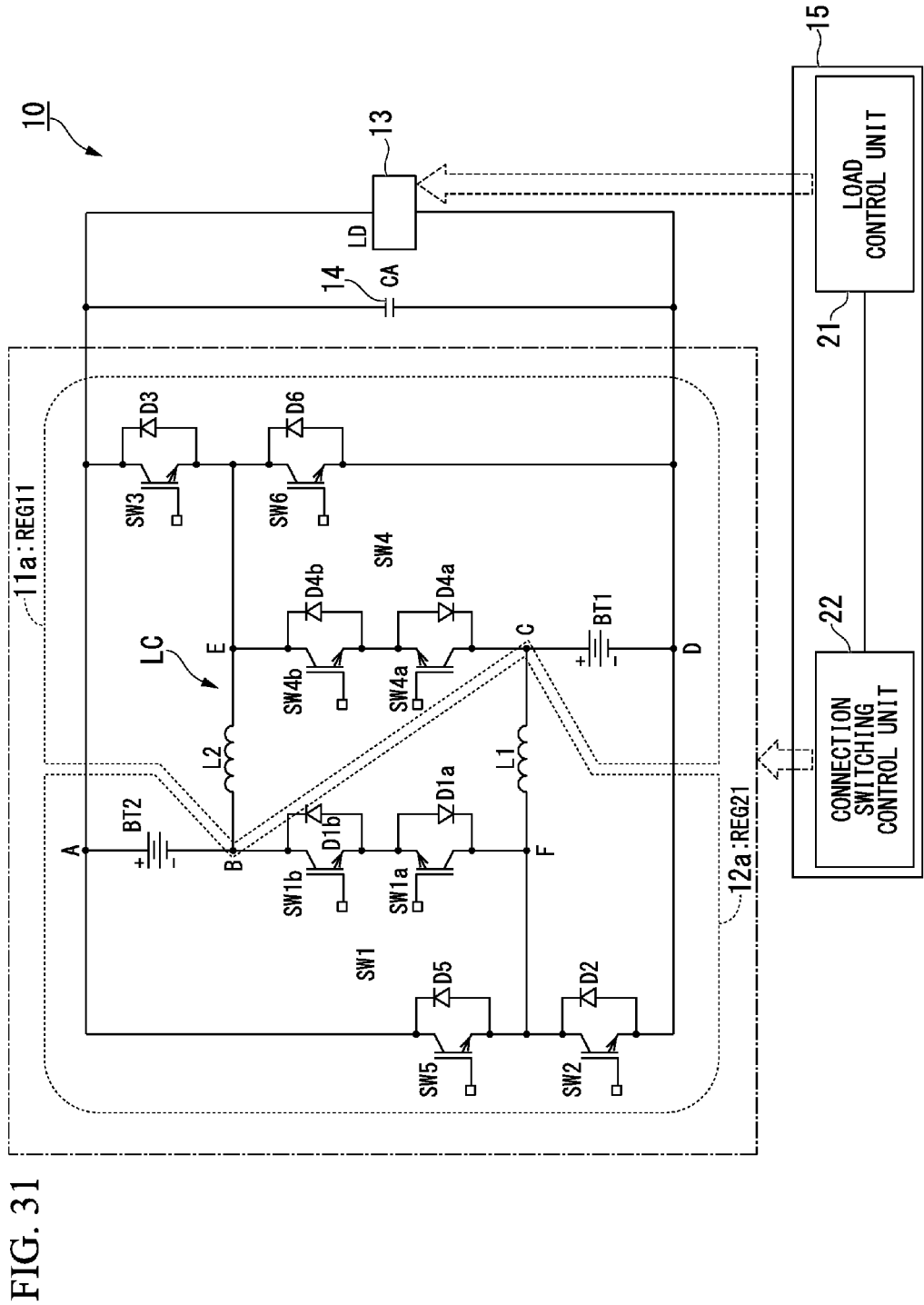
FIG. 31 is a configuration diagram showing a power device according to a first variation of the second embodiment of the present invention.
Figure 32:
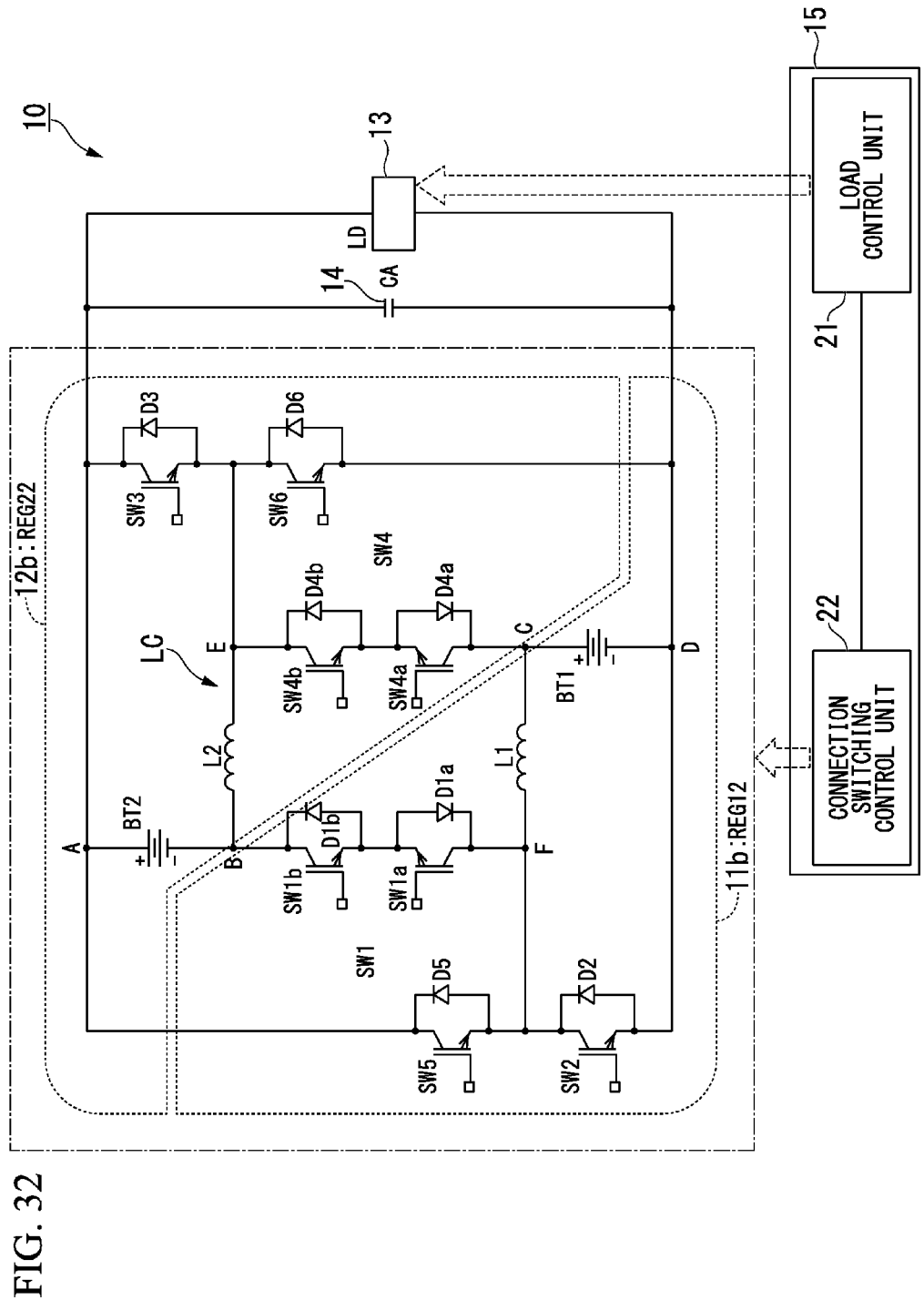
FIG. 32 is a configuration diagram showing the power device according to the first variation of the second embodiment of the present invention.

As shown in FIGS. 31 and 32, a power device 10 according to a first variation of the second embodiment of the present invention includes first and fourth switching devices SW1 and SW4, each of which is a bidirectional switch, and further includes fifth and sixth switching devices SW5 and SW6 in comparison with the second embodiment described above.

The power device 10 according to the first variation can control a voltage V0 to be in the range from the larger of a first voltage VB1 and a second voltage VB2 to the summed voltage of the first and the second voltages VB1 and VB2 (=VB1+VB2), or to be equal to or more than the summed voltage of the first and the second voltages VB1 and VB2 (=VB1+VB2).

As shown in FIG. 31, the power device 10 according to the first variation includes a first step-down direct-current power converter circuit (REG11) 11a, a second step-down direct-current power converter circuit (REG21) 12a, a load (LD) 13, a capacitor (CA) 14, and a control device 15.

As shown in FIG. 32, the power device 10 includes a first step-up direct-current power converter circuit (REG12) 11b and a second step-up direct-current power converter circuit (REG22) 12b, instead of the first and second step-down direct-current power converter circuits 11a and 12a.

The first step-down direct-current power converter circuit (REG11) 11a includes a first power source BT1, third, fourth, and sixth switching devices SW3, SW4, and SW6, which configure a second switch group, and a second reactor L2.

The second step-down direct-current power converter circuit (REG21) 12a includes a second power source BT2, first, second, and fifth switching devices SW1, SW2, and SW5, which configure a first switch group, and a first reactor L1.

The first step-up direct-current power converter circuit (REG12) 11b includes a first power source BT1, first, second, and fifth switching devices SW1, SW2, and SW5, which configure a first switch group, and a first reactor L1.

The second step-up direct-current power converter circuit (REG22) 12b includes a second power source BT2, third, fourth, and sixth switching devices SW3, SW4, and SW6, which configure a second switch group, and a second reactor L2.

The first switching device SW1, which is the bidirectional switch, includes, for example, two switching devices SW1a and SW1b. These two switching devices SW1a and SW1b are connected in series to have opposite polarities. The fourth switching device SW4, which is the bidirectional switch, includes, for example, two switching devices SW4a and SW4b. These two switching devices SW4a and SW4b are connected in series to have opposite polarities.

A collector and an emitter of the fifth switching device SW5 are connected to a first node A and a sixth node F, respectively. A collector and an emitter of the sixth switching device SW6 are connected to a fifth node E and a fourth node D, respectively. Diodes D5 and D6 are connected between the emitter and collector of the fifth and sixth switching devices SW5 and SW6, respectively. The direction from the emitter to the collector of each switching device SW5 and SW6 is a forward direction of each diode D5 and D6.

The first and second step-down direct-current power converter circuits 11a and 12a are controlled based on pulse-width-modulated signals (PWM signals) output from the control device 15 and input into a gate of each switching device SW1 to SW6 so that the first and second step-down direct-current power converter circuits 11a and 12a are driven independently from each other. The first and second step-up direct-current power converter circuits 11b and 12b are controlled based on pulse-width-modulated signals (PWM signals) output from the control device 15 and input into a gate of each switching device SW1 to SW6 so that the first and second step-up direct-current power converter circuits 11b and 12b are driven independently from each other.

In more detail, when the load voltage V0 is more than the summed voltage of the first and second voltages VB1 and VB2 (=VB1+VB2), the first and second step-down direct-current power converter circuits 11a and 12a are controlled so that a switching operation for at least one of a pair of the fourth and sixth switching devices SW4 and SW6 included in the first step-down direct-current power converter circuit 11a and a pair of the first and fifth switching devices SW1 and SW5 included in the second step-down direct-current power converter circuit 12a is performed.

When the load voltage V0 is more than the summed voltage of the first and second voltages VB1 and VB2 (=VB1+VB2), the first and second step-up direct-current power converter circuits 11b and 12b are controlled so that a switching operation for at least one of a pair of the first and second switching devices SW1 and SW2 included in the first step-up direct-current power converter circuit 11b and a pair of the third and fourth switching devices SW3 and SW4 included in the second step-up direct-current power converter circuit 12b is performed.

In these switching operations, close (ON) and open (OFF) of each switching device SW1 to SW6 are switched alternately.

Figure 33A:
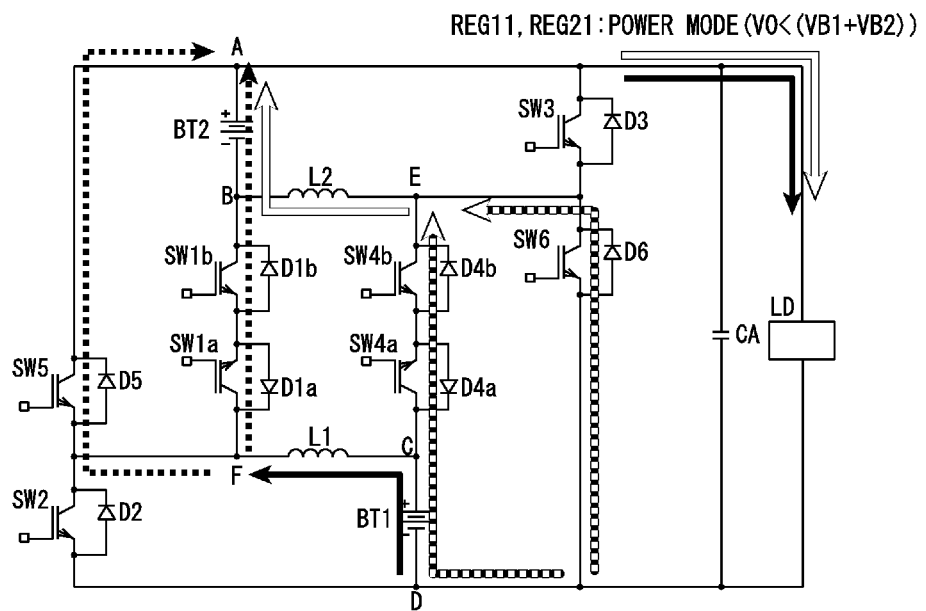
FIG. 33A is a diagram showing each current flow when the power device according to the first variation of the second embodiment of the present invention is in a power mode.

For example, as shown in FIG. 33A, when the load voltage V0 is less than the summed voltage of the first and second voltages VB1 and VB2 (=VB1+VB2) and the first step-down direct-current power converter circuit (REG11) 11a is in a power mode where the first step-down direct-current power converter circuit (REG11) 11a supplies a direct-current power to the load 13, the sixth switching device SW6 is turned off and the fourth switching device SW4 is turned on. Thereby, current flows into the load 13 via the first power source BT1, the fourth switching device SW4, the second reactor L2, and the second power source BT2 in series. On the other hand, by turning on the sixth switching device SW6 and turning off the fourth switching device SW4, a circulating current flows via the sixth switching device SW6 and the sixth diode D6, the second reactor L2, and the second power source BT2 in series.

Figure 33B:
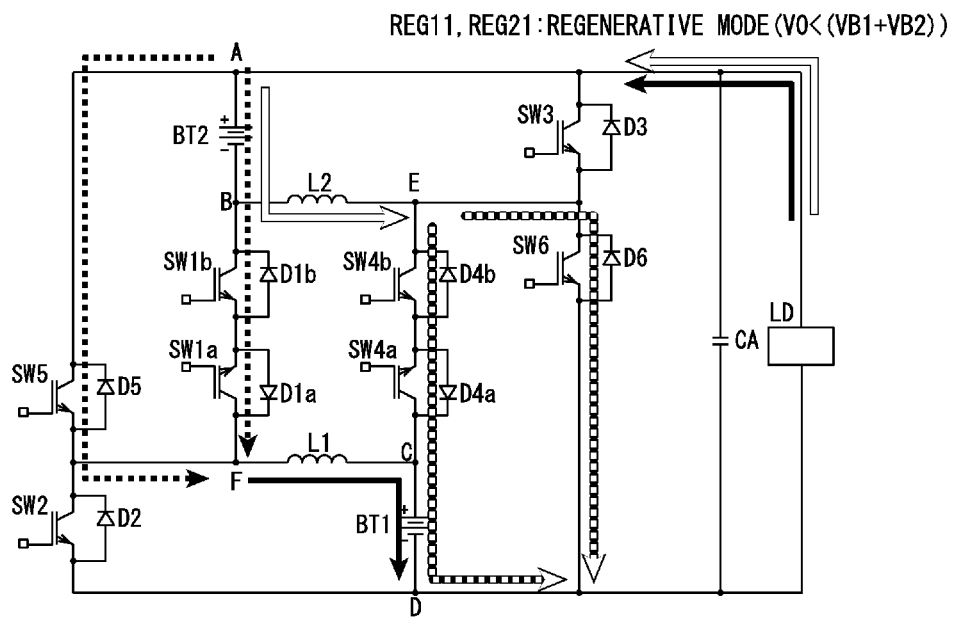
FIG. 33B is a diagram showing each current flow when the power device according to the first variation of the second embodiment of the present invention is in a regenerative mode.

For example, as shown in FIG. 33B, when the load voltage V0 is less than the summed voltage of the first and second voltages VB1 and VB2 (=VB1+VB2) and the first step-down direct-current power converter circuit (REG11) 11a is in a regenerative mode where a direct-current power is supplied from the load 13, the sixth switching device SW6 is turned on and the fourth switching device SW4 is turned off. Thereby, current flows via the second power source BT2, the second reactor L2, and the sixth switching device SW6 in series. On the other hand, by turning off the sixth switching device SW6 and turning on the fourth switching device SW4, current flows via the second power source BT2, the second reactor L2, the fourth switching device SW4 and the first power source BT1 in series.

For example, as shown in FIG. 33A, when the load voltage V0 is less than the summed voltage of the first and second voltages VB1 and VB2 (=VB1+VB2) and the second step-down direct-current power converter circuit (REG21) 12a is in a power mode where the second step-down direct-current power converter circuit (REG21) 12a supplies a direct-current power to the load 13, the fifth switching device SW5 is turned off and the first switching device SW1 is turned on. Thereby, current flows into the load 13 via the first power source BT1, the first reactor L1, the first switching device SW1, and the second power source BT2 in series. On the other hand, by turning on the fifth switching device SW5 and turning off the first switching device SW1, a circulating current flows via the first power source BT1, the first reactor L1, and the fifth switching device SW5 and the fifth diode D5 in series.

For example, as shown in FIG. 33B, when the load voltage V0 is less than the summed voltage of the first and second voltages VB1 and VB2 (=VB1+VB2) and the second step-down direct-current power converter circuit (REG21) 12a is in a regenerative mode where a direct-current power is supplied from the load 13, the first switching device SW1 is turned on and the fifth switching device SW5 is turned off. Thereby, current flows via the second power source BT2, the first switching device SW1, the first reactor L1, and the first power source BT1 in series. On the other hand, by turning off the first switching device SW1 and turning on the fifth switching device SW5, current flows via the fifth switching device SW5, the first reactor L1, and the first power source BT1 in series.

Figure 33C:
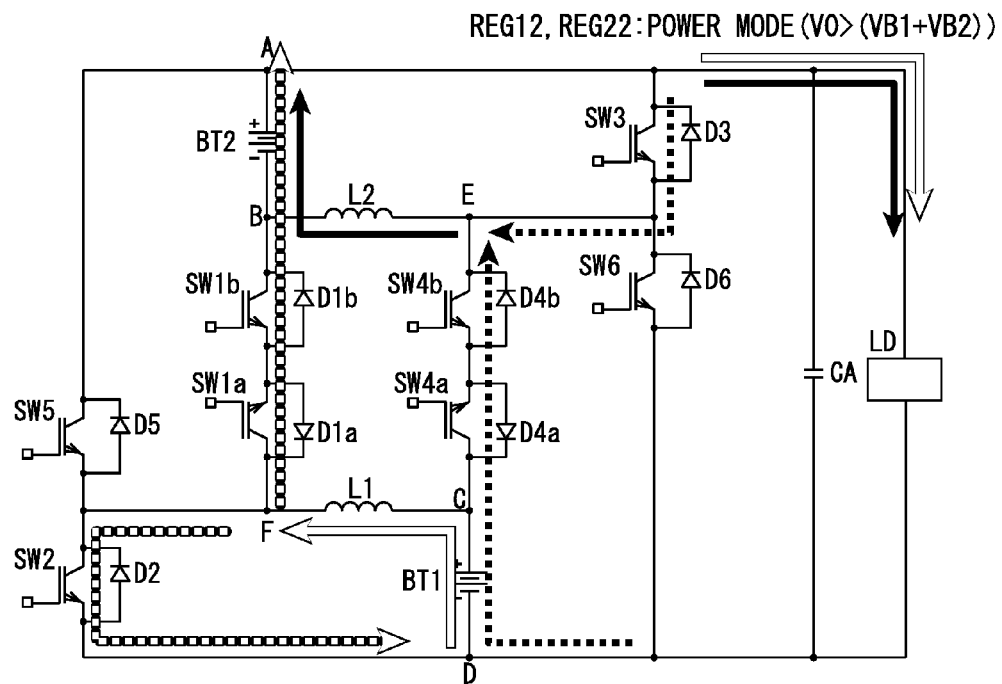
FIG. 33C is a diagram showing each current flow when the power device according to the first variation of the second embodiment of the present invention is in the power mode.

For example, as shown in FIG. 33C, when the load voltage V0 is more than the summed voltage of the first and second voltages VB1 and VB2 (=VB1+VB2) and the first step-up direct-current power converter circuit (REG12) 11b is in a power mode where the first step-up direct-current power converter circuit (REG12) 11b supplies a direct-current power to the load 13, the first switching device SW1 is turned off and the second switching device SW2 is turned on. Thereby, the first reactor L1 is excited by flowing a circulating current through the first power source BT1, the first reactor L1, and the second switching device SW2 in series, and a first reactor current I(L1) flowing through the first reactor L1 is increased. On the other hand, by turning on the first switching device SW1 and turning off the second switching device SW2, current flows into the load 13 via the first power source BT1, the first reactor L1, the first switching device SW1, and the second power source BT2 in series.

Figure 33D:
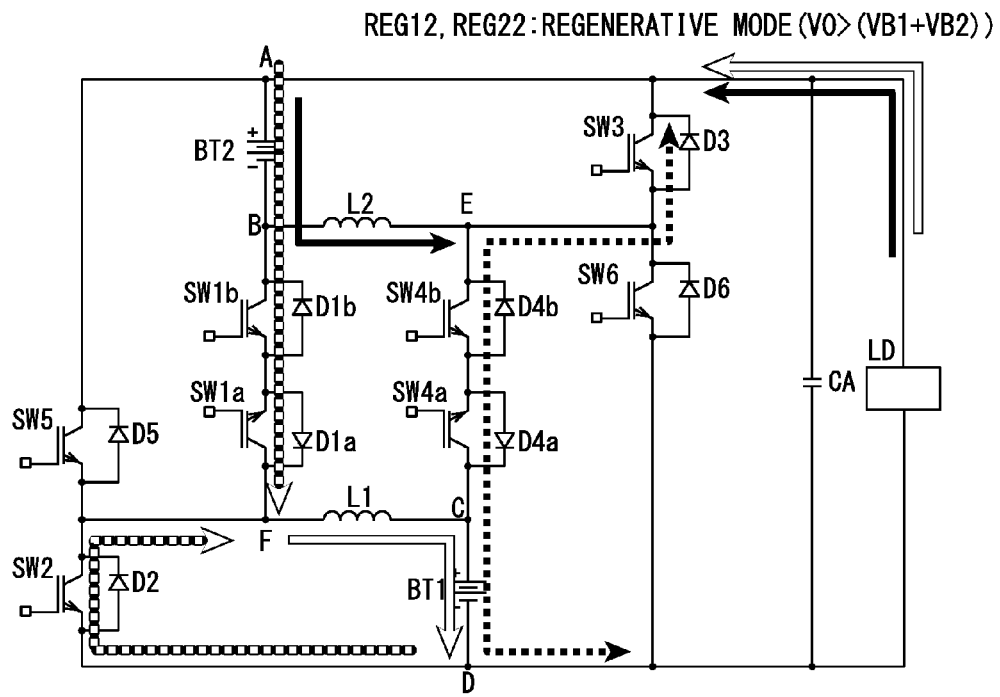
FIG. 33D is a diagram showing each current flow when the power device according to the first variation of the second embodiment of the present invention is in the regenerative mode.

For example, as shown in FIG. 33D, when the load voltage V0 is more than the summed voltage of the first and second voltages VB1 and VB2 (=VB1+VB2) and the first step-up direct-current power converter circuit (REG12) 11b is in a regenerative mode where a direct-current power is supplied from the load 13, the first switching device SW1 is turned on and the second switching device SW2 is turned off. Thereby, current flows via the second power source BT2, the first switching device SW1, the first reactor L1, and the first power source BT1 in series. On the other hand, by turning off the first switching device SW1 and turning on the second switching device SW2, a circulating current flows via the second switching device SW2 and the second diode D2, the first reactor L1, and the first power source BT1 in series.

For example, as shown in FIG. 33C, when the load voltage V0 is more than the summed voltage of the first and second voltages VB1 and VB2 (=VB1+VB2) and the second step-up direct-current power converter circuit (REG22) 12b is in a power mode where the second step-up direct-current power converter circuit (REG22) 12b supplies a direct-current power to the load 13, the fourth switching device SW4 is turned off and the third switching device SW3 is turned on. Thereby, the second reactor L2 is excited by flowing a circulating current through the second power source BT2, the third switching device SW3, the second reactor L2 in series, and a second reactor current I(L2) flowing through the second reactor L2 is increased. On the other hand, by turning on the fourth switching device SW4 and turning off the third switching device SW3, current flows into the load 13 via the first power source BT1 the fourth switching device SW4, the second reactor L2, and the second power source BT2 in series.

For example, as shown in FIG. 33D, when the load voltage V0 is more than the summed voltage of the first and second voltages VB1 and VB2 (=VB1+VB2) and the second step-up direct-current power converter circuit (REG22) 12b is in a regenerative mode where a direct-current power is supplied from the load 13, the fourth switching device SW4 is turned on and the third switching device SW3 is turned off Thereby, current flows via the second power source BT2, the second reactor L2, the fourth switching device SW4, and the first power source BT1 in series. On the other hand, by turning off the fourth switching device SW4 and turning on the third switching device SW3, a circulating current flows via the second reactor L2, the third switching device SW3 and the third diode D3, and the second power source BT2 in series.

The connection switching control unit 22 can drive the first and second step-down direct-current power converter circuits 11a and 12a independently from each other and drive the first and second step-up direct-current power converter circuits 11b and 12b independently from each other by inputting pulse-width-modulated signals (PWM signals) into a gate of each switching device SW1 to SW6.

When the load voltage V0 is less than the summed voltage of the first and second voltages VB1 and VB2 (=VB1+VB2), the connection switching control unit 22 controls the first and second step-down direct-current power converter circuits 11a and 12a so that a switching operation for at least one of a pair of the fourth and sixth switching devices SW4 and SW6 included in the first step-down direct-current power converter circuit 11a and a pair of the first and fifth switching devices SW1 and SW5 included in the second step-down direct-current power converter circuit 12a is performed. Thereby, the connection switching control unit 22 controls the voltage V0 to be in the range from the larger of the first voltage VB1 of the first power source BT1 and the second voltage VB2 of the second power source BT2 to the summed voltage of the first and the second voltages VB1 and VB2 (=VB1+VB2).

When the load voltage V0 is more than the summed voltage of the first and second voltages VB1 and VB2 (=VB1+VB2), the connection switching control unit 22 controls the first and second step-up direct-current power converter circuits 11b and 12b so that a switching operation for at least one of a pair of the first and second switching devices SW1 and SW2 included in the first step-up direct-current power converter circuit 11b and a pair of the third and fourth switching devices SW3 and SW4 included in the second step-up direct-current power converter circuit 12b is performed. Thereby, the connection switching control unit 22 controls the voltage V0 to be equal to or more than the summed voltage of the first and the second voltages VB1 and VB2 (=VB1+VB2).

The connection switching control unit 22 controls a switching operation of the fourth switching device SW4 and the sixth switching device SW6 included in the first step-down direct-current power converter circuit 11a based on a first step-down duty DT11. In the switching operation, the fourth switching device SW4 and the sixth switching device SW6 are inverted and the alternative close and open (ON/OFF) switching operations of each switching device SW4 and SW6 are performed. As represented by the following equation (7), the first step-down duty DT11 is defined by ON time t(SW4) of the fourth switching device SW4 and ON time t(SW6) of the sixth switching device SW6.

For example, when the fourth switching device SW4 is turned off and the sixth switching device SW6 is turned on, the first step-down duty DT11 is 0%. On the other hand, when the fourth switching device SW4 is turned on and the sixth switching device SW6 is turned off, the first step-down duty DT11 is 100%.

The connection switching control unit 22 can step down the first voltage VB1 based on the first step-down duty DT11 and output the step-down voltage from the first step-down direct-current power converter circuit 11a. The connection switching control unit 22 controls output voltage V10a of the first step-down direct-current power converter circuit 11a (in other words, the voltage applied between the second node B and the fourth node D) as the product of the first voltage VB1 and the first step-down duty DT11 (VB1*DT11=V10a).

$$DT11 = \frac{t(SW4)}{t(SW4) + t(SW6)} = \frac{V0 - VB1 - Vd}{VB1} \\ DT21 = \frac{t(SW1)}{t(SW1) + t(SW5)} = \frac{V0 - VB2 + Vd}{VB2} \quad (7)$$

The connection switching control unit 22 controls a switching operation of the first switching device SW1 and the fifth switching device SW5 included in the second step-down direct-current power converter circuit 12a based on a second step-down duty DT21. In the switching operation, the first switching device SW1 and the fifth switching device SW5 are inverted and the alternative close and open (ON/OFF) switching operations of each switching device SW1 and SW5 are performed. As represented by the equation (7) described above, the second step-down duty DT21 is defined by ON time t(SW1) of the first switching device SW1 and ON time t(SW5) of the fifth switching device SW5.

For example, when the first switching device SW1 is turned off and the fifth switching device SW5 is turned on, the second step-down duty DT21 is 0%. On the other hand, when the first switching device SW1 is turned on and the fifth switching device SW5 is turned off, the second step-down duty DT21 is 100%.

The connection switching control unit 22 can step down the second voltage VB2 based on the second step-down duty DT21 and output the step-down voltage from the second step-down direct-current power converter circuit 12a. The connection switching control unit 22 controls output voltage V20a of the second step-down direct-current power converter circuit 12a (in other words, the voltage applied between the first node A and the third node C) as the product of the second voltage VB2 and the second step-down duty DT21 (VB2*DT21=V20a).

The connection switching control unit 22 controls a switching operation of the first switching device SW1 and the second switching device SW2 included in the first step-up direct-current power converter circuit 11b based on a first step-up duty DT12. In the switching operation, the first switching device SW1 and the second switching device SW2 are inverted and the alternative close and open (ON/OFF) switching operations of each switching device SW1 and SW2 are performed. As represented by the following equation (8), the first step-up duty DT12 is defined by ON time t(SW1) of the first switching device SW1 and ON time t(SW2) of the second switching device SW2.

For example, when the first switching device SW1 is turned on and the second switching device SW2 is turned off, the first step-up duty DT12 is 0%. On the other hand, when the first switching device SW1 is turned off and the second switching device SW2 is turned on, the first step-up duty DT12 is 100%.

The connection switching control unit 22 can step up the first voltage VB1 based on the first step-up duty DT12 and output the step-up voltage from the first step-up direct-current power converter circuit 11b. The connection switching control unit 22 controls output voltage V10b of the first step-up direct-current power converter circuit 11b (in other words, the voltage applied between the second node B and the fourth node D) based on the first voltage VB1 and the first step-up duty DT12.

$$\left. \begin{array}{l} DT12 = \dfrac{t(SW2)}{t(SW2) + t(SW1)} = \dfrac{V0 - 2 \cdot VB2 + Vd}{V0 - VB2} \\ DT22 = \dfrac{t(SW3)}{t(SW3) + t(SW4)} = \dfrac{V0 - 2 \cdot VB1 - Vd}{V0 - VB1} \end{array} \right\} \quad (8)$$

The connection switching control unit 22 controls a switching operation of the third switching device SW3 and the fourth switching device SW4 included in the second step-up direct-current power converter circuit 12b based on a second step-up duty DT22. In the switching operation, the third switching device SW3 and the fourth switching device SW4 are inverted and the alternative close and open (ON/OFF) switching operations of each switching device SW3 and SW4 are performed. As represented by the equation (8) described above, the second step-up duty DT22 is defined by ON time t(SW3) of the third switching device SW3 and ON time t(SW4) of the fourth switching device SW4.

For example, when the fourth switching device SW4 is turned on and the third switching device SW3 is turned off, the second step-up duty DT22 is 0%. On the other hand, when the fourth switching device SW4 is turned off and the third switching device SW3 is turned on, the second step-up duty DT22 is 100%.

The connection switching control unit 22 can step up the second voltage VB2 based on the second step-up duty DT22 and output the step-up voltage from the second step-up direct-current power converter circuit 12b. The connection switching control unit 22 controls output voltage V20b of the second step-up direct-current power converter circuit 12b (in other words, the voltage applied between the first node A and the third node C) based on the second voltage VB2 and the second step-up duty DT22.

As represented by the equation (7) described above, the first step-down duty DT11 is represented by the desired load voltage V0, the desired voltage difference Vd (=VB2−VB1), and the first voltage VB1, and the second step-down duty DT21 is represented by the desired load voltage V0, the desired voltage difference Vd (=VB2−VB1), and the second voltage VB2. On the other hand, based on the voltage difference Vd (=VB2−VB1), the first step-down duty DT11 can be represented by the second voltage VB2, and the second step-down duty DT21 can be represented by the first voltage VB1. In order to prevent a divergence of control responses, the connection switching control unit 22 may control switching operations using the first and second step-down duties DT11 and DT21 represented by the equation (7) described above.

Similarly, as represented by the equation (8) described above, the first step-up duty DT12 is represented by the second voltage VB2, and the second step-up duty DT22 is represented by the first voltage VB1. On the other hand, based on the voltage difference Vd (=VB2−VB1), the first step-up duty DT12 can be represented by the first voltage VB1, and the second step-up duty DT22 can be represented by the second voltage VB2. In order to prevent a divergence of control responses, the connection switching control unit 22 may control switching operations using the first and second step-up duties DT12 and DT22 represented by the equation (8) described above.

The power device 10 according to the first variation includes the constitution described above. Hereinafter, the operation of the power device 10 according to the first variation, in other words, the control operation of the connection switching control unit 22 will be described.

The connection switching control unit 22 can perform similar control operations to those in the first to tenth control modes of the second embodiment described above.

(First to Fourth Control Modes of the First Variation of the Second Embodiment)

In a first control mode, when the load voltage V0 is less than the summed voltage of the first and second voltages VB1 and VB2 (=VB1+VB2), the connection switching control unit 22 drives one of the first and second step-down direct-current power converter circuits 11a and 12a at a time. On the other hand, when the load voltage V0 is more than the summed voltage of the first and second voltages VB1 and VB2 (=VB1+VB2), the connection switching control unit 22 drives one of the first and second step-up direct-current power converter circuits 11b and 12b at a time.

Figure 34:
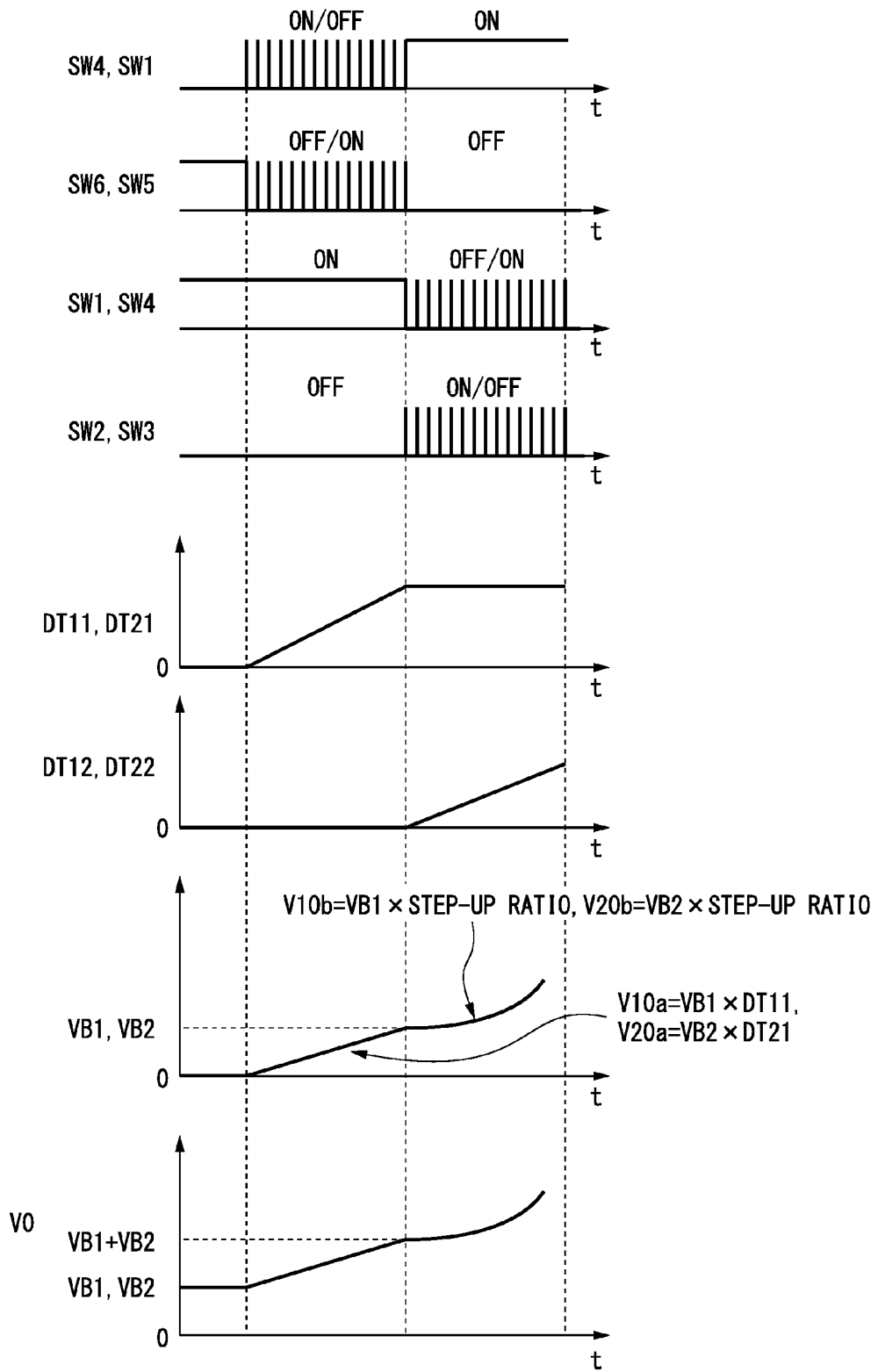
FIG. 34 is a diagram showing a variation of ON/OFF of each switching device, a variation of each first step-down duty and second step-down duty, a variation of each first step-up duty and second step-up duty, and a variation of each voltage when the power device according to the first variation of the second embodiment of the present invention is in a second control mode.

In second to fourth control modes, when the load voltage V0 is less than the summed voltage of the first and second voltages VB1 and VB2 (=VB1+VB2), the connection switching control unit 22 simultaneously drives the first and second step-down direct-current power converter circuits 11a and 12a. For example, as shown in FIG. 34, the phase of the switching operation of the first step-down direct-current power converter circuit 11a may be the same as or opposite to that of the second step-down direct-current power converter circuit 12a. The phase of the switching operation of the first step-down direct-current power converter circuit 11a may be arbitrarily shifted from that of the second step-down direct-current power converter circuit 12a (for example, a phase shift is 180°). On the other hand, when the load voltage V0 is more than the summed voltage of the first and second voltages VB1 and VB2 (=VB1+VB2), the connection switching control unit 22 simultaneously drives the first and second step-up direct-current power converter circuits 11b and 12b. For example, as shown in FIG. 34, the phase of the switching operation of the first step-up direct-current power converter circuit 11b may be the same as or opposite to that of the second step-up direct-current power converter circuit 12b. The phase of the switching operation of the first step-up direct-current power converter circuit 11b may be arbitrarily shifted from that of the second step-up direct-current power converter circuit 12b (for example, a phase shift is 180°).

(Fifth Control Mode of the First Variation of the Second Embodiment)

In a fifth control mode, when the connection switching control unit 22 simultaneously drives the first and second step-down direct-current power converter circuits 11a and 12a, the connection switching control unit 22 can arbitrarily control the first voltage VB1, the second voltage VB2, and the load voltage V0 by changing at least one of the first and second step-down duties DT11 and DT21. When the connection switching control unit 22 simultaneously drives the first and second step-up direct-current power converter circuits 11b and 12b, the connection switching control unit 22 can arbitrarily control the first voltage VB1, the second voltage VB2, and the load voltage V0 by changing at least one of the first and second step-up duties DT12 and DT22.

Figure 35A:
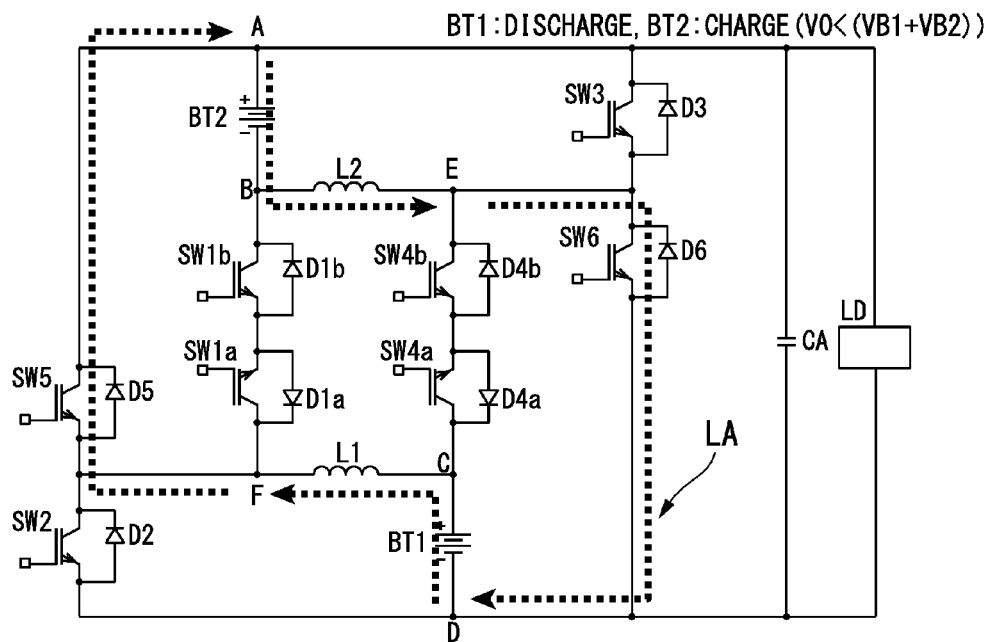
FIG. 35A is a diagram showing each loop current flow when the power device according to the first variation of the second embodiment of the present invention is in a fifth control mode.

For example, as shown in FIG. 35A, if the connection switching control unit 22 decreases the output voltage V10a of the first step-down direct-current power converter circuit 11a (=VB1*DT11) and increases the output voltage V20a of the second step-down direct-current power converter circuit 12a (=VB2*DT21) while the connection switching control unit 22 maintains the load voltage V0, the connection switching control unit 22 decreases the first step-down duty DT11 and increases the second step-down duty DT21. Thereby, a loop current LA, which acts as a so-called energy buffer for the transport of the electric charge between the first power source BT1 and the second power source BT2, is generated so that the first power source BT1 is discharged and the second power source BT2 is charged. The loop current LA circulates through the third node C, the sixth node F, the first node A, the second node B, the fifth node E and the fourth node D in series.

Figure 35B:
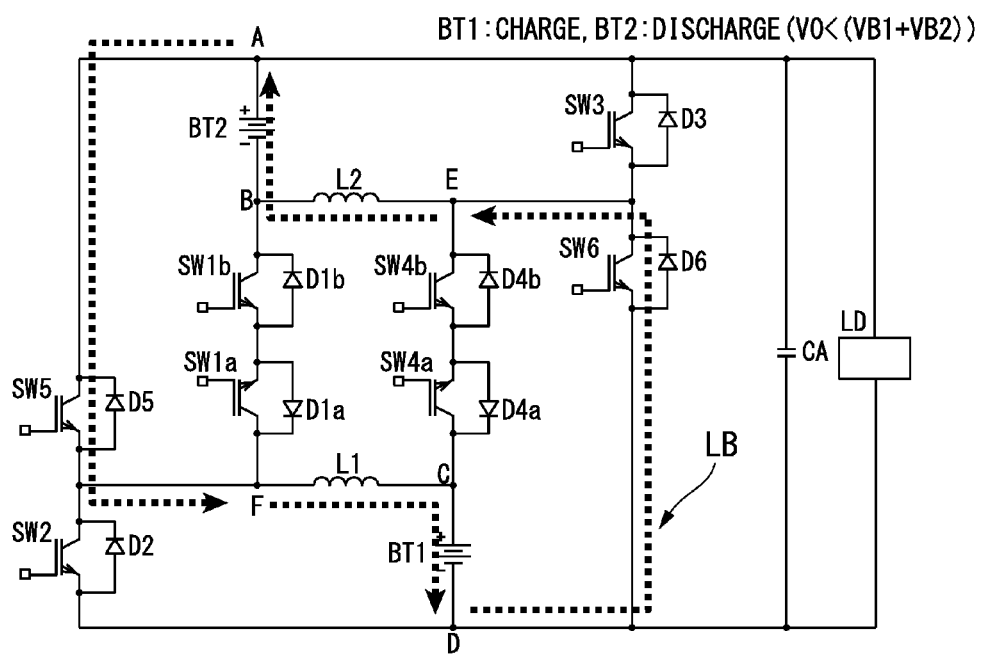
FIG. 35B is a diagram showing each loop current flow when the power device according to the first variation of the second embodiment of the present invention is in the fifth control mode.

As shown in FIG. 35B, if the connection switching control unit 22 increases the output voltage V10a (=VB1*DT11) and decreases the output voltage V20a (=VB2*DT21) while the connection switching control unit 22 maintains the load voltage V0, the connection switching control unit 22 increases the first step-down duty DT11 and decreases the second step-down duty DT21. Thereby, a loop current LB, which acts as a so-called energy buffer for the transport of the electric charge between the first power source BT1 and the second power source BT2, is generated so that the second power source BT2 is discharged and the first power source BT1 is charged. The loop current LB circulates through the first node A, the sixth node F, the third node C, the fourth node D, the fifth node E and the second node B in series.

Figure 35C:
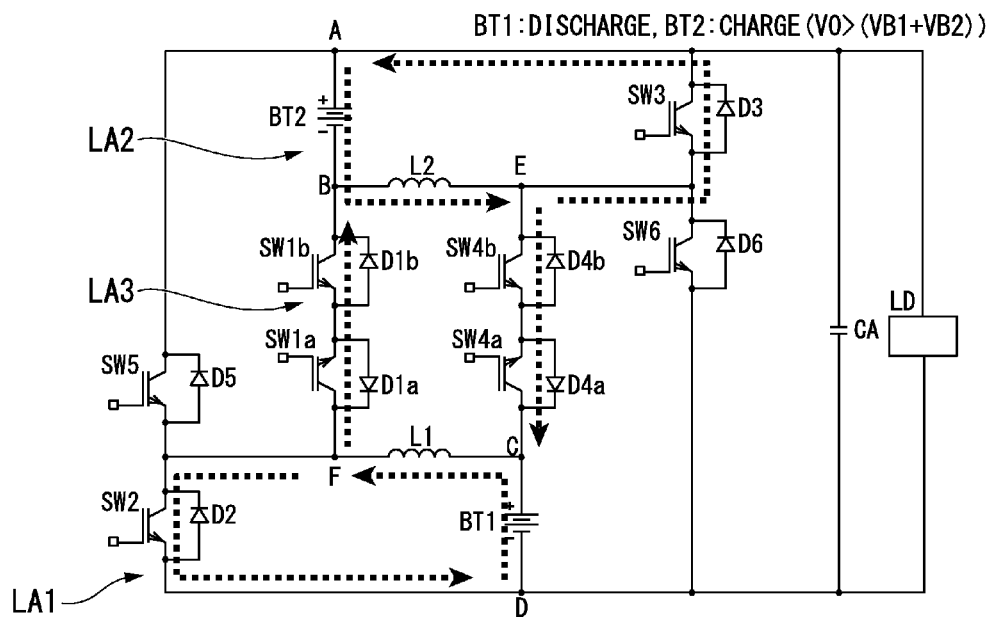
FIG. 35C is a diagram showing flows of first to third loop currents when the power device according to the first variation of the second embodiment of the present invention is in the fifth control mode.

For example, as shown in FIG. 35C, if the connection switching control unit 22 increases the step-up ratio of the first step-up direct-current power converter circuit 11b (=V10b/VB1) and decreases the step-up ratio of the second step-up direct-current power converter circuit 12b (=V20b/VB2) while the connection switching control unit 22 maintains the load voltage V0, the connection switching control unit 22 increases the first step-up duty DT12 and decreases the second step-up duty DT22. Thereby, three loop currents, namely, first to third loop currents LA1, LA2, and LA3, which act as a so-called energy buffer, are generated so that the first power source BT1 is discharged and the second power source BT2 is charged. The first loop current LA1 circulates through the third node C, the sixth node F, and the fourth node D in series. The second loop current LA2 circulates through the first node A, the second node B, and the fifth node E in series. The third loop current LA3 circulates through the third node C, the sixth node F, the second node B, and the fifth node E in series so that the third loop current LA3 is connected to the first loop current LA1 and second loop current LA2.

Figure 35D:
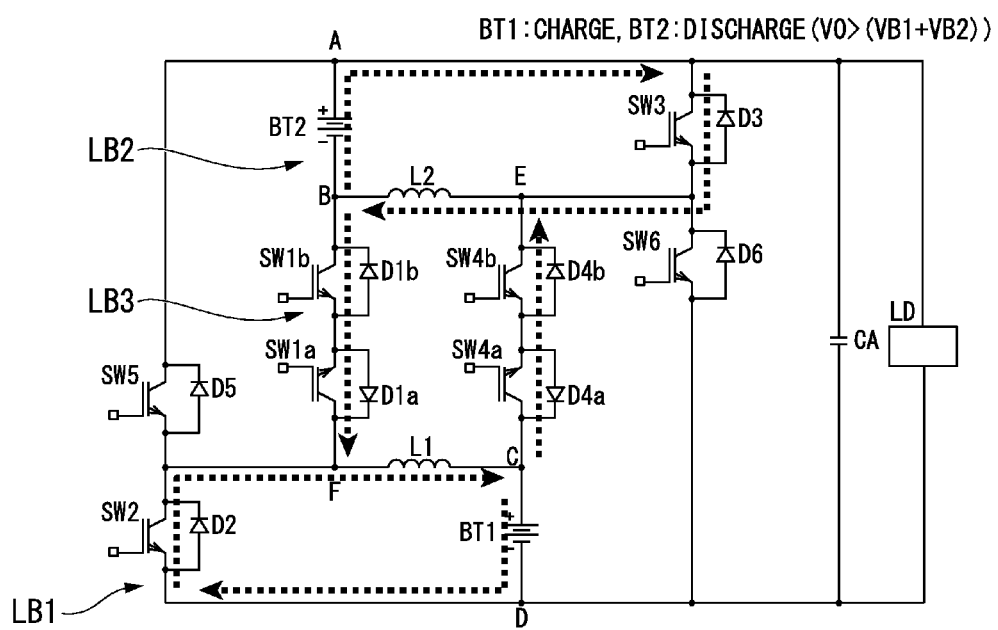
FIG. 35D is a diagram showing flows of the first to third loop currents when the power device according to the first variation of the second embodiment of the present invention is in the fifth control mode.

As shown in FIG. 35D, if the connection switching control unit 22 decreases the step-up ratio of the first step-up direct-current power converter circuit 11b (=V10b/VB1) and increases the step-up ratio of the second step-up direct-current power converter circuit 12b (=V20b/VB2) while the connection switching control unit 22 maintains the load voltage V0, the connection switching control unit 22 decreases the first step-up duty DT12 and increases the second step-up duty DT22. Thereby, three loop currents, namely, first to third loop currents LB1, LB2, and LB3, which act as a so-called energy buffer, are generated so that the second power source BT2 is discharged and the first power source BT1 is charged. The first loop current LB1 circulates through the sixth node F, the third node C, and the fourth node D in series. The second loop current LB2 circulates through the first node A, the fifth node E, and the second node B in series. The third loop current LB3 circulates through the sixth node F, the third node C, the fifth node E, and the second node B in series so that the third loop current LB3 is connected to the first loop current LB1 and second loop current LB2.

(Sixth to Ninth Control Modes of the First Variation of the Second Embodiment)

In relation to the first to fourth control modes, the connection switching control unit 22 in sixth to ninth control modes can control any one of parameters to correspond to an arbitrary target value while the connection switching control unit 22 maintains each parameters other than the one at an arbitrary value by adjusting the first and second step-down duties DT11 and DT21 or the first and second step-up duties DT12 and DT22. The parameters include the load voltage V0, the voltage difference Vd (=VB2−VB1), the first voltage VB1, and the second voltage VB2.

(Tenth Control Mode of the First Variation of the Second Embodiment)

In relation to the first to ninth control modes, in a condition that other loads are connected in addition to the load 13, the first voltage VB1 is different from the second voltage VB2, the total capacity of the first power source BT1 is different from that of the second power source BT2, etc., the connection switching control unit 22 in a tenth control mode can control a voltage at any location to correspond an arbitrary target value by adjusting the first and second step-down duties DT11 and DT21 or the first and second step-up duties DT12 and DT22. For example, if the voltage difference Vd (=VB2−VB1) is caused, the connection switching control unit 22 can control the voltage difference to be small. Thereby, if the connection condition of the first and second power sources BT1 and BT2 for the load 13 is changed into the parallel connection condition, a flow of excess current to cancel the voltage difference Vd (=VB2−VB1) can be prevented.

As described above, the power device 10 according to the first variation of the second embodiment of the present invention can easily control the load voltage V0 to be an arbitrary voltage in the range from the larger of the first voltage VB1 and the second voltage VB2 to the summed voltage of the first voltage VB1 and the second voltage VB2 (=VB1+VB2) by controlling the first step-down duty DT11 and the second step-down duty DT21. Moreover, the power device 10 can easily control the load voltage V0 to be an arbitrary voltage, which is equal to or more than the summed voltage of the first voltage VB1 and the second voltage VB2 (=VB1+VB2), by controlling the first step-up duty DT12 and the second step-up duty DT22.

Moreover, by generating the loop circuits LA and LB in the step-down operations of the first and second step-down direct-current power converter circuits 11a and 12a, and by generating the loop circuits LA1 to LA3 and LB1 to LB3 in the step-up operations of the first and second step-up direct-current power converter circuits 11b and 12b, the balance of charge and discharge of each first power source BT1 and second power source BT2 can be easily stabilized.

Moreover, by using the first step-down duty DT11 or the second step-up duty DT22 represented by the first voltage VB1 in the step-down operations of the first step-down direct-current power converter circuit 11a or the step-up operations of the second step-up direct-current power converter circuit 12b, a divergence of control responses can be prevented. Similarly, by using the first step-up duty DT12 or the second step-down duty DT21 represented by the second voltage VB2 in the step-up operations of the first step-up direct-current power converter circuit 11b or the step-down operations of the second step-down direct-current power converter circuit 12a, a divergence of control responses can be prevented.

(Second Variation of the Second Embodiment)

Figure 36:
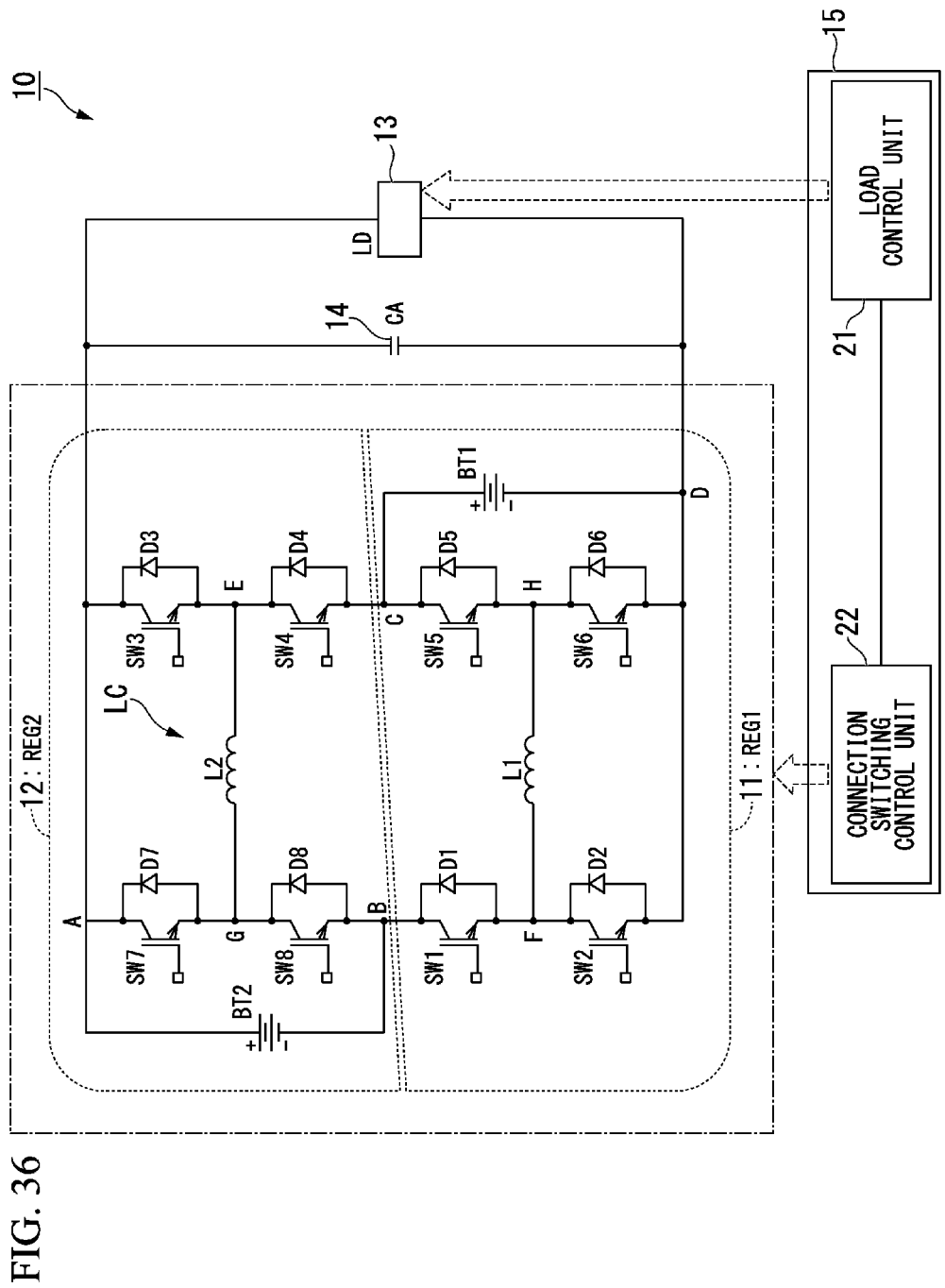
FIG. 36 is a configuration diagram showing a power device according to a second variation of the second embodiment of the present invention.

As shown in FIG. 36, a power device 10 according to a second variation of the second embodiment of the present invention further includes seventh and eighth nodes G and H, and fifth to eighth switching devices SW5 to SW8 in comparison with the second embodiment described above.

The power device 10 according to the second variation can control a voltage V0 to be in the range from the larger of a first voltage VB1 and a second voltage VB2 to the summed voltage of the first and the second voltages VB1 and VB2 (=VB1+VB2), or to be equal to or more than the summed voltage of the first and the second voltages VB1 and VB2 (=VB1+VB2).

A first direct-current power converter circuit (REG1) 11 includes a first power source BT1, first, second, fifth, and sixth switching devices SW1, SW2, SW5, and SW6, which configure a first switch group, and a first reactor L1.

A second direct-current power converter circuit (REG2) 12 includes a second power source BT2, third, fourth, seventh and eighth switching devices SW3, SW4, SW7, and SW8, which configure a second switch group, and a second reactor L2.

The seventh node G is provided between the second node B and the second reactor L2, and the eighth node H is provided between the third node C and the first reactor L1.

A collector and an emitter of the fifth switching device SW5 are connected to the third node C and the eighth node H, respectively. A collector and an emitter of the sixth switching device SW6 are connected to the eighth node H and the fourth node D, respectively. A collector and an emitter of the seventh switching device SW7 are connected to the first node A and the seventh node G, respectively. A collector and an emitter of the eighth switching device SW8 are connected to the seventh node G and the second node B, respectively. Diodes D5 to D8 are connected between the emitter and collector of the fifth and eighth switching devices SW5 to SW8, respectively. The direction from the emitter to the collector of each switching device SW5 to SW8 is a forward direction of each diode D5 to D8.

The first and second direct-current power converter circuits 11 and 12 are controlled based on pulse-width-modulated signals (PWM signals) output from the control device 15 and input into a gate of each switching device SW1 to SW8 so that the first and second direct-current power converter circuits 11 and 12 are driven independently from each other.

In more detail, when the load voltage V0 is less than the summed voltage of the first and second voltages VB1 and VB2 (=VB1+VB2), the first and second direct-current power converter circuits 11 and 12 are controlled so that a switching operation for at least one of a pair of the fifth and sixth switching devices SW5 and SW6 included in the first direct-current power converter circuit 11 and a pair of the seventh and eighth switching devices SW7 and SW8 included in the second direct-current power converter circuit 12 is performed.

When the load voltage V0 is more than the summed voltage of the first and second voltages VB1 and VB2 (=VB1+VB2), the first and second direct-current power converter circuits 11 and 12 are controlled so that a switching operation for at least one of a pair of the first and second switching devices SW1 and SW2 included in the first direct-current power converter circuit 11 and a pair of the third and fourth switching devices SW3 and SW4 included in the second direct-current power converter circuit 12 is performed.

In this switching operation, close (ON) and open (OFF) of each switching device SW1 to SW8 are switched alternately.

Figure 37A:
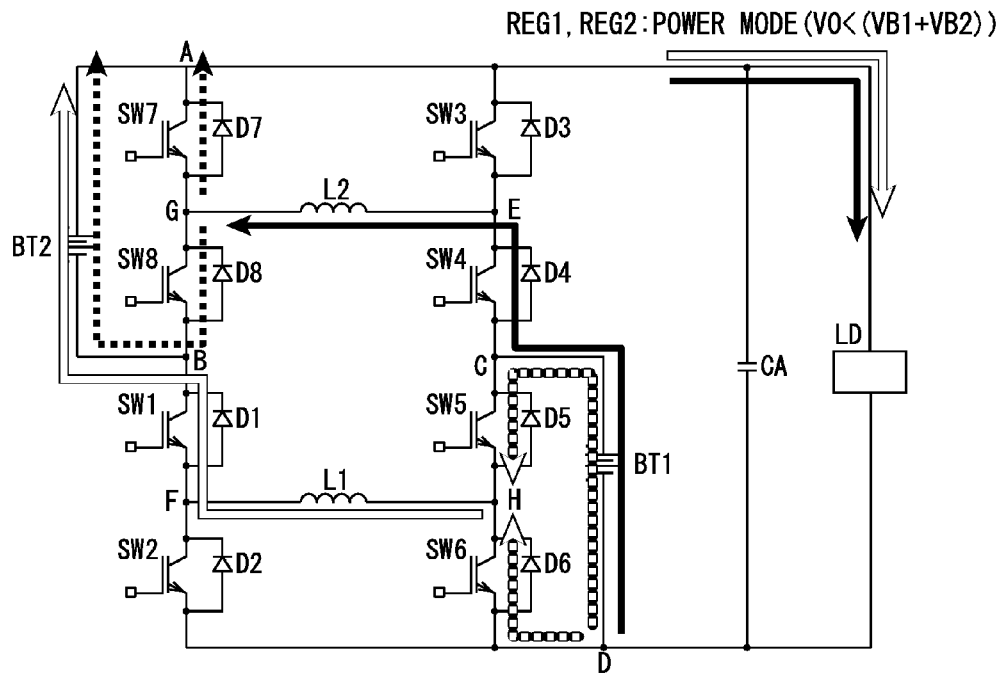
FIG. 37A is a diagram showing each current flow when the power device according to the second variation of the second embodiment of the present invention is in a power mode.
Figure 37B:
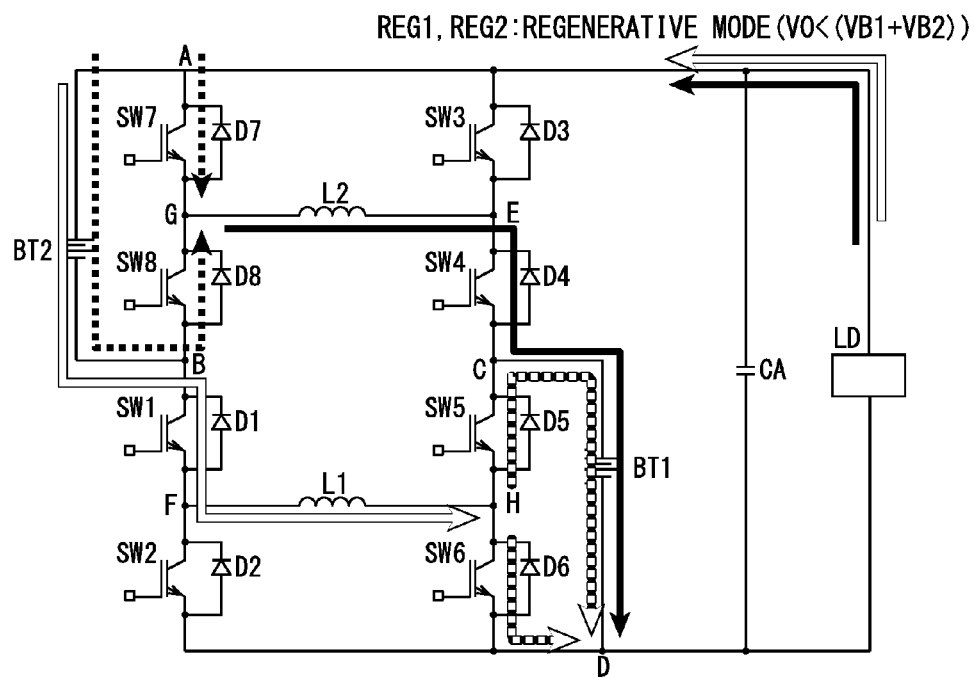
FIG. 37B is a diagram showing each current flow when the power device according to the second variation of the second embodiment of the present invention is in a regenerative mode.

For example, as shown in FIGS. 37A and 37B, when the load voltage V0 is less than the summed voltage of the first and second voltages VB1 and VB2 (=VB1+VB2), the first direct-current power converter circuit (REG1) 11 turns on the first and fourth switching devices SW1 and SW4, and turns off the second and third switching devices SW2 and SW3.

As shown in FIG. 37A, when the first direct-current power converter circuit (REG1) 11 is in a power mode where the first direct-current power converter circuit (REG1) 11 supplies a direct-current power to the load 13, the sixth switching device SW6 is turned off and the fifth switching device SW5 is turned on. Thereby, current flows into the load 13 via the first power source BT1, the fifth switching device SW5, the first reactor L1, the first switching device SW1 and the first diode D1, and the second power source BT2 in series. On the other hand, by turning on the sixth switching device SW6 and turning off the fifth switching device SW5, a circulating current flows via the sixth switching device SW6 and the sixth diode D6, the first reactor L1, the first switching device SW1 and the first diode D1, and the second power source BT2 in series.

As shown in FIG. 37B, when the first direct-current power converter circuit 11 is in a regenerative mode where a direct-current power is supplied from the load 13, the sixth switching device SW6 is turned on and the fifth switching device SW5 is turned off. Thereby, current flows via the second power source BT2, the first switching device SW1, the first reactor L1, and the sixth switching device SW6 in series. On the other hand, by turning off the sixth switching device SW6 and turning on the fifth switching device SW5, current flows via the second power source BT2, the first switching device SW1, the first reactor L1, the fifth switching device SW5 and the first power source BT1 in series.

As shown in FIG. 37A, when the second direct-current power converter circuit (REG2) 12 is in a power mode where the second direct-current power converter circuit (REG2) 12 supplies a direct-current power to the load 13, the seventh switching device SW7 is turned off and the eighth switching device SW8 is turned on. Thereby, current flows into the load 13 via the first power source BT1, the fourth switching device SW4 and the fourth diode D4, the second reactor L2, the eighth switching device SW8, and the second power source BT2 in series. On the other hand, by turning on the seventh switching device SW7 and turning off the eighth switching device SW8, a circulating current flows via the first power source BT1, the fourth switching device SW4 and the fourth diode D4, the second reactor L2, and the seventh switching device SW7 and the seventh diode D7 in series.

As shown in FIG. 37B, when the second direct-current power converter circuit (REG2) 12 is in a regenerative mode where a direct-current power is supplied from the load 13, the eighth switching device SW8 is turned on and the seventh switching device SW7 is turned off. Thereby, current flows via the second power source BT2, the eighth switching device SW8 and the eighth diode D8, the second reactor L2, the fourth switching device SW4, and the first power source BT1 in series. On the other hand, by turning off the eighth switching device SW8 and turning on the seventh switching device SW7, current flows via the seventh switching device SW7, the second reactor L2, the fourth switching device SW4, and the first power source BT1 in series.

Figure 37C:
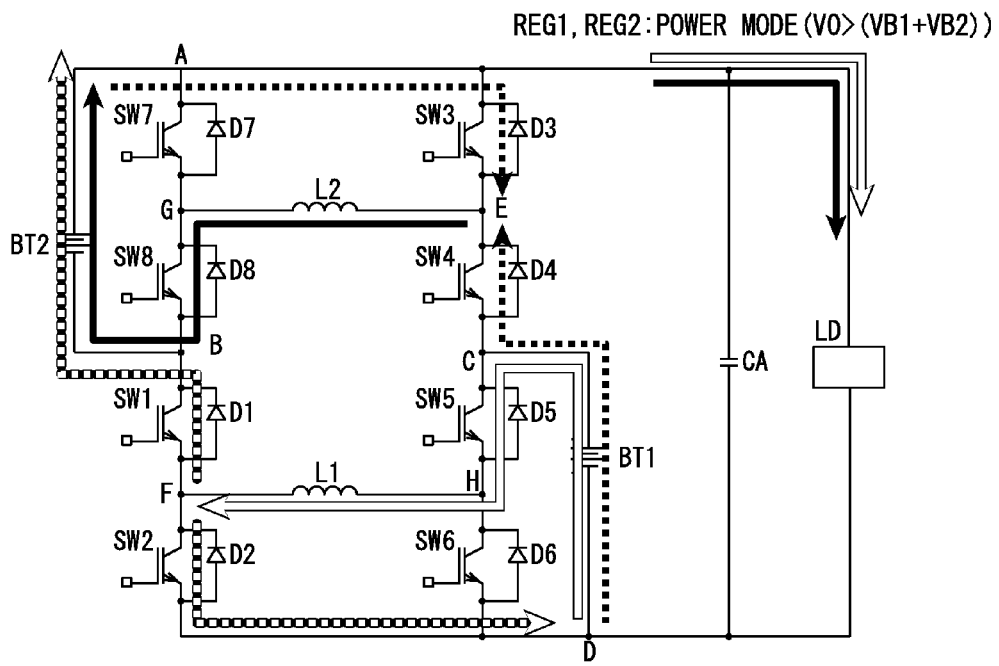
FIG. 37C is a diagram showing each current flow when the power device according to the second variation of the second embodiment of the present invention is in the power mode.
Figure 37D:
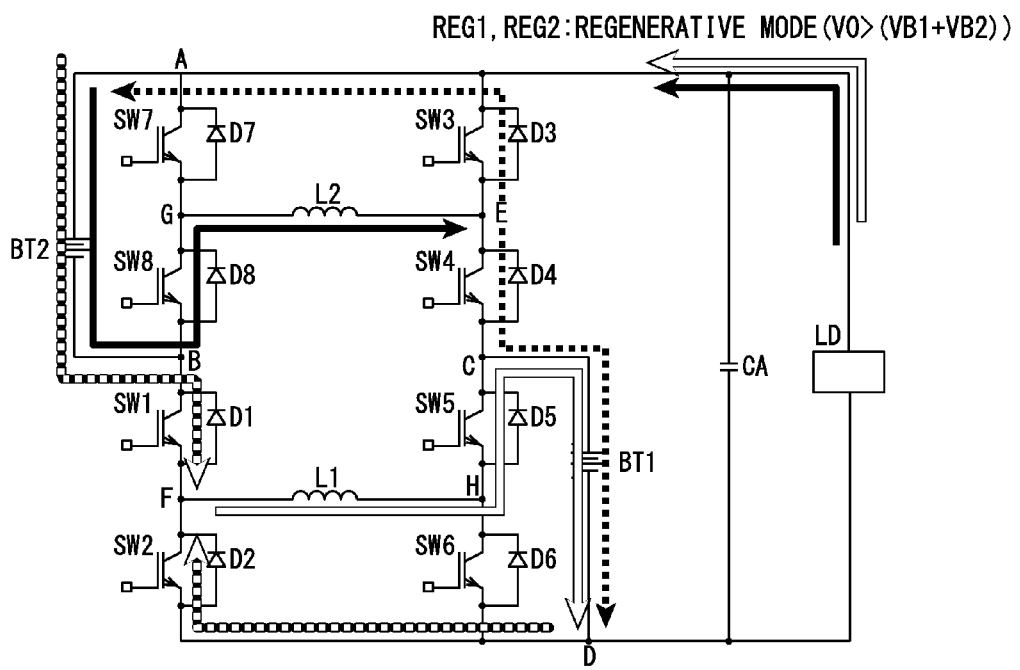
FIG. 37D is a diagram showing a flow of each current when the power device according to the second variation of the second embodiment of the present invention is in the regenerative mode.

For example, as shown in FIGS. 37C and 37D, when the load voltage V0 is more than the summed voltage of the first and second voltages VB1 and VB2 (=VB1+VB2), the first direct-current power converter circuit (REG1) 11 turns on the fifth and eighth switching devices SW5 and SW8, and turns off the sixth and seventh switching devices SW6 and SW7.

As shown in FIG. 37C, when the first direct-current power converter circuit (REG1) 11 is in a power mode where the first direct-current power converter circuit (REG1) 11 supplies a direct-current power to the load 13, the first switching device SW1 is turned off and the second switching device SW2 is turned on. Thereby, the first reactor L1 is excited by flowing a circulating current through the first power source BT1, the fifth switching device SW5, the first reactor L1, and the second switching device SW2 in series, and a first reactor current I(L1) flowing through the first reactor L1 is increased. On the other hand, by turning on the first switching device SW1 and turning off the second switching device SW2, current flows into the load 13 via the first power source BT1, the fifth switching device SW5, the first reactor L1, the first switching device SW1 and the first diode D1, and the second power source BT2 in series.

As shown in FIG. 37D, when the first direct-current power converter circuit (REG1) 11 is in a regenerative mode where a direct-current power is supplied from the load 13, the first switching device SW1 is turned on and the second switching device SW2 is turned off. Thereby, current flows via the second power source BT2, the first switching device SW1, the first reactor L1, the fifth switching device SW5 and the fifth diode D5, and the first power source BT1 in series. On the other hand, by turning off the first switching device SW1 and turning on the second switching device SW2, a circulating current flows via the second switching device SW2 and the second diode D2, the first reactor L1, the fifth switching device SW5 and the fifth diode D5, and the first power source BT1 in series.

For example, as shown in FIG. 37C, when the second direct-current power converter circuit (REG2) 12 is in a power mode where the second direct-current power converter circuit (REG2) 12 supplies a direct-current power to the load 13, the fourth switching device SW4 is turned off and the third switching device SW3 is turned on. Thereby, the second reactor L2 is excited by flowing a circulating current through the second power source BT2, the third switching device SW3, the second reactor L2, and the eighth switching device SW8 in series, and a second reactor current I(L2) flowing through the second reactor L2 is increased. On the other hand, by turning on the fourth switching device SW4 and turning off the third switching device SW3, current flows into the load 13 via the first power source BT1, the fourth switching device SW4 and the fourth diode D4, the second reactor L2, the eighth switching device SW8, and the second power source BT2 in series.

As shown in FIG. 37D, when the second direct-current power converter circuit (REG2) 12 is in a regenerative mode where a direct-current power is supplied from the load 13, the fourth switching device SW4 is turned on and the third switching device SW3 is turned off. Thereby, current flows via the second power source BT2, the eighth switching device SW8 and the eighth diode D8, the second reactor L2, the fourth switching device SW4, and the first power source BT1 in series. On the other hand, by turning off the fourth switching device SW4 and turning on the third switching device SW3, a circulating current flows via the second reactor L2, the third switching device SW3 and the third diode D3, the second power source BT2, the eighth switching device SW8 and the eighth diode D8 in series.

The connection switching control unit 22 can drive the first and second direct-current power converter circuits 11 and 12 independently from each other by inputting pulse-width-modulated signals (PWM signals) into a gate of each switching device SW1 to SW8.

When the load voltage V0 is less than the summed voltage of the first and second voltages VB1 and VB2 (=VB1+VB2), the connection switching control unit 22 controls the first and second direct-current power converter circuits 11 and 12 so that a switching operation for at least one of a pair of the fifth and sixth switching devices SW5 and SW6 included in the first direct-current power converter circuit 11 and a pair of the seventh and eighth switching devices SW7 and SW8 included in the second direct-current power converter circuit 12 is performed. Thereby, the connection switching control unit 22 controls the voltage V0 in the range from the larger of the first voltage VB1 of the first power source BT1 and the second voltage VB2 of the second power source BT2 to the summed voltage of the first voltage VB1 and the second voltage VB2 (=VB1+VB2).

When the load voltage V0 is more than the summed voltage of the first and second voltages VB1 and VB2 (=VB1+VB2), the connection switching control unit 22 controls the first and second direct-current power converter circuits 11 and 12 so that a switching operation for at least one of a pair of the first and second switching devices SW1 and SW2 included in the first direct-current power converter circuit 11 and a pair of the third and fourth switching devices SW3 and SW4 included in the second direct-current power converter circuit 12 is performed. Thereby, the connection switching control unit 22 controls the voltage V0 to be equal to or more than the summed voltage of the first voltage VB1 and the second voltage VB2 (=VB1+VB2).

The connection switching control unit 22 controls a switching operation of the fifth switching device SW5 and the sixth switching device SW6 included in the first direct-current power converter circuit 11 based on a first step-down duty DT11. In the switching operation, the fifth switching device SW5 and the sixth switching device SW6 are inverted and the alternative close and open (ON/OFF) switching operations of each switching device SW5 and SW6 are performed. As represented by the following equation (9), the first step-down duty DT11 is defined by ON time t(SW5) of the fifth switching device SW5 and ON time t(SW6) of the sixth switching device SW6.

For example, when the fifth switching device SW5 is turned off and the sixth switching device SW6 is turned on, the first step-down duty DT11 is 0%. On the other hand, when the fifth switching device SW5 is turned on and the sixth switching device SW6 is turned off, the first step-down duty DT11 is 100%.

The connection switching control unit 22 can step down the first voltage VB1 based on the first step-down duty DT11 and output the step-down voltage from the first direct-current power converter circuit 11. The connection switching control unit 22 controls output voltage V10a of the first direct-current power converter circuit 11 (in other words, the voltage applied between the second node B and the fourth node D) as the product of the first voltage VB1 and the first step-down duty DT11 (VB1*DT11=V10a).

$$DT11 = \frac{t(SW5)}{t(SW5)+t(SW6)} = \frac{V0-VB1-Vd}{VB1} \atop DT21 = \frac{t(SW8)}{t(SW8)+t(SW7)} = \frac{V0-VB2+Vd}{VB2} \right\} \quad (9)$$

The connection switching control unit 22 controls a switching operation of the seventh switching device SW7 and the eighth switching device SW8 included in the second direct-current power converter circuit 12 based on a second step-down duty DT21. In the switching operation, the seventh switching device SW7 and the eighth switching device SW8 are inverted and the alternative close and open (ON/OFF) switching operations of each switching device SW7 and SW8 are performed. As represented by the equation (9) described above, the second step-down duty DT21 is defined by ON time t(SW8) of the eighth switching device SW8 and ON time t(SW7) of the seventh switching device SW7.

For example, when the eighth switching device SW8 is turned off and the seventh switching device SW7 is turned on, the second step-down duty DT21 is 0%. On the other hand, when the eighth switching device SW8 is turned on and the seventh switching device SW7 is turned off, the second step-down duty DT21 is 100%.

The connection switching control unit 22 can step down the second voltage VB2 based on the second step-down duty DT21 and output the step-down voltage from the second direct-current power converter circuit 12. The connection switching control unit 22 controls output voltage V20a of the second direct-current power converter circuit 12 (in other words, the voltage applied between the first node A and the third node C) as the product of the second voltage VB2 and the second step-down duty DT21 (VB2*DT21=V20a).

The connection switching control unit 22 controls a switching operation of the first switching device SW1 and the second switching device SW2 included in the first direct-current power converter circuit 11 based on a first step-up duty DT12. In the switching operation, the first switching device SW1 and the second switching device SW2 are inverted and the alternative close and open (ON/OFF) switching operations of each switching device SW1 and SW2 are performed. As represented by the following equation (10), the first step-up duty DT12 is defined by ON time t(SW1) of the first switching device SW1 and ON time t(SW2) of the second switching device SW2.

For example, when the first switching device SW1 is turned on and the second switching device SW2 is turned off, the first step-up duty DT12 is 0%. On the other hand, when the first switching device SW1 is turned off and the second switching device SW2 is turned on, the first step-up duty DT12 is 100%.

The connection switching control unit 22 can step up the first voltage VB1 based on the first step-up duty DT12 and output the step-up voltage from the first direct-current power converter circuit 11. The connection switching control unit 22 controls output voltage V10b of the first direct-current power converter circuit 11 (in other words, the voltage applied between the second node B and the fourth node D) based on the first voltage VB1 and the first step-up duty DT12.

$$DT12 = \frac{t(SW2)}{t(SW2)+t(SW1)} = \frac{V0-2\cdot VB2+Vd}{V0-VB2} \atop DT22 = \frac{t(SW3)}{t(SW3)+t(SW4)} = \frac{V0-2\cdot VB1-Vd}{V0-VB1} \right\} \quad (10)$$

The connection switching control unit 22 controls a switching operation of the third switching device SW3 and the fourth switching device SW4 included in the second direct-current power converter circuit 12 based on a second step-up duty DT22. In the switching operation, the third switching device SW3 and the fourth switching device SW4 are inverted and the alternative close and open (ON/OFF) switching operations of each switching device SW3 and SW4 are performed. As represented by the equation (10) described above, the second step-up duty DT22 is defined by ON time t(SW3) of the third switching device SW3 and ON time t(SW4) of the fourth switching device SW4.

For example, when the fourth switching device SW4 is turned on and the third switching device SW3 is turned off, the second step-up duty DT22 is 0%. On the other hand, when the fourth switching device SW4 is turned off and the third switching device SW3 is turned on, the second step-up duty DT22 is 100%.

The connection switching control unit 22 can step up the second voltage VB2 based on the second step-up duty DT22 and output the step-up voltage from the second direct-current power converter circuit 12. The connection switching control unit 22 controls output voltage V20b of the second direct-current power converter circuit 12 (in other words, the voltage applied between the first node A and the third node C) based on the second voltage VB2 and the second step-up duty DT22.

As represented by the equation (9) described above, the first step-down duty DT11 is represented by the desired load voltage V0, the desired voltage difference Vd (=VB2−VB1), and the first voltage VB1, and the second step-down duty DT21 is represented by the desired load voltage V0, the desired voltage difference Vd (=VB2−VB1), and the second voltage VB2. On the other hand, based on the voltage difference Vd (=VB2−VB1), the first step-down duty DT11 can be represented by the second voltage VB2, and the second step-down duty DT21 can be represented by the first voltage VB1. In order to prevent a divergence of control responses, the connection switching control unit 22 may control switching operations using the first and second step-down duties DT11 and DT21 represented by the equation (9) described above.

Similarly, as represented by the equation (10) described above, the first step-up duty DT12 is represented by the second voltage VB2, and the second step-up duty DT22 is represented by the first voltage VB1. On the other hand, based on the voltage difference Vd (=VB2−VB1), the first step-up duty DT12 can be represented by the first voltage VB1, and the second step-up duty DT22 can be represented by the second voltage VB2. In order to prevent a divergence of control responses, the connection switching control unit 22 may control switching operations using the first and second step-up duties DT12 and DT22 represented by the equation (10) described above.

The power device 10 according to the second variation includes the constitution described above. Hereinafter, the operation of the power device 10 according to the second variation, in other words, the control operation of the connection switching control unit 22 will be described.

The connection switching control unit 22 can perform similar control operations to those in the first to tenth control modes of the second embodiment described above.

(First to Fourth Control Modes of the Second Variation of the Second Embodiment)

In a first control mode, when the load voltage V0 is less than the summed voltage of the first and second voltages VB1 and VB2 (=VB1+VB2), or when the load voltage V0 is more than the summed voltage of the first and second voltages VB1 and VB2 (=VB1+VB2), the connection switching control unit 22 drives one of the first and second step-up direct-current power converter circuits 11 and 12 at a time.

In second to fourth control modes, when the load voltage V0 is less than the summed voltage of the first and second voltages VB1 and VB2 (=VB1+VB2), or when the load voltage V0 is more than the summed voltage of the first and second voltages VB1 and VB2 (=VB1+VB2), the connection switching control unit 22 simultaneously drives the first and second direct-current power converter circuits 11 and 12. For example, as shown in FIG. 38, the phase of the switching operation of the first direct-current power converter circuit 11 may be the same as or opposite to that of the second direct-current power converter circuit 12. The phase of the switching operation of the first direct-current power converter circuit 11 may be arbitrarily shifted from that of the second direct-current power converter circuit 12 (for example, a phase shift is 180°).

(Fifth Control Mode of the Second Variation of the Second Embodiment)

In a fifth control mode, as shown in 39A, if the connection switching control unit 22 decreases the output voltage V10a of the first direct-current power converter circuit 11 (=VB1*DT11) and increases the output voltage V20a of the second direct-current power converter circuit 12 (=VB2*DT21) while the connection switching control unit 22 maintains the load voltage V0, the connection switching control unit 22 decreases the first step-down duty DT11 and increases the second step-down duty DT21. Thereby, a loop current LA, which acts as a so-called energy buffer for the transport of the electric charge between the first power source BT1 and the second power source BT2, is generated so that the first power source BT1 is discharged and the second power source BT2 is charged. The loop current LA circulates through the third node C, the fifth node E, the seventh node G, the first node A, the second node B, the sixth node F, the eighth node H, and the fourth node D in series.

Figure 39A:
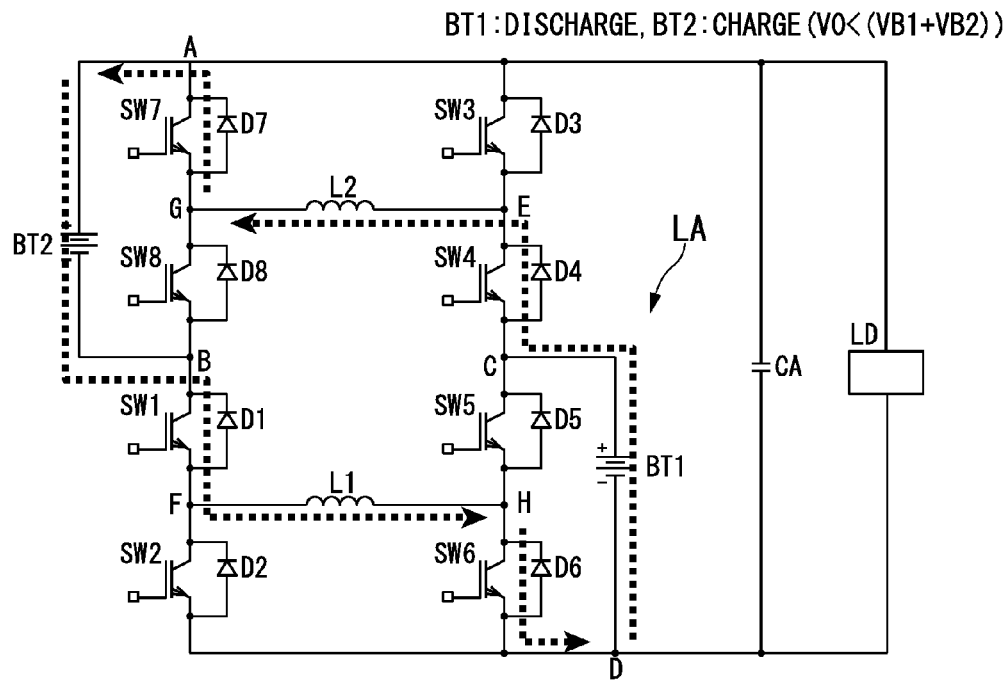
FIG. 39A is a diagram showing each loop current flow when the power device according to the second variation of the second embodiment of the present invention is in a fifth control mode.
Figure 39B:
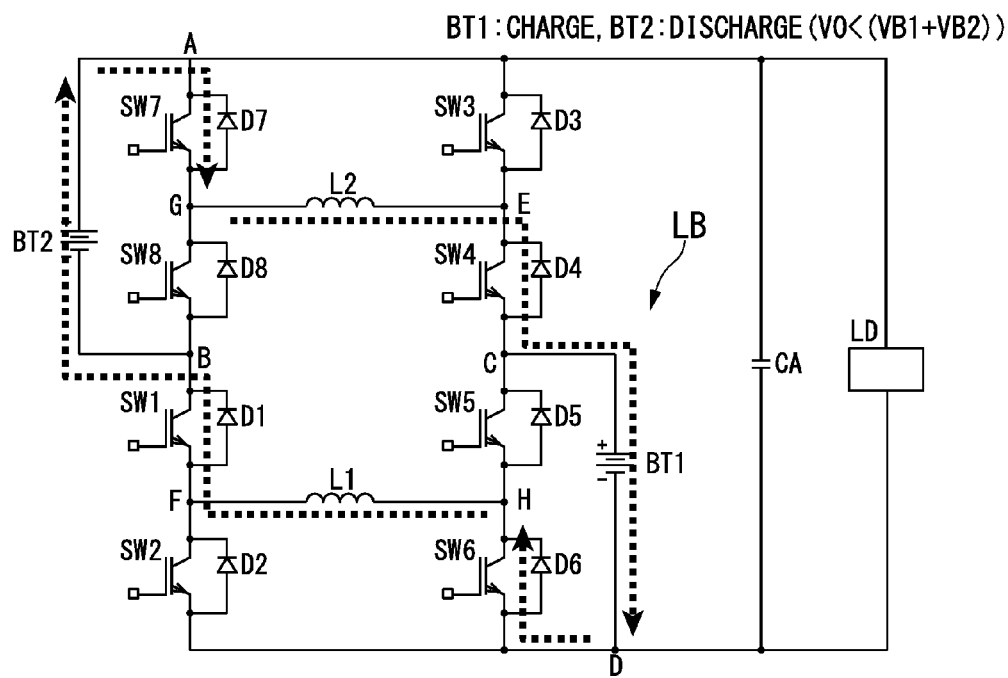
FIG. 39B is a diagram showing each loop current flow when the power device according to the second variation of the second embodiment of the present invention is in the fifth control mode.

As shown in FIG. 39B, if the connection switching control unit 22 increases the output voltage V10a (=VB1*DT11) and decreases the output voltage V20a (=VB2*DT21) while the connection switching control unit 22 maintains the load voltage V0, the connection switching control unit 22 increases the first step-down duty DT11 and decreases the second step-down duty DT21. Thereby, a loop current LB, which acts as a so-called energy buffer for the transport of the electric charge between the first power source BT1 and the second power source BT2, is generated so that the second power source BT2 is discharged and the first power source BT1 is charged. The loop current LB circulates through the first node A, the seventh node G, the fifth node E, the third node C, the fourth node D, the eighth node H, the sixth node F and the second node B in series.

Figure 39C:
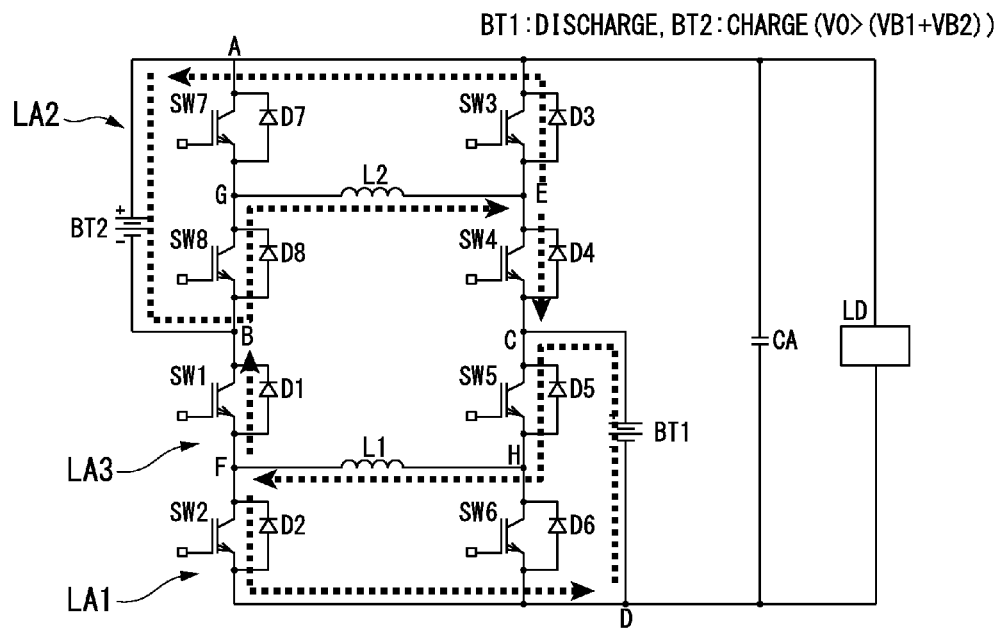
FIG. 39C is a diagram showing flows of first to third loop currents when the power device according to the second variation of the second embodiment of the present invention is in the fifth control mode.

As shown in FIG. 39C, if the connection switching control unit 22 increases the step-up ratio of the first direct-current power converter circuit 11 (=V10b/VB1) and decreases the step-up ratio of the second direct-current power converter circuit 12 (=V20b/VB2) while the connection switching control unit 22 maintains the load voltage V0, the connection switching control unit 22 increases the first step-up duty DT12 and decreases the second step-up duty DT22. Thereby, three loop currents, namely, first to third loop currents LA1, LA2, and LA3, which act as a so-called energy buffer, are generated so that the first power source BT1 is discharged and the second power source BT2 is charged. The first loop current LA1 circulates through the third node C, the eighth node H, the sixth node F, and the fourth node D in series. The second loop current LA2 circulates through the first node A, the second node B, the seventh node G, and the fifth node E in series. The third loop current LA3 circulates through the third node C, the eighth node H, the sixth node F, the second node B, the seventh node G, and the fifth node E in series so that the third loop current LA3 is connected to the first loop current LA1 and second loop current LA2.

Figure 39D:
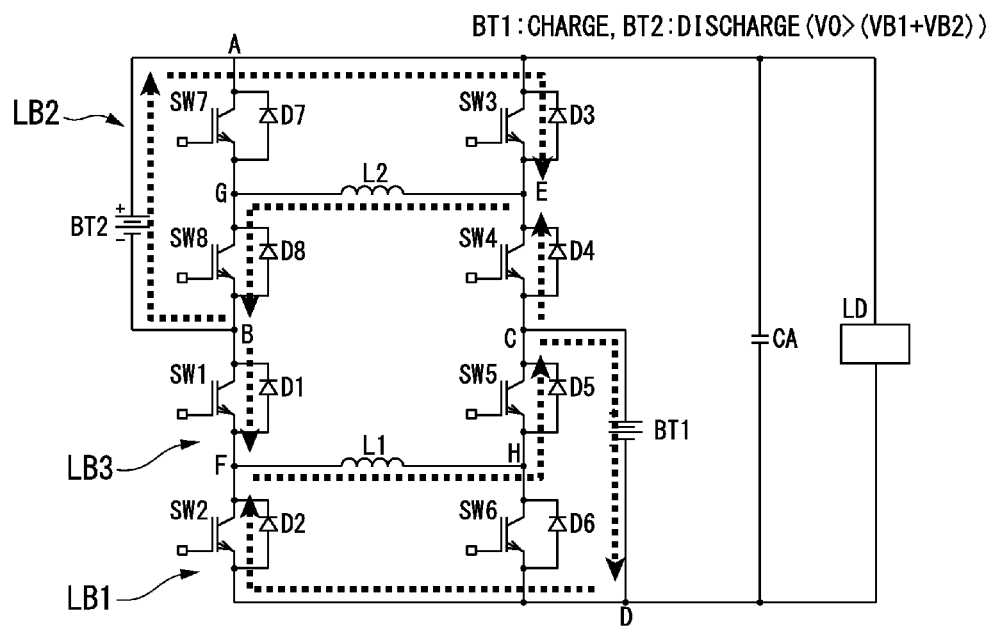
FIG. 39D is a diagram showing flows of the first to third loop currents when the power device according to the second variation of the second embodiment of the present invention is in the fifth control mode.

As shown in FIG. 39D, if the connection switching control unit 22 decreases the step-up ratio of the first direct-current power converter circuit 11 (=V10b/VB1) and increases the step-up ratio of the second direct-current power converter circuit 12 (=V20b/VB2) while the connection switching control unit 22 maintains the load voltage V0, the connection switching control unit 22 decreases the first step-up duty DT12 and increases the second step-up duty DT22. Thereby, three loop currents, namely, first to third loop currents LB1, LB2, and LB3, which act as a so-called energy buffer, are generated so that the second power source BT2 is discharged and the first power source BT1 is charged. The first loop current LB1 circulates through the sixth node F, the eighth node H, the third node C, and the fourth node D in series. The second loop current LB2 circulates through the first node A, the fifth node E, the seventh node G, and the second node B in series. The third loop current LB3 circulates through the sixth node F, the eighth node H, the third node C, the fifth node E, the seventh node G, and the second node 13 in series so that the third loop current LB3 is connected to the first loop current LB1 and second loop current LB2.

(Sixth to Ninth Control Modes of the Second Variation of the Second Embodiment)

In relation to the first to fourth control modes, the connection switching control unit 22 in sixth to ninth control modes can control any one of parameters to correspond to an arbitrary target value while the connection switching control unit 22 maintains each parameters other than the one at an arbitrary value by adjusting the first and second step-down duties DT11 and DT21 or the first and second step-up duties DT12 and DT22. The parameters include the load voltage V0, the voltage difference Vd (=VB2−VB1), the first voltage VB1, and the second voltage VB2.

(Tenth Control Mode of the Second Variation of the Second Embodiment)

In relation to the first to ninth control modes, in a condition that other loads are connected in addition to the load 13, the first voltage VB1 is different from the second voltage VB2, the total capacity of the first power source BT1 is different from that of the second power source BT2, etc., the connection switching control unit 22 in a tenth control mode can control a voltage at any location to correspond an arbitrary target value by adjusting the first and second step-down duties DT11 and DT21 or the first and second step-up duties DT12 and DT22. For example, if the voltage difference Vd (=VB2−VB1) is caused, the connection switching control unit 22 can control the voltage difference to be small. Thereby, if the connection condition of the first and second power sources BT1 and BT2 for the load 13 is changed into the parallel connection condition, a flow of excess current to cancel the voltage difference Vd (=VB2−VB1) can be prevented.

As described above, the power device 10 according to the second variation of the second embodiment of the present invention can easily control the load voltage V0 to be an arbitrary voltage in the range from the larger of the first voltage VB1 and the second voltage VB2 to the summed voltage of the first voltage VB1 and the second voltage VB2 (=VB1+VB2) by controlling the first step-down duty DT11 and the second step-down duty DT21. Moreover, the power device 10 can easily control the load voltage V0 to be an arbitrary voltage, which is equal to or more than the summed voltage of the first voltage VB1 and the second voltage VB2 (=VB1+VB2), by controlling the first step-up duty DT12 and the second step-up duty DT22.

Moreover, by generating the loop circuits LA and LB in the step-down operations of the first and second direct-current power converter circuits 11 and 12, and by generating the loop circuits LA1 to LA3 and LB1 to LB3 in the step-up operations of the first and second direct-current power converter circuits 11 and 12, the balance of charge and discharge of each first power source BT1 and second power source BT2 can be easily stabilized.

Moreover, by using the first step-down duty DT11 or the second step-up duty DT22 represented by the first voltage VB1 in the step-down operations of the first direct-current power converter circuit 11 or the step-up operations of the second direct-current power converter circuit 12, a divergence of control responses can be prevented. Similarly, by using the first step-up duty DT12 or the second step-down duty DT21 represented by the second voltage VB2 in the step-up operations of the first direct-current power converter circuit 11 or the step-down operations of the second direct-current power converter circuit 12, a divergence of control responses can be prevented.

In the second embodiment, and the first and second variations of the second embodiment, if the power device 10 is mounted in a vehicle, the first power source BT1 may be connected to a low voltage load such as an electric component for vehicle and the second power source BT2 may be connected to a high voltage load such as an inverter. Thereby, the first and second power sources BT1 and BT2 are connected in series, and the power device 10 can drive the high voltage load. Thereby, the maximum power output of the second power source BT2 can be decreased. Moreover, the amount of charge and discharge of the first power source BT1 and that of the second power source BT2 can be arbitrarily balanced.

The technical scope of the present invention is not limited to the embodiments described above, and includes variations where a variety of modifications are made in the embodiments described above without departing from the spirit or scope of the present invention. In other words, the embodiments described above are illustrative only, and modifications may be made accordingly in the embodiments.

What is claimed is:

1. A power device, comprising:
a first power source and a second power source;
a load configured to be driven by power supplied from the first power source and the second power source; and
a voltage control unit configured to control a voltage to be applied to the load, the voltage control unit comprising:
a loop circuit comprising at least a first reactor and a second reactor, the first reactor and the second reactor being connected each other in series;
a plurality of switches configured to conduct a loop current to the loop circuit, the plurality of switches comprising a first switching group of switches and a second switching group of switches; and
a first direct-current power converter circuit and a second direct-current power converter circuit, the first direct-current power converter circuit comprising the first reactor, and the first switching group, the first direct-current power converter circuit being connected to the first power source, the second direct-current power converter circuit comprising the second reactor, and the second switching group, the second direct-current power converter circuit being connected to the second power source, the loop circuit being formed by connecting the first direct-current power converter circuit and the second direct-current power converter circuit via common first and second connecting points.

2. The power device according to claim 1, wherein the voltage control unit is configured to generate the loop current which discharges the first power source and charges the second power source or the loop current which charges the first power source and discharges the second power source based on a duty of ON and OFF switching operations of each switch.

3. The power device according to claim 1, wherein the voltage control unit is configured to control the voltage, which is applied to the load, (a) to be an arbitral voltage in a range from a voltage of the first power source or a voltage of the second power source to a summed voltage of the voltage of the first power source and the voltage of the second power source, or (b) to be an arbitral voltage, which is equal to or more than the summed voltage of the voltage of the first power source and the voltage of the second power source, based on a duty of ON and OFF switching operations of each switch.

4. The power device according to claim 3, wherein
the voltage control unit is configured (a) to control the switching operation using the duty represented by the voltage of the first power source when the voltage control unit steps down the voltage of the first power source and outputs the step-down voltage from the first direct-current power converter circuit or when the voltage control unit steps up the voltage of the second power source and outputs the step-up voltage from the second direct-current power converter circuit, and (b) to control the switching operation using the duty represented by the voltage of the second power source when the voltage control unit steps down the voltage of the second power source and outputs the step-down voltage from the second direct-current power converter circuit or when the voltage control unit steps up the voltage of the first power source and outputs the step-up voltage from the first direct-current power converter circuit.

5. The power device according to claim 1, wherein
the voltage control unit comprises first to sixth nodes;
a positive electrode of the second power source is connected to the first node;
a negative electrode of the second power source is connected to the second node;
a positive electrode of the first power source is connected to the third node;
a negative electrode of the first power source is connected to the fourth node;
a first end of the second reactor is connected to the fifth node, and a second end of the second reactor is connected to the third node;
a first end of the first reactor is connected to the sixth node, and a second end of the first reactor is connected to the second node;
the voltage control unit comprises:
  a first switch of the plurality of switches, a first end of the first switch being connected to the third node, and a second end of the first switch being connected to the sixth node;
  a second switch of the plurality of switches, a first end of the second switch being connected to the sixth node, and a second end of the second switch being connected to the fourth node;
  a third switch of the plurality of switches, a first end of the third switch being connected to the first node and a second end of the third switch being connected to the fifth node; and
  a fourth switch of the plurality of switches, a first end of the fourth switch being connected to the fifth node, and a second end of the fourth switch being connected to the second node;
the first switching group of the first direct-current power converter circuit comprises the first and second switches;
the second switching group of the second direct-current power converter circuit comprises the third and fourth switches; and
the first connecting point and second connecting point are the second node and the third node, respectively.

6. The power device according to claim 1, wherein
the voltage control unit comprises first to sixth nodes;
a positive electrode of the second power source is connected to the first node;
a negative electrode of the second power source is connected to the second node;
a positive electrode of the first power source is connected to the third node;
a negative electrode of the first power source is connected to the fourth node;
a first end of the second reactor is connected to the fifth node, and a second end of the second reactor is connected to the second node;
a first end of the first reactor is connected to the sixth node, and a second end of the first reactor is connected to the third node;
the voltage control unit comprises:
  a first switch of the plurality of switches, a first end of the first switch being connected to the second node, and a second end of the first switch being connected to the sixth node;
  a second switch of the plurality of switches, a first end of the second switch being connected to the sixth node, and a second end of the second switch being connected to the fourth node;
  a third switch of the plurality of switches, a first end of the third switch being connected to the first node, and a second end of the third switch being connected to the fifth node; and
  a fourth switch of the plurality of switches, a first end of the fourth switch being connected to the fifth node, and a second end of the fourth switch being connected to the third node;
the first switching group of the first direct-current power converter circuit comprises the first and second switches;
the second switching group of the second direct-current power converter circuit comprises the third and fourth switches; and
the first connecting point and second connecting point are the second node and the third node, respectively.

7. The power device according to claim 6, wherein
each first and fourth switch is a bidirectional switch;
the voltage control unit comprises:
  a fifth switch of the plurality of switches, a first end of the fifth switch being connected to the first node, and a second end of the fifth switch being connected to the sixth node; and
  a sixth switch of the plurality of switches, a first end of the sixth switch being connected to the fifth node, and a second end of the sixth switch being connected to the fourth node;
the first switching group of the first direct-current power converter circuit comprises the first, second, and fifth switches; and
the second switching group of the second direct-current power converter circuit comprises the third, fourth, and sixth switches.

8. The power device according to claim 6, wherein
the voltage control unit comprises:
  a seventh node provided between the second node and the second reactor;
  an eighth node provided between the third node and the first reactor;
  a fifth switch of the plurality of switches, a first end of the fifth switch being connected to the third node, and a second end of the fifth switch being connected to the eighth node;
  a sixth switch of the plurality of switches, a first end of the sixth switch being connected to the eighth node, and a second end of the sixth switch being connected to the fourth node;
  a seventh switch of the plurality of switches, a first end of the seventh switch being connected to the first node, and a second end of the seventh switch being connected to the seventh node; and
  an eighth switch of the plurality of switches, a first end of the eighth switch being connected to the seventh node, and a second end of the eighth switch being connected to the second node;
the first switching group of the first direct-current power converter circuit comprises the first, second, fifth, and sixth switches; and
the second switching group of the second direct-current power converter circuit comprises the third, fourth, seventh, and eighth switches.

9. The power device according to claim 1, wherein the first reactor and the second reactor are magnetically coupled.

10. The power device according to claim 9, wherein the first reactor and the second reactor are provided to perform magnetic-field cancellation.

* * * * *